United States Patent
Zhang et al.

(10) Patent No.: US 12,008,211 B2
(45) Date of Patent: Jun. 11, 2024

(54) PROMPT METHOD AND TERMINAL DEVICE

(71) Applicant: HUAWEI TECHNOLOGIES CO., LTD., Shenzhen (CN)

(72) Inventors: Eryan Zhang, Nanjing (CN); Chundong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/004,025

(22) PCT Filed: Mar. 31, 2021

(86) PCT No.: PCT/CN2021/084619
§ 371 (c)(1),
(2) Date: Dec. 30, 2022

(87) PCT Pub. No.: WO2022/001261
PCT Pub. Date: Jan. 6, 2022

(65) Prior Publication Data
US 2023/0315252 A1   Oct. 5, 2023

(30) Foreign Application Priority Data
Jun. 30, 2020 (CN) .......................... 202010625561.6

(51) Int. Cl.
*G06F 3/04817* (2022.01)
*G06F 3/04842* (2022.01)

(52) U.S. Cl.
CPC ...... *G06F 3/04817* (2013.01); *G06F 3/04842* (2013.01); *G06F 2203/04803* (2013.01)

(58) Field of Classification Search
CPC ............ G06F 3/04817; G06F 3/04842; G06F 2203/04803
(Continued)

(56) References Cited

U.S. PATENT DOCUMENTS 5,115,501 A     5/1992  Kerr
6,469,722 B1 *  10/2002 Kinoe .................. G06F 3/0481
                                                         715/810
(Continued)

FOREIGN PATENT DOCUMENTS

CN     102460360 A    5/2012
CN     103577082 A    2/2014
(Continued)

OTHER PUBLICATIONS

EP/21832914.2, Partial Supplementary European Search Report, dated Nov. 3, 2023.

*Primary Examiner* — William D Titcomb
(74) *Attorney, Agent, or Firm* — Leydig, Voit & Mayer, Ltd.

(57) ABSTRACT

A prompt method and a terminal device are provided, and are applicable to the field of man-machine interaction technologies. The method includes: dividing a startup icon of an application program into an associated area and a non-associated area in advance; when a user operates the startup icon of the application program, identifying an operated area for the startup icon; and starting the application program normally if the operation is performed on the non-associated area; or displaying a preset interface if the operation is performed on the associated area. The preset interface includes a prompt element used to provide a prompt for to-be-prompted content in the application program.

20 Claims, 39 Drawing Sheets

(58) Field of Classification Search
USPC .......................................................... 715/764
See application file for complete search history.

(56) References Cited

U.S. PATENT DOCUMENTS

| | | | | |
|---|---|---|---|---|
| 8,266,550 | B1* | 9/2012 | Cleron ................ | G06F 3/04883 345/173 |
| 9,690,459 | B2* | 6/2017 | Jung ........................ | G06F 8/34 |
| 11,301,267 | B2* | 4/2022 | Vattikuti ................ | G06F 9/451 |
| 2007/0136681 | A1* | 6/2007 | Miller ................ | G06F 3/04847 715/782 |
| 2009/0019385 | A1* | 1/2009 | Khatib ................ | G06F 3/04817 715/765 |
| 2015/0212714 | A1* | 7/2015 | Hua ..................... | G05B 19/409 715/739 |
| 2017/0322708 | A1 | 11/2017 | Huang et al. | |
| 2017/0344172 | A1* | 11/2017 | Li ........................ | G06F 3/03545 |
| 2019/0087205 | A1* | 3/2019 | Guday .................... | G06F 9/453 |
| 2019/0121522 | A1* | 4/2019 | Davis ..................... | G06V 40/28 |
| 2019/0205010 | A1* | 7/2019 | Fujii .................... | G06F 3/03547 |
| 2019/0324603 | A1* | 10/2019 | Shin ...................... | G06F 3/0481 |
| 2022/0094610 | A1* | 3/2022 | Sundermeyer ........ | G06F 3/0486 |
| 2022/0229624 | A1* | 7/2022 | Xiong ................. | G06F 3/04817 |

FOREIGN PATENT DOCUMENTS

| | | |
|---|---|---|
| CN | 104618516 A | 5/2015 |
| CN | 104881313 A | 9/2015 |
| CN | 105027063 A | 11/2015 |
| CN | 105117208 A | 12/2015 |
| CN | 106325923 A | 1/2017 |
| CN | 106383715 A | 2/2017 |
| CN | 107168602 A | 9/2017 |
| CN | 107952242 A | 4/2018 |
| CN | 108196839 A | 6/2018 |
| CN | 109002321 A | 12/2018 |
| CN | 109976618 A | 7/2019 |
| EP | 2290925 A1 | 3/2011 |
| JP | 2019014108 A | 1/2019 |
| WO | 2012157273 A1 | 11/2012 |

* cited by examiner

PROMPT METHOD AND TERMINAL DEVICE

This application is a National Stage of International Application No. PCT/CN2021/084619, filed on Mar. 31, 2021 which claims priority to Chinese Patent Application No. 202010625561.6, filed on Jun. 30, 2020. Both of the aforementioned application are hereby incorporated by reference in their entireties.

TECHNICAL FIELD

This application relates to the field of human-computer interaction technologies, and in particular, to a prompt method and a terminal device.

BACKGROUND

With continuous iterative update of a terminal device, new functions are continuously added to an operating system and an application program of the terminal device. For example, some beautification functions are added to a camera application to enrich camera application functions. However, during actual application, many users do not actively use these new functions. Therefore, to improve usage of the new function and improve user experience, a user needs to be prompted to use the new function.

To prompt a user to use a new function, in a conventional prompt method, a prompt identity is added to a function button of a new function in a function menu of an application program. For example, a red dot is added to the function button of the new function. However, it has been proved that even if the prompt identity is added to the function button of the new function, most users can easily ignore the new function. Therefore, it is difficult to improve usage of a new function of a terminal device by using the conventional new-function prompt method.

SUMMARY

In view of this, embodiments of this application provide a prompt method and a terminal device, to resolve a problem in the conventional technology that a prompt effect for a new function of a terminal device is relatively poor, resulting in relatively low usage of the new function by a user.

A first aspect of embodiments of this application provides a prompt method. In this embodiment of this application, to-be-prompted content is first content, a to-be-prompted function is a first function, and first information is content information. The method includes:

dividing a startup icon of an application program into an associated area and a non-associated area in advance; when a user operates the startup icon of the application program, identifying an operated area for the startup icon; and starting the application program normally if the operation is performed on the non-associated area; or displaying a first interface if the operation is performed on the associated area, where the first interface includes a prompt element used to provide a prompt for to-be-prompted content in the application program.

In embodiments of this application, the to-be-prompted content in the application program is separately presented on the startup icon, so that a user can fully notice the to-be-prompted content, and a probability that the user views or uses the to-be-prompted content is increased. After an operation is performed on the associated area, the prompt element used to provide a prompt for the to-be-prompted content is displayed, so as to implement effective prompt of the to-be-prompted content. In this way, the user can gradually get familiar with the prompt content. This improves subsequent usage of the to-be-prompted content by the user.

In a first possible implementation of the first aspect, the prompt element includes at least one or more of the to-be-prompted content, a first control used to invoke the to-be-prompted content, and a second control used to perform content description on the to-be-prompted content.

In this embodiment of this application, any one or more of the to-be-prompted content, the control used to invoke the to-be-prompted content, and the control used to describe the content may be selected to be displayed in a preset interface. The user may learn of, view, or use the to-be-prompted content based on an actual requirement, so that a better prompt effect is realized. This can improve subsequent usage of the to-be-prompted content by the user.

Based on the first possible implementation of the first aspect, in a second possible implementation of the first aspect, the prompt element further includes content information.

In this embodiment of this application, information such as a name of the to-be-prompted content is displayed in a preset interface, so that the user can learn of a basic situation of the to-be-prompted content in the preset interface. For one thing, friendliness of the preset interface can be improved. For another, it can be convenient for the user to use the to-be-prompted content subsequently, thereby improving usage of the to-be-prompted content by the user.

In a third possible implementation of the first aspect, the to-be-prompted content may be a to-be-prompted function. When the to-be-prompted content is the to-be-prompted function, the first interface includes the first control and/or the second control. In this case, the first control is used to enable the to-be-prompted function, and the second control is used to perform function demonstration on the to-be-prompted function for the user.

In this embodiment of this application, the to-be-prompted function is separately presented on the startup icon, so that the user can fully notice the to-be-prompted function, and a probability that the user views or uses the to-be-prompted function is increased. After the associated area is tapped, the to-be-prompted function and/or function demonstration are presented independently so that the user can learn or use the to-be-prompted function based on an actual requirement. In this way, the user can gradually get familiar with the to-be-prompted function. This improves subsequent usage of the to-be-prompted function by the user.

Based on the third possible implementation of the first aspect, in a fourth possible implementation of the first aspect, the first interface includes the second control, and the first interface is an operation interface of the to-be-prompted function.

In this embodiment of this application, the user can directly try a new function through the operation interface, and view the function demonstration when necessary. This greatly improves convenience of understanding and using the new function by the user. This is conducive to improve usage of the new function.

In a fifth possible implementation of the first aspect, the first interface includes a second control, and after the displaying the first interface, the method further includes:

if it is detected that the user operates the second control, obtaining a description resource associated with the to-be-prompted content, and displaying the description resource, where the description resource is a resource used to describe the to-be-prompted content.

In this embodiment of this application, a resource used to perform content description on the to-be-prompted content is preset, and data association is performed between the resource and the to-be-prompted content. In addition, the selected second control is a function triggering control. When the user operates the second control, the terminal device obtains and displays the description resource, so that the user can fully learn of the to-be-prompted content and be familiar with the to-be-prompted content.

In a sixth possible implementation of the first aspect, the first interface includes a second control, and the operation of displaying the first interface further includes:

obtaining the description resource associated with the to-be-prompted content, and displaying the description resource by using the second control.

In this embodiment of this application, the resource used to perform content description on the to-be-prompted content is preset, and data association is performed between the resource and the to-be-prompted content. In addition, the selected second control is a window control. In this case, the second control in the first interface displays the description resource, so that the user can learn of the to-be-prompted content more conveniently and be familiar with the to-be-prompted content.

Based on the sixth possible implementation of the first aspect, in a seventh possible implementation of the first aspect, the manner of displaying the description resource by the second control is automatic play or manual play; and if manual play is used, that the second control displays the description resource includes:

if it is detected that the user operates the second control, playing the description resource by using the second control.

Based on the fifth or the sixth possible implementation of the first aspect, in an eighth possible implementation of the first aspect, the to-be-prompted content is a to-be-prompted function, and the description resource is a demonstration resource used to demonstrate the to-be-prompted function.

Correspondingly, the obtaining the description resource associated with the to-be-prompted content includes:

obtaining function description data associated with the to-be-prompted function, and extracting a demonstration resource from the function description data.

In this embodiment of this application, function description data associated with the new function is first searched for. For example, a resource corresponding to an application program such as user manual or tips that introduces a new function, and a resource such as a demonstration video associated with the application program of the new function are first searched for. Because there may be a relatively large difference between formats of the function description data, resources extraction is further performed on the function description data in this embodiment of this application. To be specific, included resources such as a picture, a video, and a text are extracted from the obtained function description data, and these resources are used as demonstration resources in this embodiment of this application. In this way, operability of obtaining demonstration resources is improved.

In a ninth possible implementation of the first aspect, if the to-be-prompted content is a to-be-prompted function, the operation of displaying the first interface includes:

obtaining a total number of times the to-be-prompted function is used when it is detected that the user performs an operation on the associated area. If the total number of times is greater than a first number-of-times threshold, an operation interface of the to-be-prompted function is displayed. If the total number of times is less than or equal to the first number-of-times threshold, the first interface is displayed.

When the total number of times the to-be-prompted function is used is less than or equal to the first number-of-times threshold, it is determined that the user is not familiar with the to-be-prompted function in this embodiment of this application. Otherwise, if the total number of times is greater than the first number-of-times threshold, it is determined that the user is relatively familiar with the to-be-prompted function. When the user is relatively familiar with the to-be-prompted function, in this embodiment of this application, the first interface is not displayed, but an operation interface of the to-be-prompted function is displayed, so that the user can start to operate the to-be-prompted function after tapping the associated area. When the user is not familiar with the to-be-prompted function, the first interface is displayed, so that the user can freely choose whether to watch function demonstration of the to-be-prompted function.

In a tenth possible implementation of the first aspect, if the to-be-prompted content is a to-be-prompted object other than a function, the operation of displaying the first interface includes:

when it is detected that the user performs an operation on the associated area, obtaining a total number of times the to-be-prompted object is used. If the total number of times is greater than the first number-of-times threshold, an interface including the to-be-prompted object is displayed. If the total number of times is less than or equal to the first number-of-times threshold, the first interface is displayed.

In this embodiment of this application, when the user is relatively familiar with the to-be-prompted object, the first interface is not displayed, but the interface including the to-be-prompted object is displayed, so that the user can start to view or use the to-be-prompted object after tapping the associated area. When the user is not familiar with the to-be-prompted object, the first interface is displayed, so that the user can freely choose whether to watch description of the to-be-prompted object.

Based on any one of the first to the tenth possible implementations of the first aspect, in an eleventh possible implementation of this application, before the identifying an operation performed by the user on an operated area of the startup icon, the method further includes:

dividing the startup icon into m areas, selecting n areas from the m areas as associated areas, and using remaining m-n areas in the m areas as non-associated areas, where both m and n are integers, m≥2, and 1≤n<m.

In this embodiment of this application, before the to-be-prompted function is prompted, the startup icon of the application program is divided into a plurality of areas in advance. Some areas are selected as the associated areas. In this way, separate association of the to-be-prompted content on the startup icon is implemented, so that the user can quickly learn of or use the to-be-prompted content by tapping the associated area.

In a twelfth possible implementation of this application, in this embodiment of this application, a preset prompt identity is displayed in the associated area.

Displaying the prompt identity in the associated area can notify the user of specific functions corresponding to different areas of the startup icon, so that the user can accurately enable, based on an actual requirement, a function required by the user, so as to improve user experience. In addition, when the user needs to view or use the to-be-prompted content, a user requirement can be quickly met. This improves man-machine interaction efficiency and user experience.

Based on the twelfth possible implementation of the first aspect, in a thirteenth possible implementation of this application, the prompt identity is a preset character, or related information of the to-be-prompted content.

When the prompt identity is the related information of the to-be-prompted content, in this embodiment of this application, the user may be notified of some information related to the to-be-prompted content when the user is notified that the associated area is an area corresponding to the to-be-prompted content.

Based on the eleventh possible implementation of the first aspect, in the thirteenth possible implementation of this application, after displaying the first interface or starting the application program, the prompt method further includes:

obtaining a total number of times the to-be-prompted content is used, and when the total number of times is greater than or equal to a second number-of-times threshold, using the first area and the second area of the startup icon as a whole to start the application program.

When the to-be-prompted content is used for a relatively large number of times, it indicates that the user is very familiar with the to-be-prompted content. In this case, in this embodiment of this application, it is determined that there is no need to prompt the to-be-prompted content, and area division of the startup icon is canceled, so that the startup icon recovers to normal. In this case, no matter which area of the startup icon is tapped by the user, the application program is started, and a case of "false tapping" does not occur. Therefore, in this embodiment of this application, a normal operation performed by the user on the application program can be ensured, man-machine interaction efficiency between the user and the terminal device can be improved, and user experience can be improved.

In a fifteenth possible implementation of this application, if an operation is performed on the non-associated area, the operation of normally starting the application program may be replaced with:

if an operation is performed on the non-associated area, displaying a second interface, where the second interface includes fourth content of the at least one application program. The fourth content includes content other than the to-be-prompted content.

In this embodiment of this application, a person skilled in the art may set a response manner for the non-associated area based on an actual requirement. The response manner may be normally starting the application program (in this case, the second interface is an interface displayed after the application program is normally started). Alternatively, the response manner may be set as displaying a specific interface. However, to enable the user to normally use the application program, in this case, the second interface should include at least one piece of content that is not the to-be-prompted content.

Based on the fifteenth possible implementation of the first aspect, in a sixteenth possible implementation of this application, if the to-be-prompted content is a to-be-prompted, in this case, the fourth content is a fourth function. Correspondingly, the second interface includes a fourth control used to enable the fourth function.

In a case in which the to-be-prompted content is a to-be-prompted function, in this case, the second interface is required to have at least one startup control of another function, so that the user can normally use the application program.

A second aspect of embodiments of this application provides a prompt method, including:

identifying second content pointed to by a triggering instruction when the triggering instruction is obtained; and displaying a first interface if the second content includes only to-be-prompted content, where the first interface includes the to-be-prompted content and/or a first control used to invoke the to-be-prompted content, and further includes a second control used to describe the to-be-prompted content, or displaying a third interface if the second content includes the to-be-prompted content and third content associated with the to-be-prompted content, where the third interface includes the to-be-prompted content and/or a first control used to invoke the to-be-prompted content, includes a second control used to perform content description on the to-be-prompted content, and further includes the third content and/or a third control used to invoke the third content.

In this embodiment of this application, after receiving the triggering instruction, a terminal device identifies content specifically executed by using the triggering instruction. If only the to-be-prompted content is pointed to, in this case, the to-be-prompted content is displayed in this embodiment of this application, and the second control that can be used to perform content description on the to-be-prompted content is provided. If not only the to-be-prompted content is pointed to, other prompt content is further displayed based on displaying the to-be-prompted content and providing the second control that can be used to perform content description on the to-be-prompted content. In this way, based on normal use of content pointed to by the original triggering instruction, a user can further intuitively learn of related information of the to-be-prompted content, thereby improving interest of the user in the to-be-prompted content. A plurality of pieces of content and controls are simultaneously displayed in the interface, and the user can operate the controls. Therefore, a number of times of man-machine interaction between the user and the terminal device can be increased, so that the user can better learn of and get used to the to-be-prompted content, usage of the to-be-prompted content can be improved.

In a first possible implementation of the second aspect, the triggering instruction may be a function triggering instruction. When the triggering instruction is a function triggering instruction, the second content is a second function, the third content is a third function, and the to-be-prompted content is a to-be-prompted function.

Correspondingly, the first interface includes the first control and the second control, or the first interface includes the second control, and the first interface is an operation interface of the to-be-prompted function. In this case, the first control is used to enable the to-be-prompted function, and the second control is used to perform function demonstration on the to-be-prompted function for the user.

In another possible implementation, in this case, the third interface includes the first control, the second control, and the third control, and the third control is used to enable a third function.

In this embodiment of this application, when the to-be-prompted content is a to-be-prompted function, an enabling control and a demonstration control of the to-be-prompted function are displayed in the interface. Alternatively, an operation interface of a to-be-prompted function, and a demonstration control are displayed. In this way, on the basis that the user can normally use an original function, the user can intuitively learn of a feature of the to-be-prompted function and use the to-be-prompted function. In this way, interest of the user in the to-be-prompted function is improved. In addition, the control of each function is provided for the user to perform an operation, and the user needs to make a selection. Therefore, a number of times of man-machine interaction between the user and the terminal device is increased, so that the user can better learn of and get used to the to-be-prompted function, and usage of the to-be-prompted function can be improved.

In a second possible implementation of the second aspect, after the displaying the first interface, the method further includes:

if it is detected that the user operates the second control, obtaining a description resource associated with the to-be-prompted content, and displaying the description resource, where the description resource is a resource used to perform content description on the to-be-prompted content.

In this embodiment of this application, the resource used to perform content description on the to-be-prompted content is preset, and data association is performed between the resource and the to-be-prompted content. In addition, the selected second control is a function triggering control. When the user operates the second control, the terminal device obtains and displays the description resource, so that the user can fully learn of the to-be-prompted content and be familiar with the to-be-prompted content.

In a third possible implementation of the second aspect, the operation of displaying the first interface further includes:

obtaining the description resource associated with the to-be-prompted content, and displaying the description resource by using the second control.

In this embodiment of this application, the resource used to perform content description on the to-be-prompted content is preset, and data association is performed between the resource and the to-be-prompted content. In addition, the selected second control is a window control. In this case, the second control in the first interface displays the description resource, so that the user can learn of the to-be-prompted content more conveniently and be familiar with the to-be-prompted content.

On the basis of the third possible implementation of the second aspect, in a fourth possible implementation of the second aspect, a manner in which the second control displays the description resource is automatic play or manual play; and if manual play is used, that the second control displays the description resource includes:

if it is detected that the user operates the second control, playing the description resource by using the second control.

Based on the third or the fourth possible implementation of the second aspect, in a fifth possible implementation of the second aspect, the to-be-prompted content is a to-be-prompted function, and the description resource is a demonstration resource used to perform function demonstration on the to-be-prompted function.

Correspondingly, the obtaining the description resource associated with the to-be-prompted content includes:

obtaining function description data associated with the to-be-prompted function, and extracting a demonstration resource from the function description data.

In this embodiment of this application, function description data associated with the new function is first searched for. For example, a resource corresponding to an application program such as user manual or tips that introduces a new function, and a resource such as a demonstration video associated with the application program of the new function are first searched for. Because there may be a relatively large difference between formats of the function description data, resources extraction is further performed on the function description data in this embodiment of this application. To be specific, included resources such as a picture, a video, and a text are extracted from the obtained function description data, and these resources are used as demonstration resources in this embodiment of this application. In this way, operability of obtaining demonstration resources is improved.

In a sixth possible implementation of the second aspect, the operation of displaying the first interface if the to-be-prompted content is a to-be-prompted function, the first interface includes the first control and the second control, and the first interface is not a function interface of the to-be-prompted function includes:

if the second function includes only the to-be-prompted function, obtaining a third total number of times the to-be-prompted function is used.

If the third total number of times is greater than a first number-of-times threshold, an operation interface of the to-be-prompted function is displayed.

If the first total number of times is less than or equal to the first number-of-times threshold, the first interface is displayed.

When the total number of times the to-be-prompted function is used is less than or equal to the first number-of-times threshold, it is determined that the user is not familiar with the to-be-prompted function in this embodiment of this application. Otherwise, if the total number of times is greater than the first number-of-times threshold, it is determined that the user is relatively familiar with the to-be-prompted function. When the user is relatively familiar with the to-be-prompted function, in this embodiment of this application, the first interface is not displayed, but an operation interface of the to-be-prompted function is displayed, so that the user can start to operate the to-be-prompted function after tapping the associated area. When the user is not familiar with the to-be-prompted function, the first interface is displayed, so that the user can freely choose whether to watch function demonstration of the to-be-prompted function.

In a seventh possible implementation of the second aspect, if the to-be-prompted content is a to-be-prompted object other than a function, the operation of displaying the first interface includes:

if the second content includes only the to-be-prompted object, obtaining a total number of times the to-be-prompted object is used; and if the total number of times is greater than the first number-of-times threshold, displaying an interface including the to-be-prompted object, or if the total number of times is less than or equal to the first number-of-times threshold, displaying the first interface.

A third aspect of embodiments of this application provides a prompt apparatus, including:

an area identification module, configured to: detect a first operation performed by a user on an application program startup icon, and identify an operated area that corresponds to a first operation and that is in the startup icon;

a content prompting module, configured to display a first interface when the operated area is a first area of the startup icon, where the first interface includes a prompt element, and the prompt element is used to prompt to-be-prompted content of the application program; and a program starting module, configured to start the application program when the operated area is a second area of the startup icon.

A fourth aspect of embodiments of this application provides a prompt apparatus, including:

a content determining module, configured to obtain a triggering instruction, and identify second content pointed to by the triggering instruction;

a first display module, configured to display a first interface when the second content includes only to-be-prompted content, where the first interface includes the to-be-prompted content and/or a first control used to invoke the to-be-prompted content, and further includes a second control used to describe the to-be-prompted content; and a second display module, configured to display a third interface when the second content includes the to-be-prompted content and third content associated with the to-be-prompted content, where the third interface includes the to-be-prompted content and/or a first control used to invoke the to-be-prompted content, includes a second control used to perform content description on the to-be-prompted content, and further includes the third content and/or a third control used to invoke the third content.

A fifth aspect of embodiments of this application provides a terminal device, where the terminal device includes a memory and a processor, the memory stores a computer program that can be run on the processor, and when the processor executes the computer program, the terminal device performs the steps of the prompt method according to any one of the first aspect or performs the steps of the prompt method according to any one of the second aspect.

A sixth aspect of embodiments of this application provides a computer-readable storage medium, including a stored computer program, where when the computer program is executed by a processor, a terminal device performs the steps of the prompt method according to any one of the first aspect or performs the steps of the prompt method according to any one of the second aspect.

A seventh aspect of embodiments of this application provides a computer program product. When the computer program product runs on a terminal device, the terminal device performs the steps of the prompt method according to any one of the first aspect or performs the steps of the prompt method according to any one of the second aspect.

An eighth aspect of embodiments of this application provides a chip, where the chip includes a memory and a processor, the memory is coupled to the processor, the memory stores a computer program, and when the processor executes the computer program, the chip performs the steps of the prompt method according to any one of the first aspect or performs the steps of the prompt method according to any one of the second aspect.

It may be understood that, for beneficial effects of the third aspect to the eighth aspect, refer to the related descriptions in the first aspect or the second aspect. Details are not described herein again.

DESCRIPTION OF EMBODIMENTS

Figure 1A:
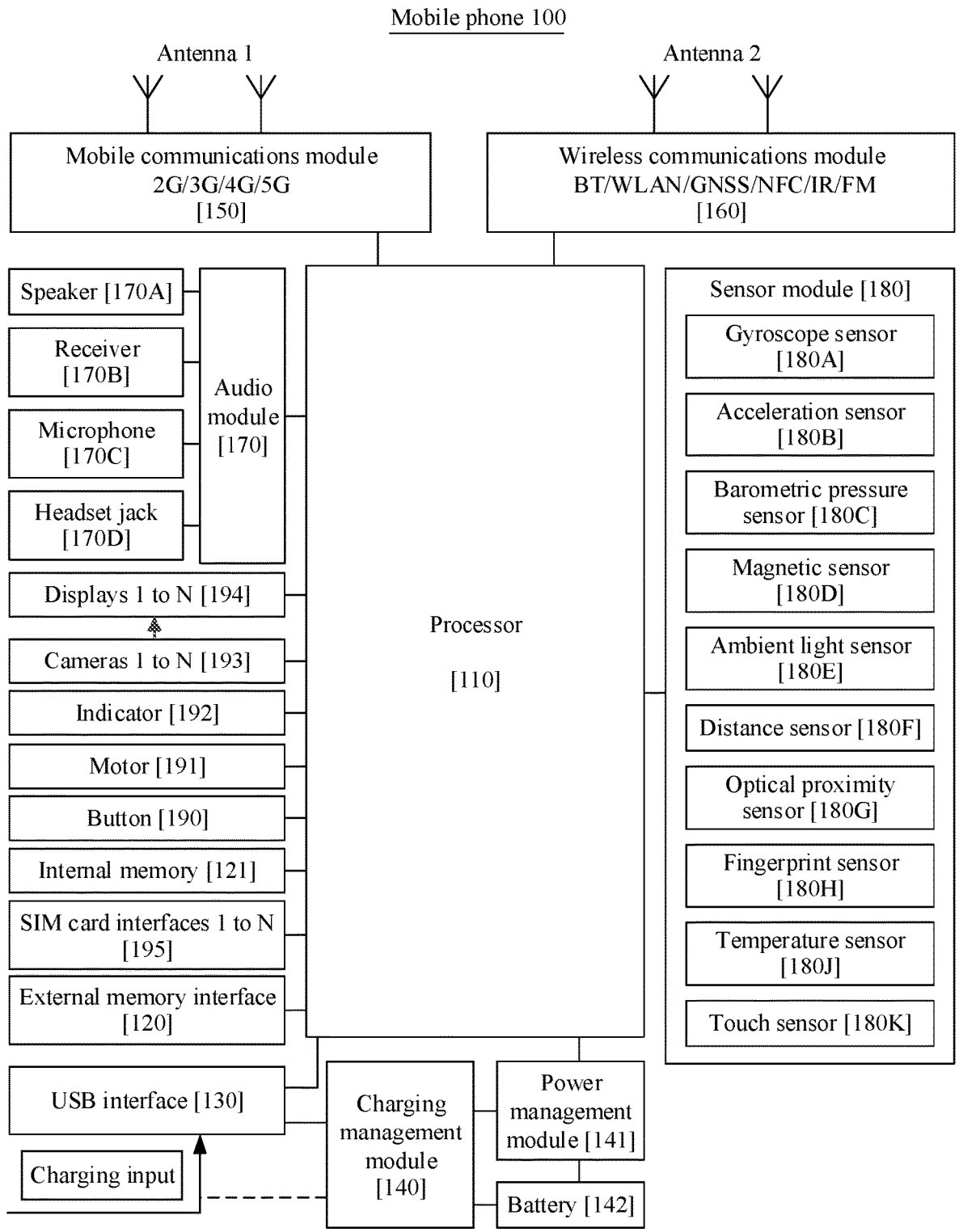
FIG. 1A is a schematic diagram of a structure of a mobile phone according to an embodiment of this application.

In the following description, for illustration instead of limitation, specific details such as a particular system structure and a technology are provided to facilitate a thorough understanding of embodiments of this application. However, a person skilled in the art should know that this application may also be implemented in other embodiments without these specific details. In other cases, detailed descriptions of well-known systems, circuits, and methods are omitted, so that this application is described without being obscured by unnecessary details.

With continuous update of software and hardware of a terminal device, various types of content included in the terminal device are increasingly rich. For example, a terminal device includes more and more functions and resources. However, due to a problem such as a habit of a user, the user may not actively view or use the content of the terminal device. As a result, usage of some content is relatively low, which is not conducive to improving use experience of using the terminal device by the user.

For example, content is a new function in a terminal device. Some users who like to study terminal devices may actively explore new functions and use the new functions. However, most common users only pay attention to and use some common functions after obtaining a terminal device. Before replacing a new terminal device, these users may not know or have not used a new function. Therefore, to improve usage of new functions and improve user experience, users need to be prompted to use the new function.

Optionally, several prompt methods for a new function include:

1. Install application programs used to introduce new functions in a terminal device, for example, some usage tips program. Alternatively, release user manuals of some new functions of a terminal device in an official forum for users to query and use. Alternatively, introduce some new functions and features of a terminal device through a product launch event of the terminal device.
2. Add a prompt identity to a control of a new function in a function menu of an application.
3. After a user enters an application program, use masking guidance on an interface of the application program to guide a user to use a new function thereof.

For the foregoing method 1, practice proves that most users do not open these applications that introduce the new functions or download the user manuals. Few users pay attention to the product launch event of the terminal device. Therefore, a prompt effect for the new function is not good.

For methods 2 and 3, during actual application, most users may easily ignore the prompt identity or skip a masking guidance step to use some old functions. Therefore, it is difficult to improve a prompt effect for the new function.

Therefore, how to effectively prompt and guide the user to use the new function in the terminal device, to improve usage of the new function by the user, so that the user can experience some latest technologies and convenient functions in the terminal device has become an urgent problem to be resolved. Similarly, for some old functions with relatively low usage, there is also a requirement for improving usage, so as to help the user better experience the terminal device.

In addition to functions, other content existing in the terminal device may also have a requirement for prompting the user to use. For example, for various resources such as audios, videos, pictures, and texts in the terminal device, and some message-type content, these content includes information that needs to be notified to the user, so as to achieve a corresponding purpose. Similarly, due to problems such as user habits, the user may not actively search for and use these content. Therefore, before the user changes to a new terminal device, these content may not be viewed or used by the user. Therefore, these content also has a requirement for improving user usage.

A GUI theme file is used as an example. The GUI theme file generally includes resources such as a picture and a text, and may present GUI theme content to a user, so as to provide a reference for the user to set a GUI theme of a terminal device. However, during actual application, it is found that even if a plurality of optional GUI theme files are set in the terminal device, many users do not actively view or set a GUI theme. Before changing to a new terminal device, these users may all use a default GUI theme of a system of the terminal device. For a GUI theme file updated when the user uses the terminal device, a probability that the GUI theme file is viewed and applied is even lower. For another example, many applications store some term information in user notice, and the terms information may be used to notify the user of some matters that need to be paid attention to. But in an actual situation, most users skip the terms information to use the applications.

In embodiments of this application, content of a terminal device is classified into two types based on whether the content can be viewed or used by using an application program.

First type of content: The content belongs to an application program, and a user may view or use the content by performing an operation on the application program. For example, the content is a function such as a one-touch beautification function in some photographing application programs that has a displayable control in an application program. For another example, the content is picture and text information in a chat box in a social application program or term information in user notice in an application program.

Second type of content: The content belongs to some application program, but a user cannot view or use the content by performing an operation on a displayable function of the application program. Alternatively, the content belongs to an operating system of a terminal device, and a user cannot view or use the content by using a displayable function of the operating system. This type of content requires some specific triggering manners to invoke the content. For example, the terminal device starts a data transmission management function when being connected to another device. For another example, there are some resources that can be invoked only in a specific triggering manner. Assuming that if a power button is pressed for three consecutive times, hardware configuration information of a terminal device may be invoked.

In addition, in embodiments of this application, content that needs to be prompted is referred to as to-be-prompted content (that is, first content).

For to-be-prompted content belonging to the first type, a startup icon of an application program to which the to-be-prompted content belongs is divided into two or more areas, and one or more areas are selected from the two or more areas as associated areas of the to-be-prompted content in embodiments of this application. When a user operates a non-associated area of the startup icon, an interface of the application program is normally started in embodiments of this application. However, when the user operates the associated area of the startup icon, an interface that can be used to provide a prompt for the to-be-prompted content is displayed in embodiments of this application. The interface includes any one or more of the to-be-prompted content, a control that can invoke the to-be-prompted content, and a control used to describe the to-be-prompted content. In this case, the user can fully pay attention to the to-be-prompted content. When the interface includes a control for describing the to-be-prompted content, a description resource of the to-be-prompted content is obtained by using the control for the user, and the description resource of the to-be-prompted content is displayed, so as to help the user understand the to-be-prompted content. If the interface includes a control that can invoke to-be-prompted content, and the user operates the control, in embodiments of this application, the to-be-prompted content is invoked for presentation, to help the user view or use the to-be-prompted content. In embodiments of this application, to-be-prompted content of an application program that needs to be prompted is separately presented on a startup icon, so that a user can fully notice the to-be-prompted content, and a probability that the user views or uses the to-be-prompted content is increased. After the associated area is operated, the to-be-prompted content and description of the to-be-prompted content are independently presented, so that the user can understand, view, or use the to-be-prompted content according to an actual requirement. In this way, the user can gradually get familiar with the prompt content. This improves subsequent usage of the to-be-prompted content by the user.

For to-be-prompted content belonging to the second type, when detecting a corresponding triggering instruction, a terminal device searches for all content corresponding to the triggering instruction. If the content includes only the to-be-prompted content, an interface that can present the to-be-prompted content is presented. The to-be-prompted content may be displayed in a manner of displaying any one or more of the to-be-prompted content in the interface, a control that can invoke the to-be-prompted content, and a control that is used to describe the to-be-prompted content. In this way, after triggering the to-be-prompted content, the user can intuitively learn of a feature of the to-be-prompted content and view or use the to-be-displayed content. Therefore, interest of the user in the to-be-prompted content is improved, and usage of the to-be-prompted content is improved. If the trigger operation corresponds to a plurality of pieces of content including to-be-prompted content, in embodiments of this application, an interface including both a control that can invoke the to-be-prompted content and a control that can invoke other corresponding content is displayed. In addition, the interface may also include one control that can describe the content. In this way, based on invoking the original content, the user can intuitively learn of a feature of the to-be-prompted content and view or use the to-be-displayed content. Therefore, interest of the user in the to-be-prompted content is improved, and usage of the to-be-prompted content is improved.

In embodiments of this application, to-be-prompted content is classified into a to-be-prompted function (that is, a first function) and a to-be-prompted object. The to-be-prompted function means a function that needs to be prompted in the terminal device. The to-be-prompted object means other content that needs to be prompted in the terminal device other than the function, for example, various resources such as audios, videos, pictures, and texts in the terminal device, or some message-type content.

For example, the to-be-prompted content is a to-be-prompted function. Corresponding to content classification, in embodiments of this application, functions are classified into two types:

First type of function: An application program to which a function belongs has a start icon, and the function also has a displayable control in an interface of the application program.

Second type of function: An application program to which a function belongs does not have a startup icon, and in this case, the function does not have a displayable control. Alternatively, the function is a function in an operating system of the terminal device, and does not have a displayable control.

For the first type of to-be-prompted function, a startup icon of an application program to which the to-be-prompted function belongs is pre-divided into two or more areas, and one or more areas are selected from the two or more areas as associated areas of the to-be-prompted function in embodiments of this application. When a user operates a non-associated area of the startup icon, the application program is normally started in embodiments of this application. However, when the user operates the associated area of the startup icon, an interface including a control of the to-be-prompted function is displayed in embodiments of this application. In addition, the interface may also include a control (referred to as a demonstration control) used to perform function demonstration on a to-be-prompted function. In this case, the user can fully pay attention to the to-be-prompted function. When the interface includes a control for function demonstration, the user may obtain a demonstration resource of the to-be-prompted function by using the control, to help the user learn to use the to-be-prompted function. When the user operates the control of the to-be-prompted function, the user enters an operation interface of the to-be-prompted function, so that the user can start to use the to-be-prompted function. In embodiments of this application, the to-be-prompted function is separately presented on a startup icon, so that the user can fully notice the to-be-prompted function, and a probability that the user views or uses the to-be-prompted function is increased. After the associated area is operated, the to-be-prompted function and the function demonstration are independently presented (that is, the to-be-prompted function is described in a function demonstration manner in this embodiment of this application), so that the user can learn of or use the to-be-prompted function according to an actual requirement. In this way, the user can gradually get familiar with the to-be-prompted function. This improves subsequent usage of the to-be-prompted function by the user.

In consideration of an actual situation, the second type of to-be-prompted function may also include two different cases: 1. In a function triggering manner corresponding to the to-be-prompted function, only the to-be-prompted function is enabled, and another function is not enabled. For example, when a function of "tapping the screen for three consecutive times to take a full-screen screenshot of the screen" is newly developed, because the function triggering manner of tapping a screen for three consecutive times originally does not correspond to any function, another function is not enabled in the triggering manner of the screenshot function. 2. In a function triggering manner corresponding to the to-be-prompted function, some other functions may originally be triggered. In this case, this triggering manner may correspond to a plurality functions simultaneously. For example, assuming that based on the function of "tapping the screen for three consecutive times to take a full-screen screenshot of the screen", a to-be-prompted function of "tapping the screen for three consecutive times to adjust the screen brightness to the highest" is added. In this case, after the user taps the screen for three consecutive times, the two functions may be triggered at the same time.

For the foregoing two cases of the second type of to-be-prompted function, in embodiments of this application, when receiving a function triggering instruction, the terminal device searches for all functions pointed to by the function triggering instruction. If it is found that only the to-be-prompted function is pointed to, an interface including a control of the to-be-prompted function is displayed. In addition, the interface may also include a control used to perform function demonstration on the to-be-prompted function. In this way, after triggering the to-be-prompted function, the user can intuitively learn a feature of the to-be-prompted function and use the to-be-prompted function. Therefore, interest of the user in the to-be-prompted function is improved, and usage of the to-be-prompted function is improved. If it is found that both the to-be-prompted function and the another function are pointed to, an interface including both a control for starting the another function and a control for starting the to-be-prompted function is displayed. In addition, the interface may also include a control used to perform function demonstration on the to-be-prompted function. In this way, on the basis that the user can normally use an original function, the user can intuitively learn of a feature of the to-be-prompted function and use the to-be-prompted function. Therefore, interest of the user in the to-be-prompted function is improved, and usage of the to-be-prompted function is improved.

In addition, it should be noted that, during actual application, there may be a plurality of operation manners such as tapping, pressing and holding, and dragging for icons, controls, and the like. When the user operates an icon or a control in these operation manners, an operation event corresponding to the terminal device is triggered, and the terminal device performs different response operations. However, during actual application, based on different system settings of terminal devices, response operations corresponding to the operation event by different terminal devices may be different to some extent. For example, terminal device A may be set to start an application program or a function corresponding to an icon A when the icon A is tapped. A terminal device B may be set to start an application program or a function corresponding to an icon when the icon is pressed and held for 3 seconds. For a control B, the terminal device A may be set to enable a function corresponding to the control when the control B is tapped. The terminal device B may be set to enable a function corresponding to the control B when the control B is dragged to a specified area of the interface. Therefore, according to different actual system settings of the terminal device, operation manners of starting icons and controls may also be different. This may be specifically determined based on an actual scenario, and is not limited herein.

For ease of description, in each embodiment of this application, an example in which an application program or a function corresponding to a startup icon may be started by tapping the startup icon, and a function corresponding to a control may be started by tapping the control is used for description. During actual application, a tap operation may also be replaced with another type of operation based on a system setting status of a terminal device in an actual scenario, so as to detect operations on the startup icon and the control. Details are not described in embodiments of this application.

Prompt methods provided in embodiments of this application are performed by a terminal device. In addition, a specific type of the terminal device is not limited in embodiments of this application, and may be specifically determined based on an actual application scenario.

For example, the terminal device is a mobile phone. FIG. 1A is a schematic diagram of a structure of a mobile phone 100.

The mobile phone 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a gyroscope sensor 180A, an acceleration sensor 180B, a barometric pressure sensor 180C, a magnetic sensor 180D, an ambient optical sensor 180E, an optical proximity sensor 180G, a fingerprint sensor 180H, a temperature sensor 180J, and a touch sensor 180K (certainly, the mobile phone 100 may further include other sensors such as a temperature sensor, a pressure sensor, a distance sensor, a barometric pressure sensor, and a bone conduction sensor, which are not shown in the figure).

It may be understood that the structure shown in this embodiment of the present application does not constitute a specific limitation on the mobile phone 100. In some other embodiments of this application, the mobile phone 100 may include more or fewer components than the components shown in the figure, some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the mobile phone 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access and reduces a waiting time of the processor 110, and improves system efficiency.

The processor 110 may run the prompt method provided in embodiments of this application, to prompt the user to use a new function, thereby improving usage of the new function and improving user experience. The processor 110 may include different components. For example, when a CPU and a GPU are integrated, the CPU and the GPU may cooperate to perform the prompt method provided in embodiments of this application. For example, in the prompt method, some algorithms are executed by the CPU, and other algorithms are executed by the GPU, to obtain high processing efficiency.

The mobile phone 100 may implement a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs configured to execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 100 may include one or N displays 194, where N is a positive integer greater than 1. The display 194 may be configured to display information input by a user or information provided to a user, and various graphical user interfaces (GUI). For example, the display 194 may display a photo, a video, a web page, a file, or the like. For another example, the display 194 may display a graphical user interface. The graphical user interface includes a status bar, a navigation bar that can be hidden, a time and weather widget, and an application icon, for example, a browser icon. The status bar includes an operator name (for example, China Mobile), a mobile network (for example, 4G), time, and a battery level. The navigation bar includes an icon of a back button, an icon of a home button, and an icon of a forward button. In addition, it may be understood that, in some embodiments, the status bar may further include a Bluetooth icon, a Wi-Fi icon, an icon of an externally-connected device, and the like. It may be further understood that, in some other embodiments, the graphical user interface may further include a dock bar, and the dock bar may include an icon of a frequently-used application and the like. After the processor detects a touch event of a user on an application icon by using a finger (a stylus or the like), in response to the touch event, the processor starts a user interface of an application corresponding to the application icon, and displays the user interface of the application on the display 194.

In embodiments of this application, the display 194 may be one integrated flexible display, or may be a splicing display including two rigid screens and one flexible screen located between the two rigid screens. After the processor 110 runs the prompt method provided in embodiment of this application, the processor 110 may control an external audio output device to switch an output audio signal.

The camera 193 (a front-facing camera, a rear-facing camera, or a camera that may serve as both a front-facing camera and a rear-facing camera) is configured to capture a static image or a video. Generally, the camera 193 may include a photosensitive element such as a lens module and an image sensor. The lens module includes a plurality of optical lenses (concave lenses or convex lenses), configured to capture an optical signal reflected by a to-be-photographed object and transmit the captured optical signal to the image sensor. The image sensor generates an original image of the to-be-photographed object based on the optical signal.

The internal memory 121 may be configured to store computer-executable program code. The executable program code includes instructions. The processor 110 runs the instructions stored in the internal memory 121, to run various function applications and perform data processing of the mobile phone 100. The internal memory 121 may include a program storage area and a data storage area. The program storage area may store code of an operating system, an application (for example, a camera application or a WeChat application), and the like. The data storage area may store data (for example, an image or a video collected by the camera application) created during use of the mobile phone 100 and the like.

The internal memory 121 may further store one or more computer programs 1210 corresponding to the prompt method provided in embodiments of this application. The one or more computer programs 1210 are stored in the memory 121 and are configured to be executed by the one or more processors 110. The one or more computer programs 1210 include instructions. The instructions may instruct to perform each step in corresponding embodiments in FIG. 2A to FIG. 6D. The computer program 1210 may include an account verification module 1211 and a priority comparison module 1212. The account verification module 1211 is configured to verify a system authentication account of another terminal device in a local area network. The priority comparison module 1212 may be configured to compare a priority of an audio output request service with a priority of a current output service of an audio output device. A status synchronization module 1213 may be configured to synchronize a device status of an audio output device currently connected to the terminal device to another terminal device, or locally synchronize a device status of an audio output device currently connected to another device. When the code of the prompt method stored in the internal memory 121 is run by the processor 110, the processor 110 may control the terminal device to process related data.

In addition, the internal memory 121 may include a high speed random access memory, or may include a nonvolatile memory, for example, at least one magnetic disk storage device, a flash storage device, or a universal flash storage (UFS).

Certainly, code of the prompt method provided in embodiments of this application may alternatively be stored in an external memory. In this case, the processor 110 may run, through an external memory interface 120, the code of the prompt method stored in the external memory, and the processor 110 may control the terminal device to process related data.

The following describes functions of the sensor module 180.

The gyroscope sensor 180A may be configured to determine a motion posture of the mobile phone 100. In some embodiments, an angular velocity of the mobile phone 100 around three axes (namely, axes x, y, and z) may be determined by using the gyroscope sensor 180A. In other words, the gyroscope sensor 180A may be configured to detect a current motion state of the mobile phone 100, for example, a shaking or static state.

When the display in embodiments of this application is a foldable screen, the gyroscope sensor 180A may be configured to detect a folding or unfolding operation performed on the display 194. The gyroscope sensor 180A may report the detected folding operation or unfolding operation to the processor 110 as an event, to determine a folded state or an unfolded state of the display 194.

The acceleration sensor 180B may detect values of accelerations in various directions (usually in directions of the three axes) of the mobile phone 100. In other words, the gyroscope sensor 180A may be configured to detect a current motion state of the mobile phone 100, for example, a shaking or static state. When the display in embodiments of this application is a foldable screen, the acceleration sensor 180B may be configured to detect a folding or unfolding operation performed on the display 194. The acceleration sensor 180B may report the detected folding operation or unfolding operation to the processor 110 as an event, to determine a folded state or an unfolded state of the display 194.

The optical proximity sensor 180G may include, for example, a light-emitting diode (LED) and an optical detector such as a photodiode. The light-emitting diode may be an infrared light-emitting diode. The mobile phone emits infrared light by using the light emitting diode. The mobile phone detects infrared reflected light from a nearby object by using the photodiode. When sufficient reflected light is detected, it may be determined that there is an object near the mobile phone. When insufficient reflected light is detected, the mobile phone may determine that there is no object near the mobile phone. When the display in this embodiment of this application is a foldable screen, the optical proximity sensor 180G may be disposed on a first screen of the foldable display 194, and the optical proximity sensor 180G may detect a magnitude of an angle between the first screen and a second screen in a folded or unfolded state based on an optical path difference between infrared signals.

The gyroscope sensor 180A (or the acceleration sensor 180B) may send detected motion status information (for example, an angular velocity) to the processor 110. The processor 110 determines, based on the motion status information, whether the mobile phone is currently in a handheld state or a tripod state (for example, when the angular velocity is not 0, it indicates that the mobile phone 100 is in the handheld state).

The fingerprint sensor 180H is configured to collect a fingerprint. The electronic device 100 may use a feature of the collected fingerprint to implement fingerprint unlocking, application access locking, fingerprint-based photographing, fingerprint-based call answering, and the like.

The touch sensor 180K is also referred to as a "touch panel". The touch sensor 180K may be disposed in the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the mobile phone 100 at a location different from a location of the display 194.

For example, the display 194 of the mobile phone 100 displays a home screen, and the home screen includes icons of a plurality of applications (for example, a camera application and a WeChat application). The user taps an icon of a camera application on a home screen by using the touch sensor 180K, to trigger the processor 110 to start the camera application and turn on the camera 193. The display 194 displays an interface of the camera application, for example, a viewfinder interface.

A wireless communications function of the mobile phone 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone 100 may be configured to cover one or more communication bands. Different antennas may be multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the mobile phone 100, to wireless communication including 2G, 3G, 4G, 5G, and the like. The mobile communications module 150 may include at least two filters, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same component as at least some modules in the processor 110. In this embodiment of this application, the mobile communications module 150 may be further configured to exchange information with another terminal device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in the same component as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2. In this embodiment of this application, the wireless communications module 160 may be configured to access an access point device, and send and receive a message to and from another terminal device.

In addition, the mobile phone 100 may implement an audio function, for example, music playing and recording, by using the audio module 170, the speaker 170A, the receiver 170B, the microphone 170C, the headset jack 170D, the application processor, and the like. The mobile phone 100 may receive an input of the button 190, and generate a button signal input related to a user setting and function control of the mobile phone 100. The mobile phone 100 may generate a vibration prompt (for example, an incoming call vibration prompt) by using the motor 191. The indicator 192 in the mobile phone 100 may be an indicator light, and may be configured to indicate a charging status and a power change, or may be configured to indicate a message, a missed call, a notification, and the like. The SIM card interface 195 in the mobile phone 100 is configured to connect to a SIM card. The SIM card may be inserted into the SIM card interface 195 or removed from the SIM card interface 195, to come into contact with or be separated from the mobile phone 100.

It should be understood that during actual application, the mobile phone 100 may include more or fewer components than those shown in FIG. 1A. This is not limited in this embodiment of this application. The mobile phone 100 shown in the figure is only an example, and the mobile phone 100 may have more or fewer components than those shown in the figure, two or more components may be combined, or different component configurations may be used. Components shown in the figure may be implemented by hardware including one or more signal processing and/or application-specific integrated circuits, software, or a combination of hardware and software.

Figure 1B:
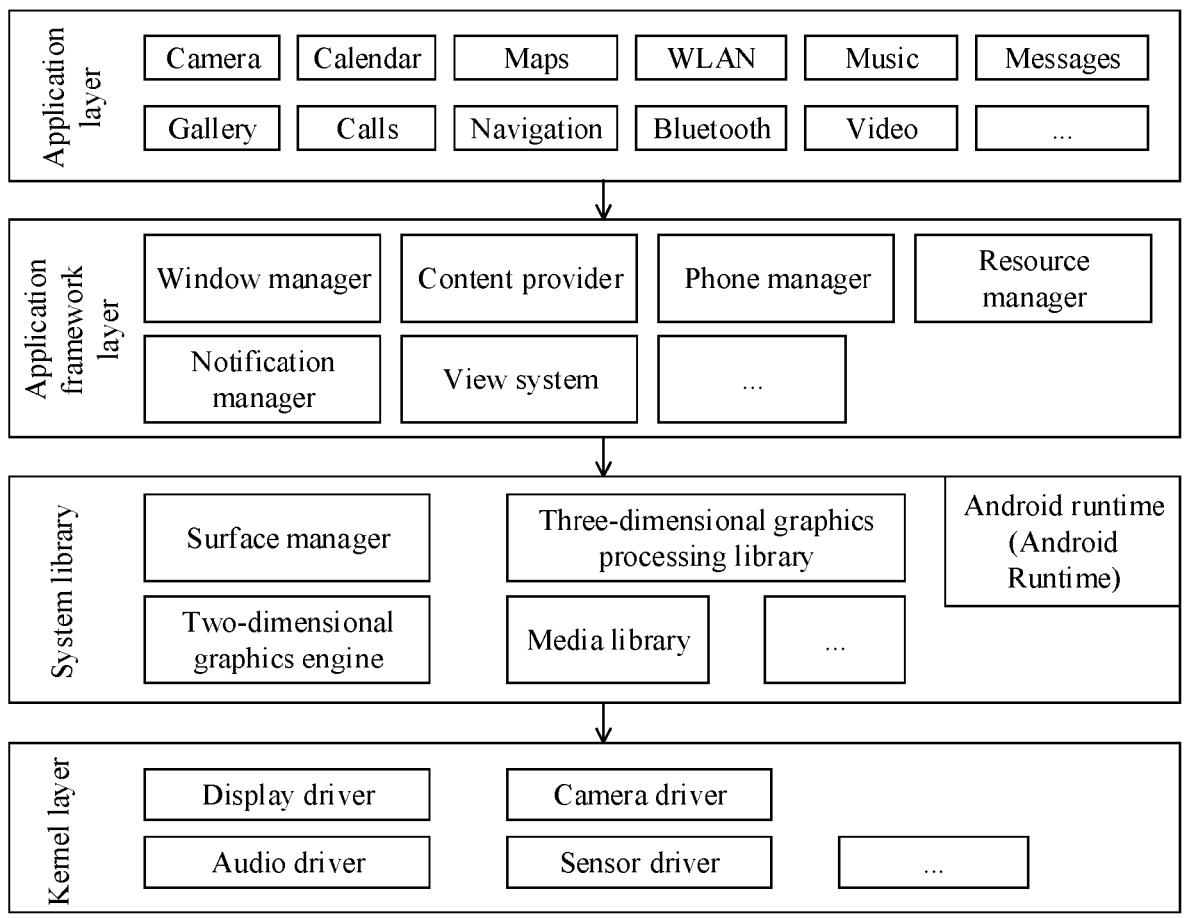
FIG. 1B is a block diagram of a software structure of a terminal device according to an embodiment of this application.

A software system of a terminal device may use a layered architecture, an event-driven architecture, a microkernel architecture, a micro service architecture, or a cloud architecture. In embodiments of the present application, an Android system with a layered architecture is used as an example to describe a software structure of the terminal device. FIG. 1B is a block diagram of a software structure of a terminal device according to an embodiment of the present application.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 1B, the application packages may include applications such as Dialer, Camera, Gallery, Calendar, Phone, Map, Navigation, WLAN, Bluetooth, Music, Videos, and Massages.

The application framework layer provides an application programming interface (API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be configured to construct an application program. A display interface may include one or more views. For example, a display layout including an SMS message notification icon may include a text display view and an image display view.

The phone manager is used to provide a communication function of the terminal device, for example, management of a call state (including answering or hanging up).

The resource manager provides various resources such as a localized character string, an icon, an image, a layout file, and a video file for an application.

The notification manager enables an application to display notification information in a status bar, and may be configured to convey a notification type message. The notification manager may automatically disappear after a short pause without requiring a user interaction. For example, the notification manager is used to notify download completion, give a message notification. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in a status bar, an alert sound is played, a terminal device vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports play and recording in a plurality of commonly used audio and video formats, static image files, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

To describe technical solutions in this application, the following uses an example in which to-be-prompted content is a to-be-prompted function for description with reference to specific embodiments.

Figure 2A:
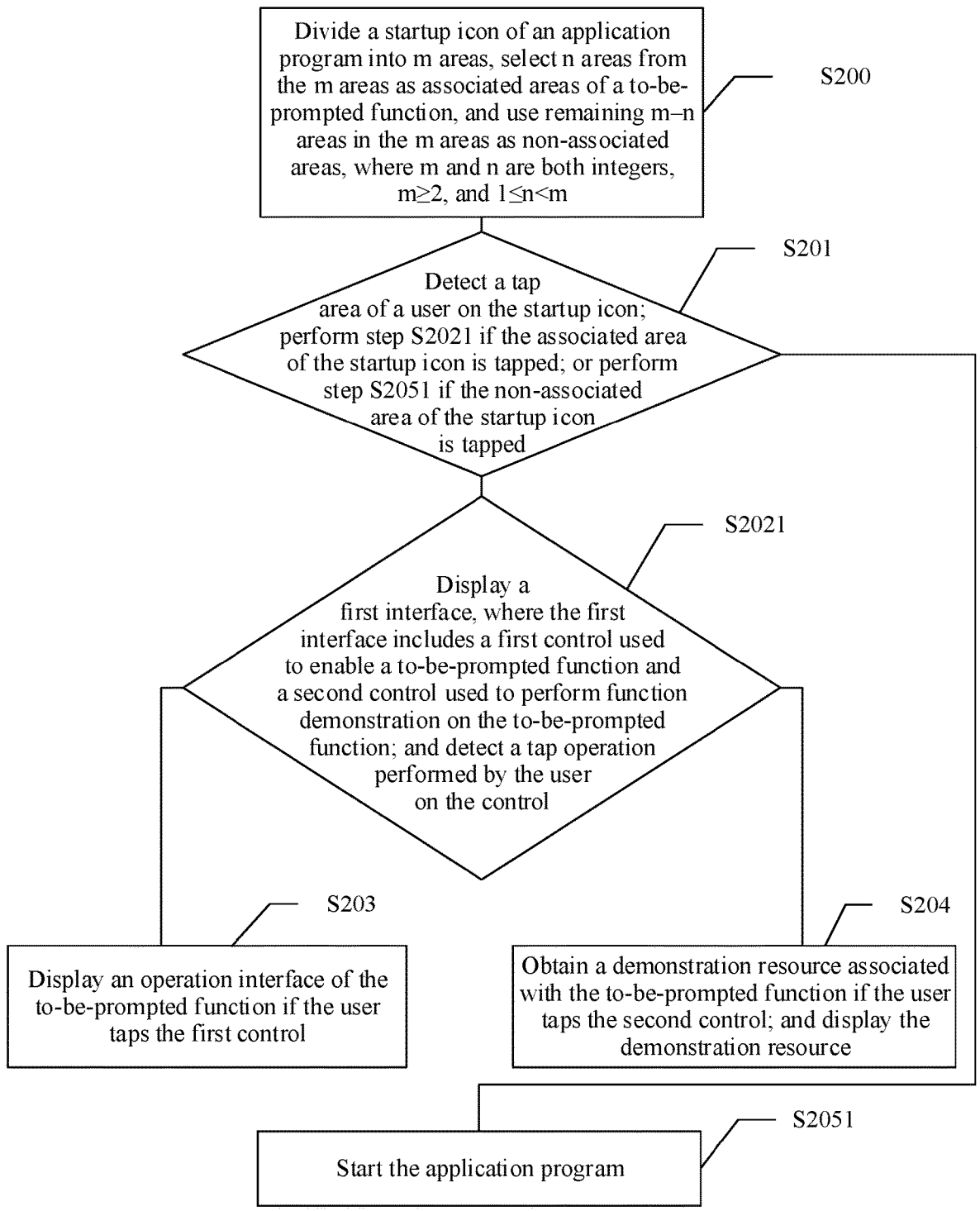
FIG. 2A is a schematic flowchart of a prompt method according to an embodiment of this application.

For the first type of to-be-prompted function, FIG. 2A is an implementation flowchart of a prompt method according to an embodiment of this application. S200 to S2051 in FIG. 2A are described in detail as follows:

S200: Divide a startup icon of an application program into m areas, select n areas from the m areas as associated areas of a to-be-prompted function, and use remaining m-n areas in the m areas as non-associated areas, where m and n are both integers, m≥2, and 1≤n<m.

In this embodiment of this application, the to-be-prompted function may be a to-be-prompted new function or an original old function in a terminal device. Specifically, the to-be-prompted function may be selected and set by a person skilled in the art based on an actual requirement. This is not limited herein.

In embodiments of this application (including the embodiment shown in FIG. 4A), an example in which the to-be-prompted function is a new function is used for description. However, it should be understood that, in a scenario in which the to-be-prompted function is an old function, after the to-be-prompted function is replaced with the old function from the new function, embodiments of this application are also applicable. Therefore, a scenario in which the to-be-prompted function is an old function is not described in embodiments of this application.

During actual application, a new function generally means a new function that appears in a terminal device after an operating system of the terminal device updates a function or after an application program updates a function. For example, when a terminal device updates an operating system or updates an operating system patch, some new functions are generally added to the operating system. For another example, after an application program is updated, some new functions may also be added. However, "new" and "old" are two relative concepts. After a period of time or a specific number of times, a new function becomes an old function. Therefore, it may be difficult to accurately distinguish whether a function is a new function only according to the foregoing standard. To achieve quantitative differentiation between new functions and old functions, during actual application, a person skilled in the art may select some functions of the terminal device as new functions in embodiments of this application based on an actual requirement.

Alternatively, a set of policies that can be used to distinguish between old and new functions may be set, so that the terminal device can accurately distinguish new functions. Content of a specific new function distinguishing policy is not limited herein, and may be set by a person skilled in the art based on an actual application requirement.

In an optional embodiment of this application, the new function may be distinguished in the following manner.

When performing function updating on an operating system and applications, R&D personnel add a specific identity to an updated function. When distinguishing between an old function and a new function, the terminal device uses a function with the specific identity as a new function in this embodiment of this application. A data type and an adding manner of the specific identity are not limited herein, and may be set by the R&D personnel based on an actual requirement. In addition, to prevent a function from being continuously identified as a new function because the function always carries the specific identity, a corresponding set of deletion rules for the specific identity may also be set. For example, it may be set that a specific identity of a new function is deleted when total duration in which the new function exists on a terminal device reaches a preset duration threshold. For example, it may be set that the carried specific identity is deleted when the new function exists on the terminal device for one month. For another example, it may alternatively be set that a specific identity is deleted when a total number of times that a new function is used reaches a preset number-of-times threshold. For example, it may be set that the carried specific identity is deleted when the total number of times of using the new function reaches 10. Both the preset duration threshold and the preset number-of-times threshold may be set by a person skilled in the art based on an actual requirement. In another optional embodiment of this application, a specific identity may not be added, but a function updated each time is recorded in a form of a new function list. In this case, a function in the new function list may be processed as a new function in this embodiment of this application. Correspondingly, when a new function needs to be used as an old function, the new function needs to be removed from the new function list.

Correspondingly, in a scenario in which an old function needs to be prompted, a person skilled in the art needs to select a to-be-prompted old function in advance, or set a rule for determining the to-be-prompted old function. A rule for determining the to-be-prompted old function is not excessively limited herein, and may be set by a person skilled in the art. For example, in some optional embodiments, a rule for determining a to-be-prompted old function may be set as follows: An old function with lowest total usage in all old functions in an application program is used as the to-be-prompted old function.

In this embodiment of this application, before a new function is prompted, a startup icon of an application program is divided into a plurality of areas in advance. A specific area division rule and a quantity of areas are not limited herein, and may be set by a person skilled in the art based on an actual requirement. However, it needs to be ensured that at least two different areas are divided.

Figure 2B:
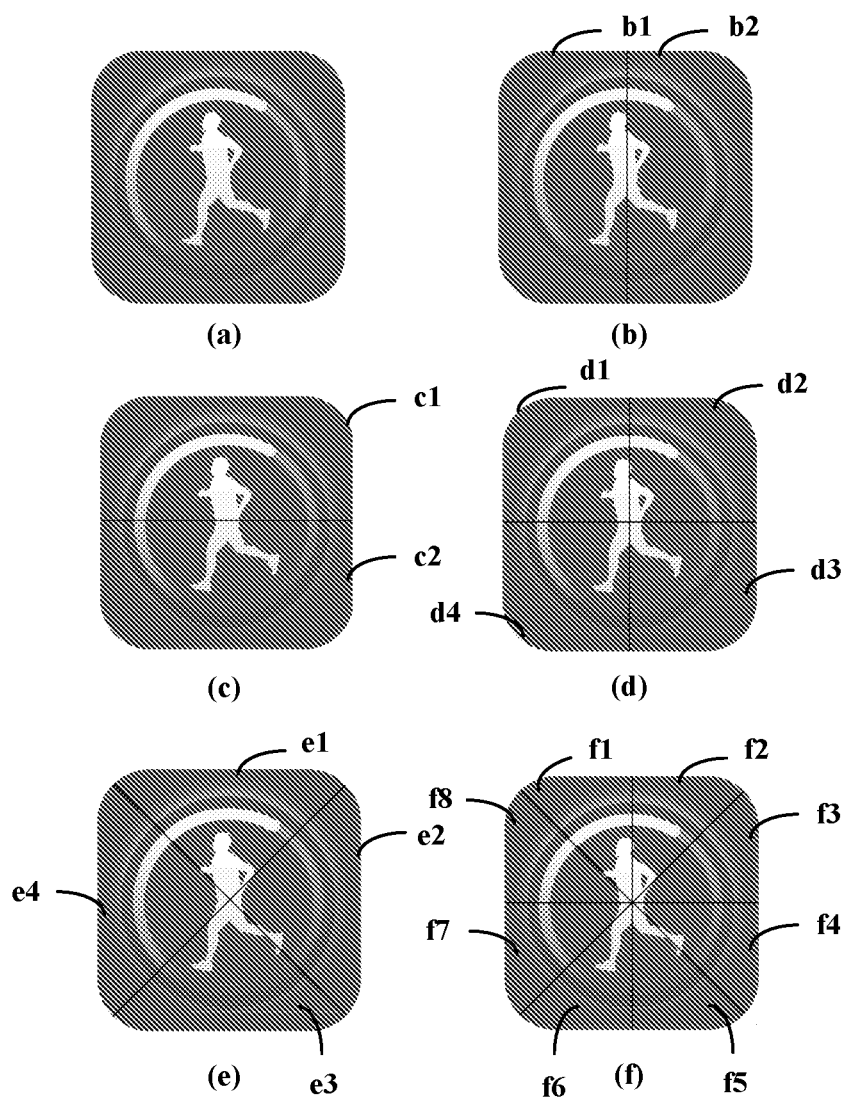
FIG. 2B is a schematic diagram of an application scenario according to an embodiment of this application.
Figure 2C:
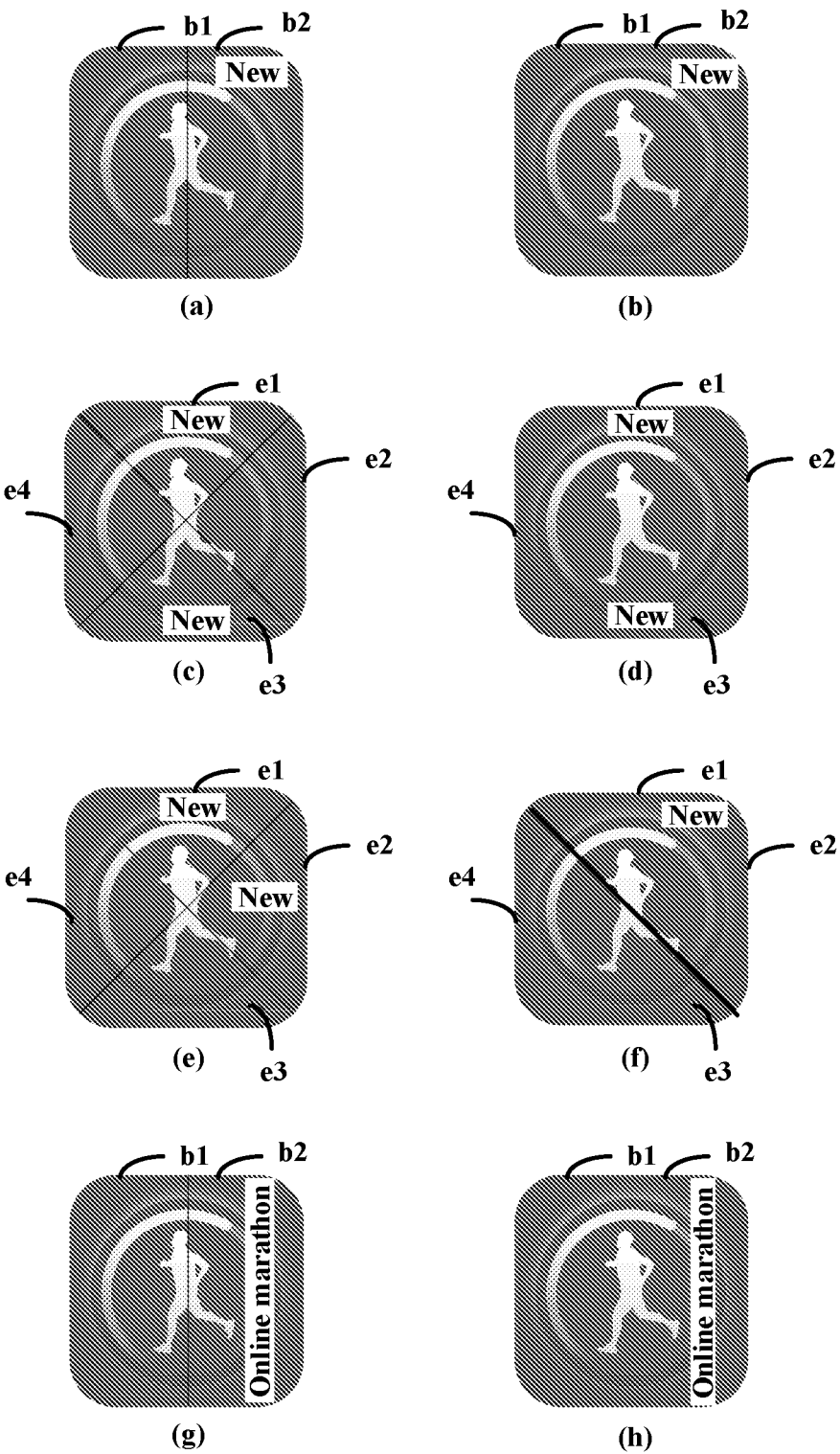
FIG. 2C is a schematic diagram of an application scenario according to an embodiment of this application.
Figure 2D:
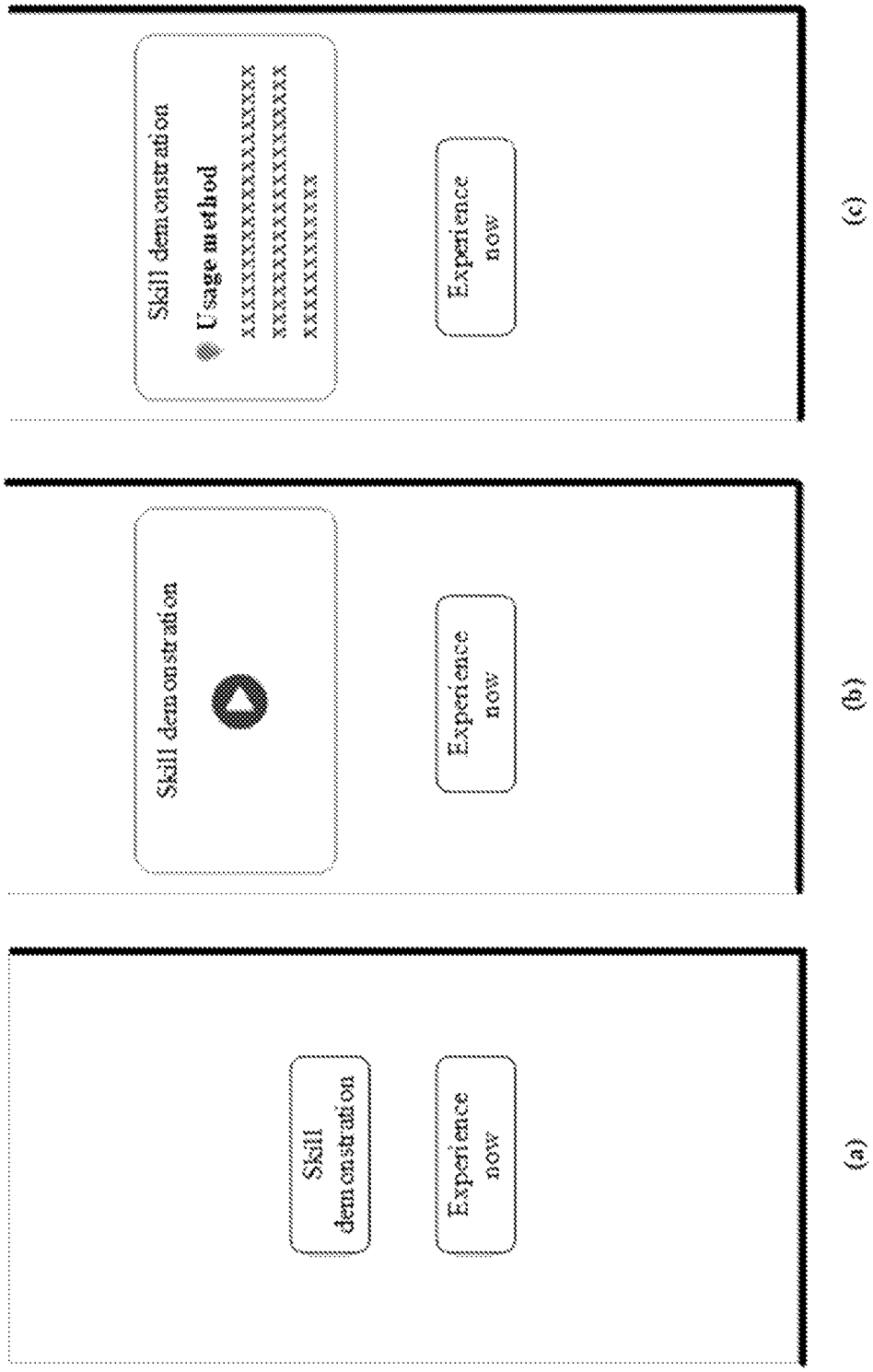
FIG. 2D is a schematic diagram of an application scenario according to an embodiment of this application.
Figure 2E:
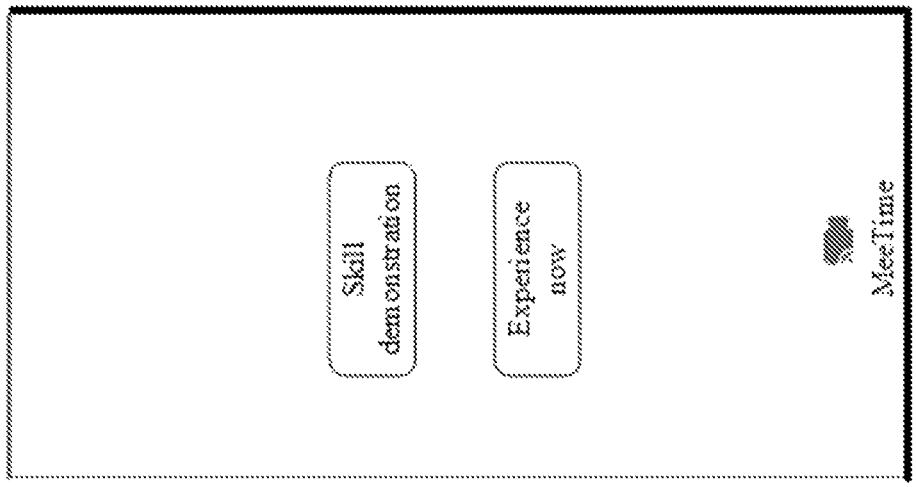
FIG. 2E is a schematic diagram of an application scenario according to an embodiment of this application.
Figure 2E:
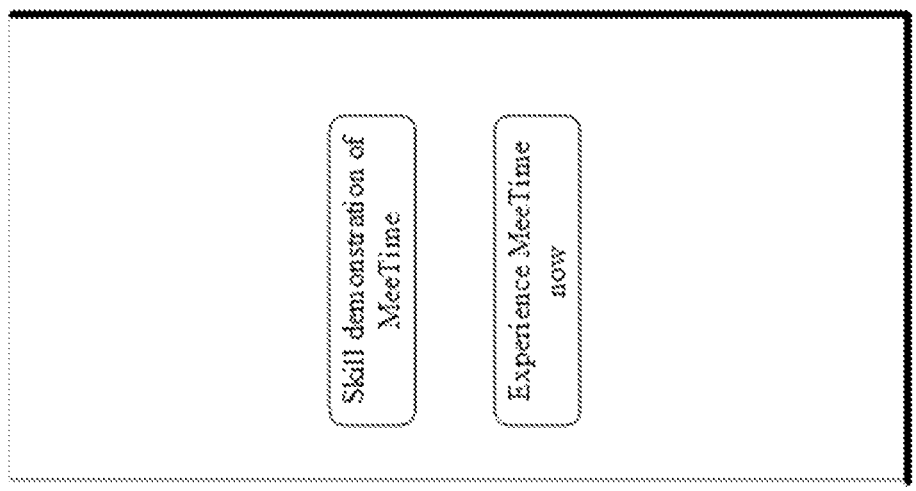
Figure 2E:
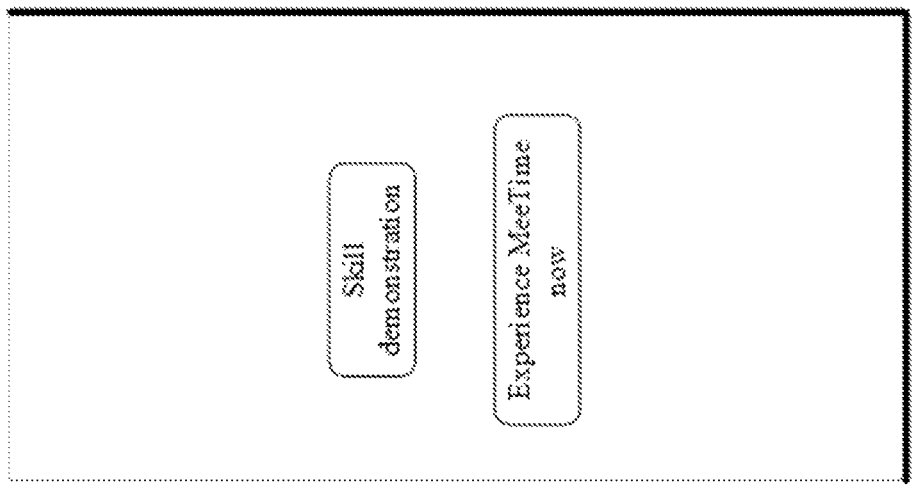

An example is used for description. Refer to FIG. 2B. It is assumed that (a) is an original startup icon, and (b), (c), (d), (e), and (f) are areas obtained with reference to five different division rules. Black lines are dividing lines between areas. In (b), the icon is divided into a b1 area and a b2 area. In (c), the icon is divided into a c1 area and a c2 area. In (d), the icon is divided into areas d1, d2, d3, and d4. In (e), the icon is divided into areas e1, e2, e3, and e4. In (f), the icon is divided into areas f1, f2, f3, f4, f5, f6, f7, and f8. In this embodiment of this application, any one of the foregoing five division rules may be selected as an actually used division rule. Similarly, a person skilled in the art may also design another division rule different from the foregoing five division rules to perform startup icon division, and obtain a corresponding quantity of areas. To reduce operation workload in S200, the startup icon may be divided into only two areas, for example, (b) and (c) in FIG. 2B.

After area division of the startup icon is completed, in this embodiment of this application, these areas are further divided into two types: one type is an associated area (which may also be referred to as a first area), and the other type is a non-associated area (which may also be referred to as a second area). The following requirements need to be met:
1. Both the associated area and the non-associated area include at least one area obtained by dividing a startup icon area, that is, neither of the associated area and the non-associated area can be an empty set, so that the user can perform operations on the two areas normally.
2. The associated area and the non-associated area do not overlap.

When the foregoing requirements are met, the area classification rule is not excessively limited in this embodiment of this application, and may be selected or set by a person skilled in the art based on an actual requirement. For example, for the embodiment shown in FIG. 2B, in (b), either area in b1 and b2 may be set as an associated area, and the other area may be set as a non-associated area. For (d), any one or three of the areas d1, d2, d3, and d4 may be set as associated areas, and the remaining may be used as non-associated areas. For (f), any one to seven areas among the areas f1, f2, f3, f4, f5, f6, f7, and f8 may be set as associated areas, and the remaining areas are used as non-associated areas.

The startup icon of the application is originally a whole area. After area division is performed in S200, if a user is not informed of division-related information, an area on which the user performs an operation is random. In this case, there may be several problems: 1. The user does not know specific functions corresponding to different areas of the startup icon. If the function is randomly enabled each time, it is easy to make the user think that the application program is faulty. In addition, it is difficult for the user to accurately start a required function. Therefore, user experience is greatly reduced, and the user resists a new function or even an entire application program. This is not conducive to improve usage of the new function. 2. Even if the user wants to experience the new function, because the user does not know which area corresponds to the new function, the new function cannot be started in time.

In an optional embodiment of this application, to prevent the foregoing problem, a prompt identity is added to an associated area of a startup icon, to notify a user that the area is an area corresponding to a new function. A type of the prompt identity and a specific adding manner are not limited in this embodiment of this application. In addition, whether different areas of the startup icon are displayed differently is not limited. All may be set by a person skilled in the art based on an actual requirement. For example, the prompt identity may be set to a character such as "new" or "New". In addition, division lines can be drawn for different areas on the startup icon to help a user distinguish different areas.

An example is used for description. Reference may be made to six startup icon display manners from (a) to (f) in FIG. 2C, where a black line is a dividing line between areas. In this embodiment of this application, "new" is selected as the prompt identity, and "new" is placed in the associated area of the startup icon for display.

In (a) and (b), the startup icon is divided into two areas: b1 and b2, and the area b2 is classified into the associated area. The difference lies in that the dividing line for the areas b1 and b2 is retained in (a). In this case, the user may know an actual location of the associated area in the startup icon more intuitively.

In (c) and (d), the startup icon is divided into four areas: e1, e2, e3, and e4, and the areas e1 and e3 are classified into associated areas. The difference also lies in whether to retain dividing lines.

In (e) and (f), the startup icon is also divided into four areas: e1, e2, e3, and e4, but the areas e1 and e2 are classified into the associated area. In this case, because the two areas are adjacent, when the prompt identity is set, a prompt identity may be set in each associated area, as shown in (e). Alternatively, a dividing line between adjacent associated areas may not be displayed, and only one prompt identity is displayed in the adjacent associated areas, as shown in (f). All dividing lines can alternatively be hidden. In this case, the startup icon can be displayed more concisely, and a visual effect of the display can be improved.

However, in another optional embodiment of this application, some related information of a new function may also be selected based on an actual situation of the new function, such as a character, a pattern, or an identity related to the new function. The selected related information in an associated area of a startup icon is displayed, so as to notify a user of some information related to the new function while notifying the user that the area is an area corresponding to the new function. For example, it is assumed that a function of scanning QR code for payment is added to an application program. In this case, a character related to scan-to-pay, such as "pay" or "payment", may be used as related information and displayed in an associated area of a startup icon. Alternatively, a two-dimensional code pattern may be set as related information, and the two-dimensional code pattern is displayed in an associated area of a startup icon. A type, a selection manner, and an adding manner of the related information is not excessively limited in this embodiment of this application. In addition, whether different areas of the startup icon are displayed differently is not limited. All may be set by a person skilled in the art based on an actual requirement.

An example is used for description. Reference may be made to (g) and (h) in FIG. 2C. Black lines are dividing lines between areas. In this embodiment of this application, it is assumed that the new function is a running recording function that can be used to link with another user online. In this way, a plurality of users can run marathons offline and share and view running data online. In addition, "Online marathon" is selected as related information of the new function, and "Online marathon" is displayed in the associated area of the startup icon.

In (g) and (h), the startup icon is divided into two areas: b1 and b2, and the area b2 is classified into the associated area. The difference lies in that the dividing line for the areas b1 and b2 is retained in (a). In this case, the user may know an actual location of the associated area in the startup icon more intuitively. In addition, through the "Online marathon", the user can intuitively learn that the new function is a function related to running a marathon.

S201: Detect a tap area of a user on the startup icon; and perform step S2021 if the associated area of the startup icon is tapped; or perform step S2051 if the non-associated area of the startup icon is tapped.

On a basis that the operation in S200 is completed, if the user uses a terminal device and taps the start icon of the application program, in this case, the terminal device detects a specific tapping area of the tap operation of the user, and performs corresponding operations based on different tapping areas. According to different hardware configurations of the terminal device and actual operation manners of the user, there may be a plurality of implementations of tapping the startup icon, for example:

1. A terminal device has a touchable display, and displays a startup interface by using the display, and a user taps the startup icon by performing a touchscreen operation.
2. A terminal device has a display, and displays a startup icon by using the display. A user taps the startup icon in a non-touchscreen manner. For example, when a user operates a computer by using a mouse, the user may click a startup icon by double-clicking a mouse pointer.
3. A terminal device projects and displays a display interface (including a startup icon) on a medium surface (which may be an air medium or a non-air medium) in a projection manner. In this case, differentiation is performed based on whether the terminal device has a capability of detecting an operation performed by the user on the projection display interface, and the tap operation on the startup icon in the foregoing manner 1 and manner 2 may also be implemented. For example, when a terminal device has a distance measurement capability, and can detect, based on the distance measurement capability, whether a user performs an operation on a projection display interface and specific operation content, the user may perform a "touchscreen" operation on the projection display interface, that is, may touch and tap a startup icon on the projection display interface.

The differences between the foregoing several manners of tapping the startup icon lie in: a. Man-machine interaction manners are different. b. Detection modes of the tapped area are different. In a touchscreen-available man-machine interaction manner, positioning and recognition of a tapping area may be implemented by detecting coordinate data of a touchscreen location of a user on a display or a projection display interface. In a touchscreen-unavailable man-machine interaction manner, a corresponding tapping area needs to be determined based on actual operation content of a user on a terminal device, for example, coordinates of a pointer and tapping.

The foregoing is merely an example for describing some possible implementations of tapping the startup icon. Specifically, an actual use manner still needs to be determined based on a situation of an actual application scenario, and a corresponding man-machine interaction manner and a manner of detecting a tapping area need to be determined, so as to implement the operation in S201.

When the user taps the associated area, the terminal device displays a preset interface, and displays a prompt element of to-be-prompted content in the preset interface, so as to prompt the user. Content of the prompt element is not excessively limited herein, as long as a related prompt for the to-be-prompted content may be implemented, and may be specifically set by a person skilled in the art based on an actual requirement. For example, the prompt element may be the to-be-prompted content, or may be some related information or controls of the to-be-prompted content.

When the to-be-prompted content is a function, an example in which the prompt element includes two controls is used for description in this embodiment of this application as follows:

S2021: Display a first interface, where the first interface includes a first control used to enable a to-be-prompted function and a second control used to perform function demonstration on the to-be-prompted function; and detect a tap operation performed by the user on the control.

If the user taps the first control, step S203 is performed. Alternatively, if the user taps the second control, step S204 is performed.

In this embodiment of this application, when the user taps the associated area, the terminal device displays an interface including both a control that can enable a new function and a demonstration control. In this embodiment of this application, specific content displayed in each control is not displayed, and may be designed by a person skilled in the art based on an actual requirement, to notify the user of a function of each control. For example, prompt content such as "Experience now", "Enable attempt", or "Use the function" may be displayed in a control used to enable a new function, to inform a user that a new function can be started by tapping the control. Based on different presentation manners, the presentation control is classified into the following two types in this embodiment of this application:

Type 1: a function triggering control. Similar to a function-enabling control, when this type of control is operated by a user, the terminal device enables a function of demonstrating the to-be-prompted function. That is, a demonstration resource associated with the to-be-prompted function is obtained, and the demonstration resource is displayed. (In this embodiment of this application, a resource used to perform content description on the to-be-prompted content is named as a description resource. When the to-be-prompted content is a function, a manner of describing the function is function demonstration. Therefore, in this case, the demonstration resource is a corresponding description resource.)

Type 2: a window (View) control. This type of control exists in an interface as a window. Demonstration resources, such as videos, audios, images, and texts, can be displayed in the window. In addition, a person skilled in the art may further set a resource display mode for this type of control, for example, automatic play or manual play. On this basis, if automatic play is set, the demonstration control on the first interface automatically plays the demonstration resource. If manual play is set, content displayed on the demonstration control in the first interface is in a paused state. The terminal device plays the demonstration resource through the presentation control only after the user taps the demonstration control.

A type of a specifically used demonstration control is not excessively limited in this embodiment of this application, and may be selected or set by a person skilled in the art based on an actual requirement. (Similarly, in a case in which the to-be-prompted content is non-functional content, controls corresponding to the to-be-prompted content and used for content description may also be classified into the foregoing two types: a function triggering type and a window type.)

For example, a selected demonstration control is a function triggering control. In this case, "Function demonstration", "Skill demonstration", or "Function description" can be displayed in the demonstration control, so as to notify the user that the user can watch operation demonstration of the new function by tapping the demonstration control. An example is used for description. Reference may be made to (a) in FIG. 2D. In this embodiment of this application, "Experience now" is used in the control used to enable a new function to notify the user of a function of the control. For a demonstration control, "Skill demonstration" is used to inform the user of the function of the control.

For example, a selected demonstration control is a window control. In this case, "Function demonstration", "Skill demonstration", or "Function description" can be displayed in the demonstration control, so as to notify the user that the user can watch operation demonstration of the new function through the control. An example is used for description. Reference may be made to (b) and (c) in FIG. 2D, in this embodiment of this application, in a control used to enable a new function, "Experience now" is used to notify a user of a function of the control. For a demonstration control, "Skill demonstration" is used to inform the user of the function of the control. In (b), a display mode of the demonstration control is set to manual play, that is, the demonstration resource is played only after the user taps the control. In (c), a display mode of the demonstration control can be set to automatic play. In this case, when the first interface is displayed, the demonstration control automatically plays the demonstration resource. In an optional embodiment of this application, a window automatic playing demonstration control has a relatively obvious function and does not need to be operated by a user, prompt content such as "Function demonstration", "Skill demonstration", or "Function description" may be selected to not be added to the demonstration control.

In an optional embodiment of this application, If only the control is displayed, it is difficult for the user to learn information such as a name of to-be-prompted content when the user does not tap the control. This makes it inconvenient for the user to subsequently use the to-be-prompted content by himself/herself. Therefore, improvement of usage of the to-be-prompted content is affected to some extent, and there is also a problem that an interface is not user-friendly. To resolve this problem, in this embodiment of this application, the prompt element further includes content information (that is, first information) of the to-be-prompted content. That is, the content information of the to-be-prompted content is displayed on the interface. The content information means some related information of the to-be-prompted content, for example, a content name. Specific information content included in the content information is not excessively limited in this embodiment of this application, and may be selected or set by a person skilled in the art based on an actual requirement. For example, in some embodiments, the content information may include only a content name, or may include a content name, a content update date, and the like.

In addition, a manner of displaying the content information needs to be a manner that can be perceived by the user, for example, may be a manner of visual perception or auditory perception of the user. On this basis, a specifically used display manner is not excessively limited in this embodiment of this application, and may be set by a person skilled in the art. For example, in some embodiments, the content information may be displayed in any one or more of manners such as a character, audio, a pattern, a video, and an identity. In addition, a location at which the content information is displayed in the interface is not excessively limited herein, and may be set by a person skilled in the art. For example, the content information may be displayed in the control, or displayed in an interface area outside the control.

An example is used for description. It is assumed that the to-be-prompted content is a new function, a function name of the new function is "MeeTime", and a function icon of the new function is a camera pattern. It is also assumed that the interface includes a demonstration control and a control for enabling a new function. On this basis, the content information can be displayed in the following modes:

1. The selected content information is "Experience MeeTime now", and the content information is displayed in the control for enabling the new function as the prompt content of the control. In this case, for the interface, reference may be made to (a) in FIG. 2E.
2. The selected content information is "Experience MeeTime now" and "MeeTime skill demonstration", and the two pieces of content information is respectively displayed in two controls as prompt content of the two controls. In this case, for the interface, reference may be made to (b) in FIG. 2E.
3. The selected content information is a function icon and a function name of MeeTime, and both the function icon and the function name are displayed in a lower part of the interface. In this case, for the interface, reference may be made to (c) in FIG. 2E.

Figure 2F:
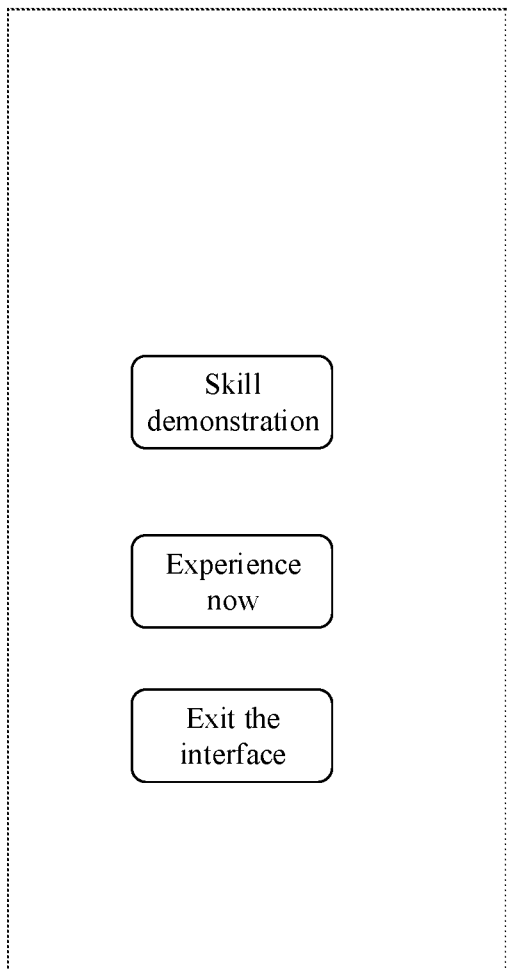
FIG. 2F is a schematic diagram of an application scenario according to an embodiment of this application.
Figure 2G:
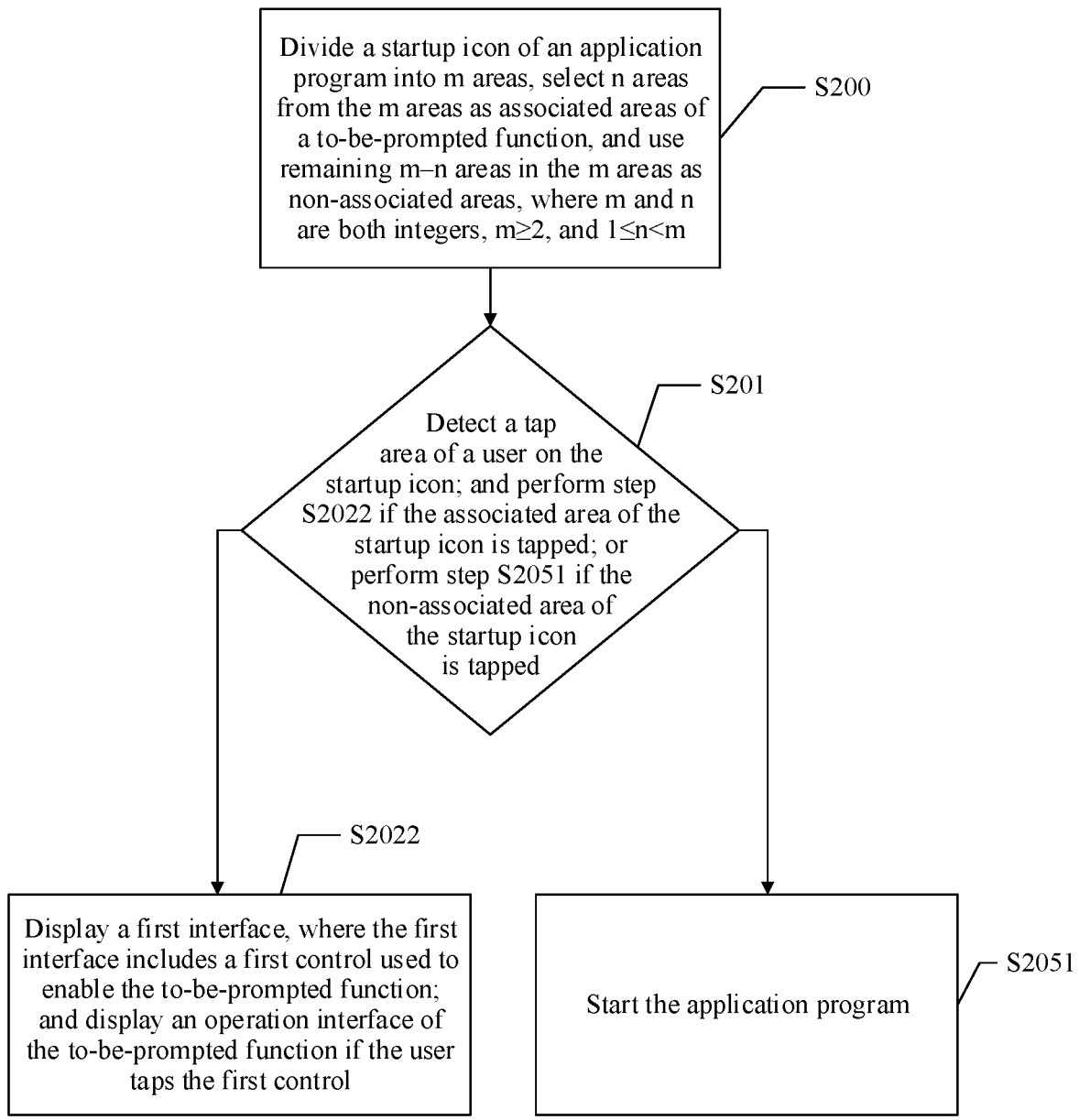
FIG. 2G is a schematic flowchart of a prompt method according to an embodiment of this application.

In another optional embodiment of this application, in addition to information related to a new function, a person skilled in the art may also add some other content to an interface based on an actual requirement. For example, some other controls may be added to enrich content of the interface and facilitate user operations. Alternatively, some image content is added so that the interface is not too monotonous. An example is used for description. Reference may be made to FIG. 2F. Based on the embodiment shown in (a) of FIG. 2D, a control used to close a current interface is further added in this embodiment of this application. Content of "Exit the interface" is set in the control. This can help a user who accidentally touches an associated area and enters an interface quickly exit.

In addition, a manner of detecting a tapped object corresponding to a tap operation is not limited in this embodiment of this application, and may be set by a person skilled in the art based on an actual situation. For example, reference may be made to a manner of detecting a tap area of a startup icon in S201, to detect a tap performed by a user in an area to which a control belongs, so as to determine which control is a tapped object.

S203: Display an operation interface of the to-be-prompted function if the user taps the first control.

If the user taps the control used to enable a new function, it indicates that the user wants to use the new function. In this case, an operation interface corresponding to the new function is started in this implementation of this application, so that the user can use the new function. Specific content included in the operation interface, an interface layout, and the like are not limited herein. In an optional embodiment of this application, an operation interface of a new function may be preset by R&D personnel of the new function. In this case, the terminal device only needs to display the interface based on the set data. In another optional embodiment of this application, a person skilled in the art may alternatively preset a corresponding interface generation rule. In this case, the terminal device needs to generate an operation interface corresponding to the new function according to the interface generation rule. For example, the interface generation rule may be set as follows: All level-1 functions under the new function and some specific functions associated with the new function are obtained. Then, control layout is performed based on the obtained functions, and an operation interface corresponding to the new function is generated.

It can be learned from the foregoing description that there are two types of demonstration controls. For a demonstration control of the function triggering type, demonstration resources corresponding to the new function is obtained and displayed only after a user clicks the demonstration control. The window-type demonstration control is associated with demonstration resources. A user can view the demonstration resources through the demonstration control. Therefore, when the selected demonstration control is a control of the function triggering type, the operation of viewing the demonstration resources by the user includes:

S204: If the user taps the second control, obtain a demonstration resource associated with the to-be-prompted function, and display the demonstration resource.

If the user clicks the demonstration control, the user may not be familiar with the new function and needs to watch function demonstration. In this case, the demonstration resource corresponding to the new function is obtained in this embodiment this application. The demonstration resource is used to perform visualized demonstration on a use operation of the to-be-prompted function. A specific manner of obtaining the demonstration resource and resource content included in the demonstration resource are not limited herein, may be set by a technical person based on an actual requirement, or may be determined based on an actual application situation. For example, the obtaining manner may be local obtaining, or network obtaining. The resource content may be any one or more of a picture, a video, and a text, or may include another type of resource, for example, audio.

In some optional embodiments, R&D personnel of the new function may preset corresponding demonstration resources such as a picture, a video, and a text for the new function. In addition, when a function is updated, these demonstration resources are also updated to the terminal device. In this case, obtaining the demonstration resource associated with the to-be-prompted function means to locally read resources such as a picture, a video, and a text associated with the new function by the terminal device.

However, in some other optional embodiments, a source situation of an application program in an actual application is relatively complex, it is difficult to require corresponding R&D personnel to cooperate to complete setting of a demonstration resource. Therefore, it is relatively difficult to implement the foregoing embodiment, and operability is relatively low. However, in an actual R&D process, R&D personnel of a new function may describe how to use the new function by using a user manual, application programs that introduce the new function (these application programs have corresponding configured local data or network data, so as to introduce the new function), or setting some demonstration videos associated with the application program to which the new function belongs. That is, during actual application, most new functions have corresponding function description data. However, data types and storage modes of the function description data may be greatly different. For example, the function description data may be a user manual in an electronic document format stored on a network or locally, or a picture, a video, or a text in a resource compression package format stored locally. Therefore, to improve operability of obtaining the demonstration resource, the obtaining operation on the demonstration resource includes:

obtaining function description data associated with the to-be-prompted function, and extracting a demonstration resource from the function description data.

In this embodiment of this application, function description data associated with the new function is first searched for. For example, a resource corresponding to an application program such as user manual or tips that introduces a new function, and a resource such as a demonstration video associated with the application program of the new function are first searched for. Because there may be a relatively large difference between formats of the function description data, resources extraction is further performed on the function description data in this embodiment of this application. To be specific, included resources such as a picture, a video, and a text are extracted from the obtained function description data, and these resources are used as demonstration resources in this embodiment of this application.

In an optional embodiment of this application, operations of some new functions are relatively simple. For example, a new function is a shortcut switch for some old functions. For example, a quick encryption switch for all media resources in the terminal device is added, and one-click encryption of the media resources may be implemented by clicking the switch. For these new functions with relatively simple operations, sometimes no function demonstration is performed. The user can also learn a function and operation mode of the new function only through a control style (for example, if the control is a switch button, the user can quickly understand that the function is a switch) and a name of the function. Therefore, in this case, no demonstration needs to be performed on the new functions theoretically. In this case, refer to FIG. 2G. S2021, S203, and S204 may be replaced with S2022.

S2022: Display a first interface, where the first interface includes a first control used to enable the to-be-prompted function; and display an operation interface of the to-be-prompted function if the user taps the first control.

S201 is correspondingly modified as: Detect a tap area of a user on the startup icon; and perform step S2022 if the associated area of the startup icon is tapped; or perform step S2051 if the non-associated area of the startup icon is tapped.

In this embodiment of this application, a related operation of performing function demonstration on the new function in S2021 is canceled. After the user taps the associated area of the startup icon, the terminal device may display an interface including a control for starting anew function, so that the user can start an operation on the new function by tapping the control. Alternatively, after the user taps the associated area of the startup icon, the terminal device may display an operation interface of the new function, so that the user can start to use the new function.

In another optional embodiment of this application, if only a new function needs to be prompted, only a demonstration control may be displayed in the first interface. In this case, the user can view demonstration resources by using this control. If the user wants to use the new function, the user can enable the new function in the application program.

Figure 2H:
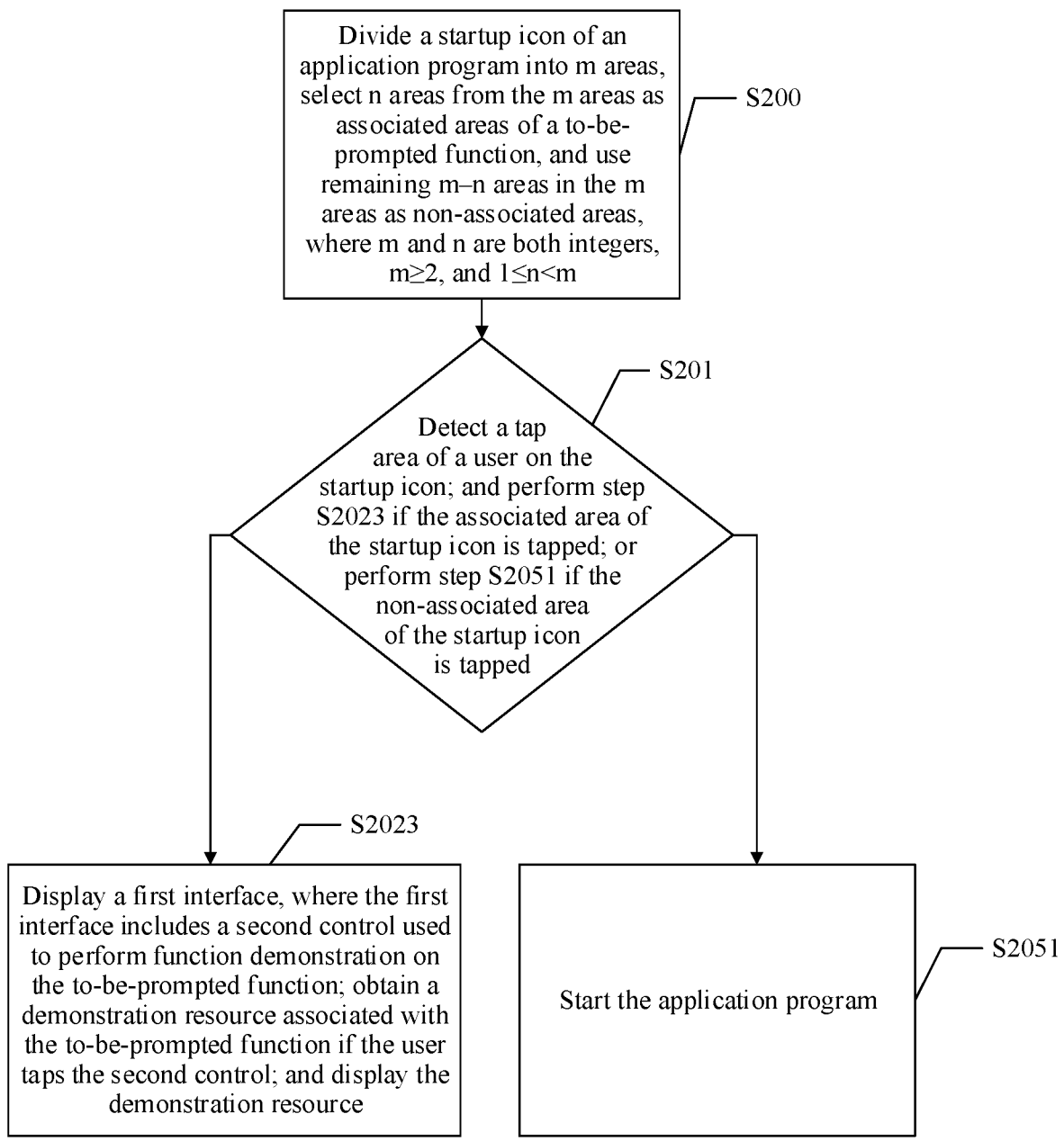
FIG. 2H is a schematic flowchart of a prompt method according to an embodiment of this application.
Figure 2I:
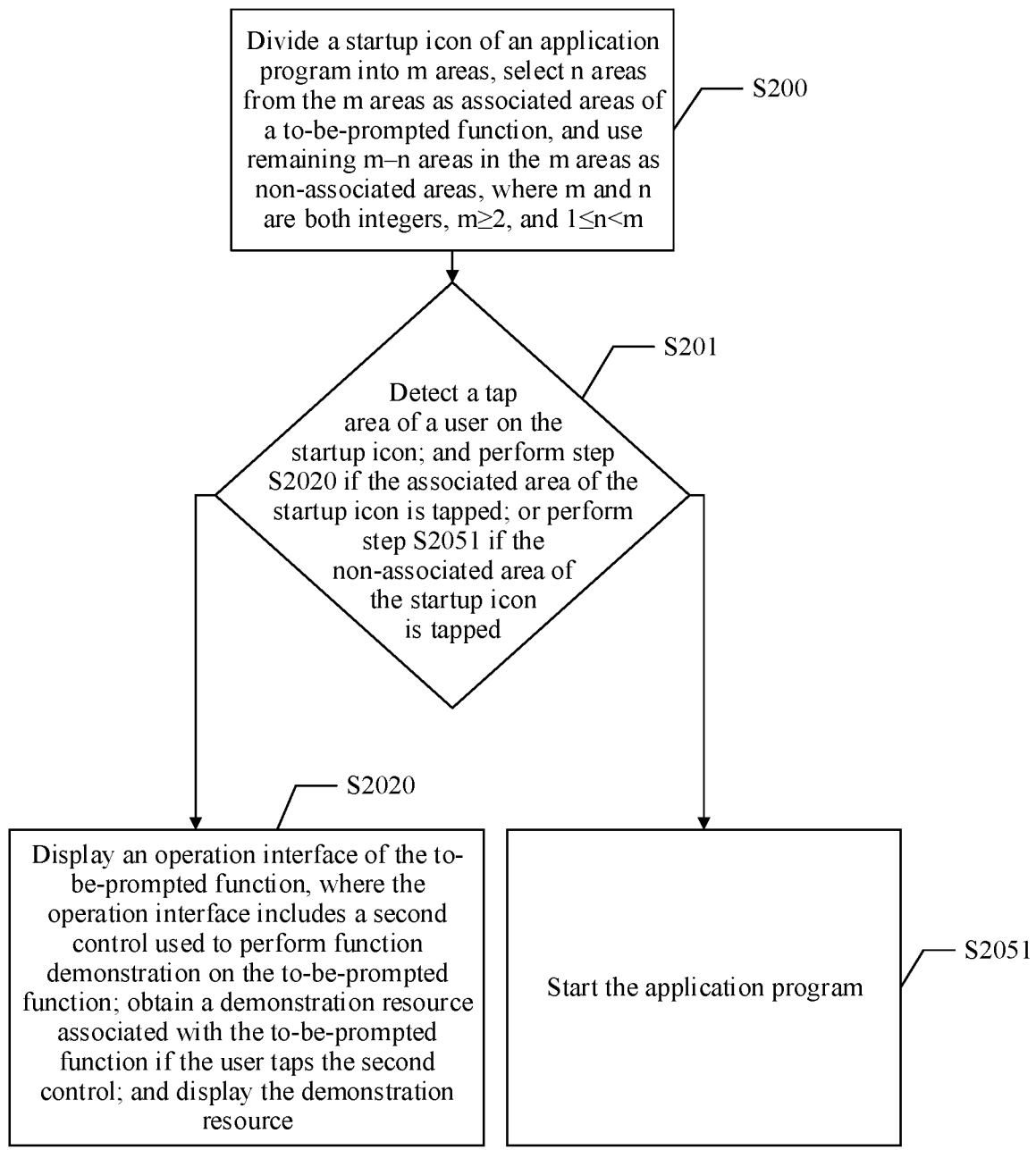
FIG. 2I is a schematic flowchart of a prompt method according to an embodiment of this application.

Therefore, for a demonstration control of a function triggering type, refer to FIG. 2H. S2021, S203, and S204 in this embodiment of this application may alternatively be replaced with S2023.

S2023: Display a first interface, where the first interface includes a second control used to perform function demonstration on the to-be-prompted function; obtain a demonstration resource associated with the to-be-prompted function if the user taps the second control; and display the demonstration resource.

S201 is correspondingly modified as: Detect a tap area of a user on the startup icon; perform step S2023 if the associated area of the startup icon is tapped; or perform step S2051 if the non-associated area of the startup icon is tapped.

In an optional embodiment of this application, if only a demonstration control is displayed, it is relatively troublesome for the user to use the new function. This is not conducive to improving user experience. Therefore, refer to FIG. 2I. In this embodiment of this application, S2021, S203, and S204 may alternatively be replaced with S2020.

S2020: Display an operation interface of the to-be-prompted function, where the operation interface includes a second control used to perform function demonstration on the to-be-prompted function; obtain a demonstration resource associated with the to-be-prompted function if the user taps the second control; and display the demonstration resource.

S201 is correspondingly modified as: Detect a tap area of a user on the startup icon; and perform step S2020 if the associated area of the startup icon is tapped; or perform step S2051 if the non-associated area of the startup icon is tapped.

In this embodiment of this application, a first interface is an operation interface of a new function, and further includes a control for demonstrating a function. A user can directly try a new function through the operation interface, and view the function demonstration when necessary. This greatly improves convenience of understanding and using the new function by the user. This is conducive to improve usage of the new function.

Figure 2J:
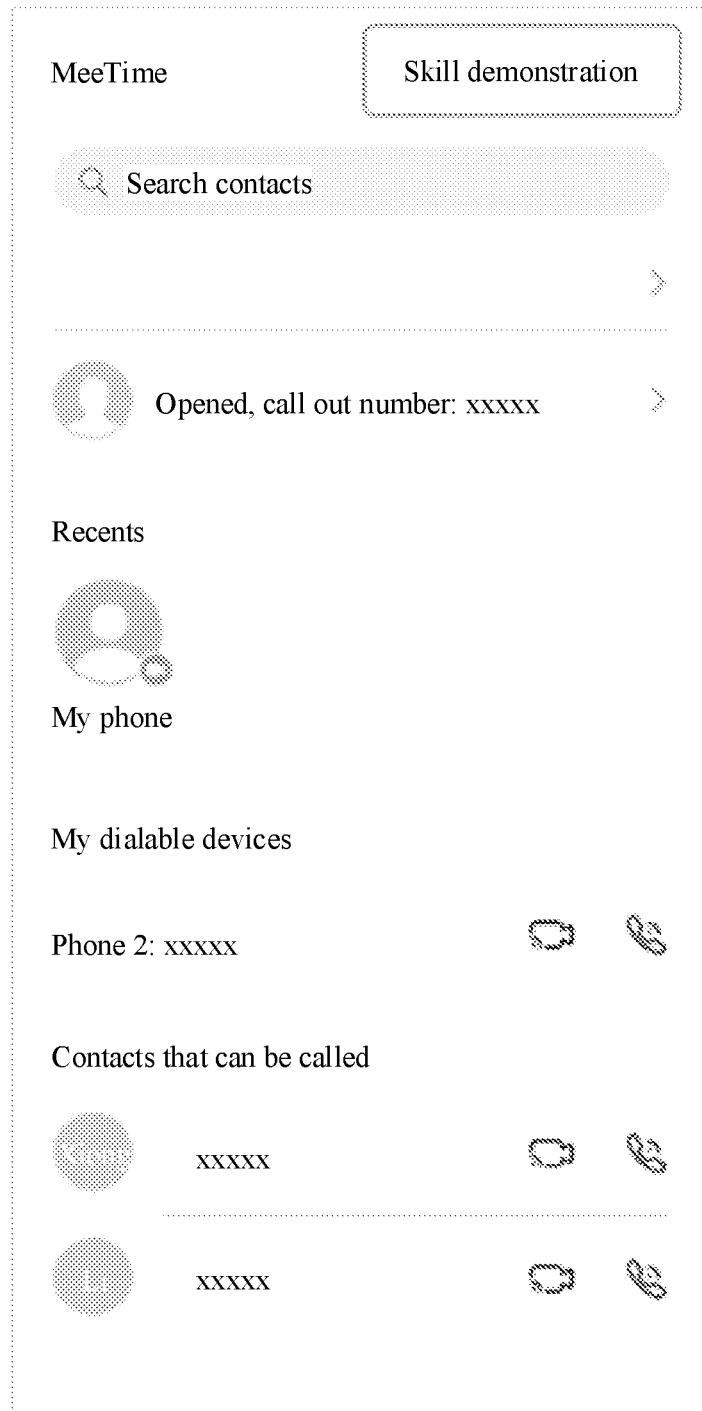
FIG. 2J is a schematic diagram of an application scenario according to an embodiment of this application.
Figure 2K:
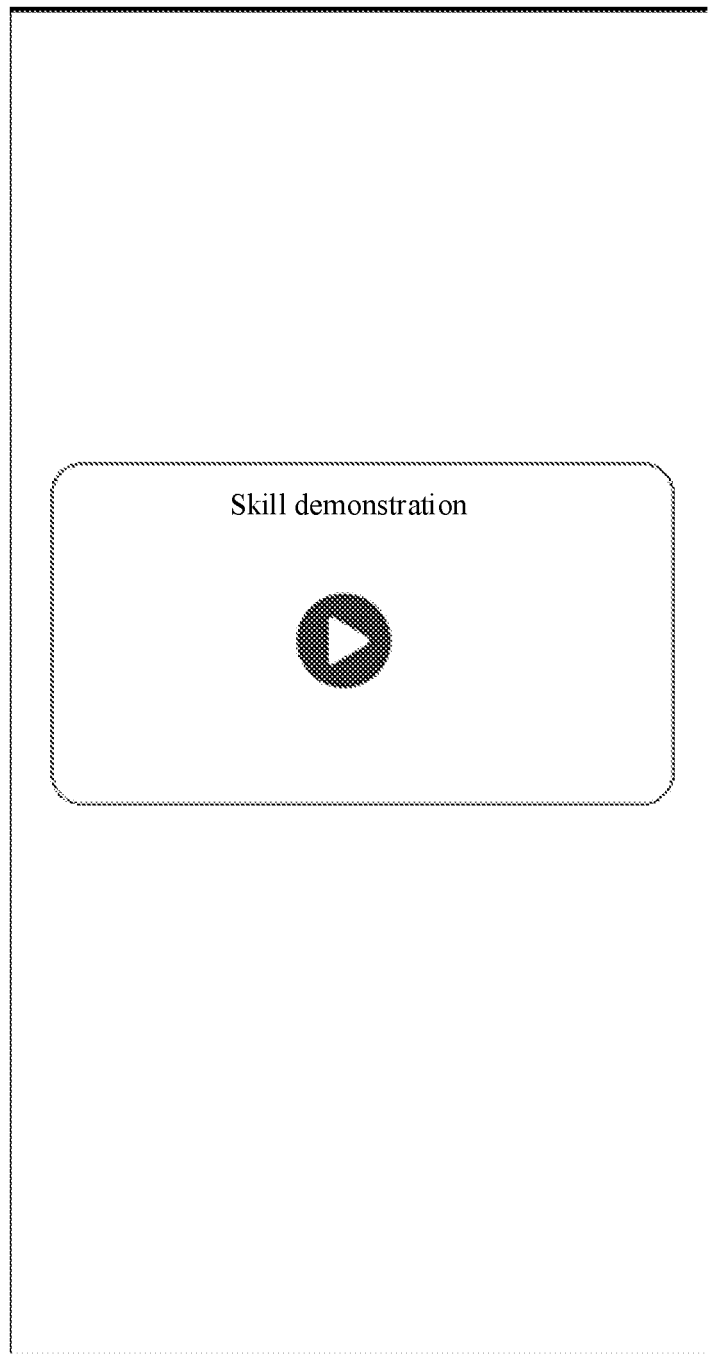
FIG. 2K is a schematic diagram of an application scenario according to an embodiment of this application.
Figure 2L:
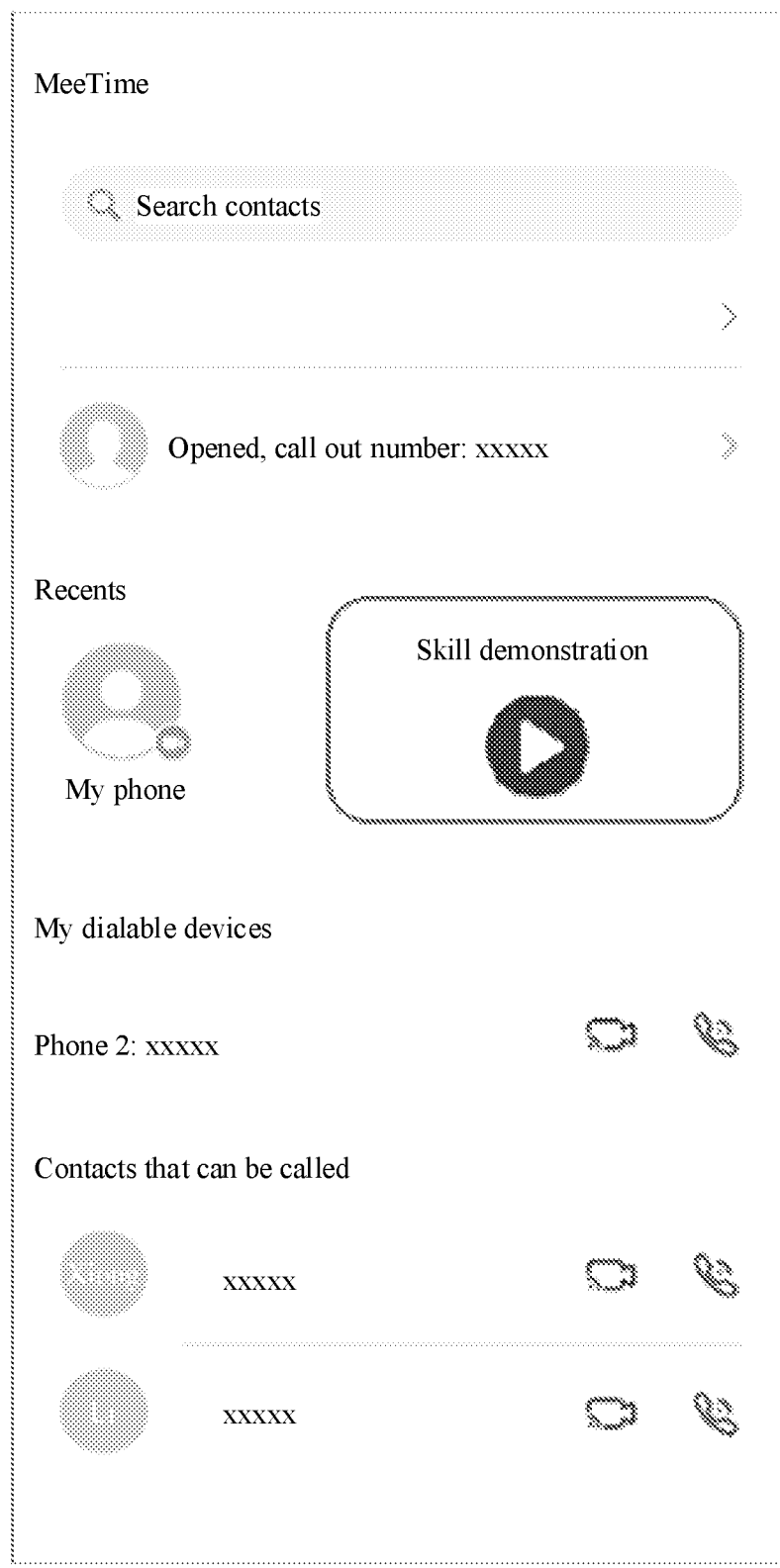
FIG. 2L is a schematic diagram of an application scenario according to an embodiment of this application.

An example is used for description. Refer to FIG. 2J. It is assumed that the new function is "MeeTime", and a first interface is an operation interface of the function. Select the demonstration control of the function triggering type and display the prompt content "Tip Demonstration" in the demonstration control. In this embodiment of this application, the demonstration control is placed in the upper right corner of the operation interface for display, so that the user can view function demonstration of "MeeTime" at any time in a process of using "MeeTime".

In an optional embodiment of this application, when a window-type demonstration control is selected, S2023 may be replaced with: Display a first interface; where the first interface includes a second control used for function demonstration of the to-be-prompted function; obtain a demonstration resource associated with the to-be-prompted function; and display the demonstration resource by using the second control.

In still another optional embodiment of this application, when a window-type demonstration control is selected, S2020 may be replaced with: Display an operation interface of a to-be-prompted function, where the operation interface includes a second control used to perform function demonstration on the to-be-prompted function; and obtain a demonstration resource associated with the to-be-prompted function, and display the demonstration resource by using the second control.

An example is used to describe the foregoing two embodiments of selecting a window-type demonstration control. Assume that the new function is "MeeTime", and "Skill demonstration" is used to tell the user the function of the control. In addition, a display mode of the demonstration control is set as manual play. When the first interface is not an operation interface of a new function, reference may be made to FIG. 2K. In this case, the first interface includes a demonstration control, and the demonstration control is associated with the demonstration resource. The user can tap the presentation control to play the demonstration resource. When the first interface is an operation interface, reference may be made to FIG. 2L. In this case, the user can view function demonstration of "MeeTime" at any time in a process of using "MeeTime". In another optional embodiment of this application, a display manner of the demonstration control may alternatively be set as automatic play. In this case, when the first interface is displayed, the demonstration control automatically plays the demonstration resource.

S2051: Start the application program.

After the user taps the non-associated area, the application program can be normally started in this embodiment of this application program. Because some application program interfaces are also displayed after the program is started, a specific interface may be determined based on an actual application program, and is not limited herein. For example, the interfaces may be some interfaces including a plurality of controls, or may be operation interfaces of some specific functions, or may be some promotion interfaces (such as advertisement interfaces).

In an optional embodiment of this application, S2051 may be replaced with S2052.

S2052: Display a second interface, where the second interface includes at least one fourth control used to start a fourth function of the application program.

The fourth function is an old function of the application program of the terminal device. If a user clicks a non-associated area, it indicates that the user does not need to know or use new functions. Therefore, in this embodiment of this application, an interface of a control including an old function is displayed, so that the user can normally use the application program. A specific type and quantity of old functions included in a specific interface, a control layout manner, and the like are not limited herein, and may be set by a person skilled in the art based on an actual requirement. For example, in some optional embodiments, an original home page interface in the application program may be used as the second interface in this embodiment of this application. In some other optional embodiments, the second interface may also be determined according to an interface triggering rule that is originally set in the application program and that corresponds to the startup icon. For example, it is assumed that it is originally set that if an application program is started, a preset home page interface is opened after a user taps a startup icon. If the application program is opened when the application program is in a background running state, after the user taps the startup icon, an interface of a latest operation performed by the user is opened. In this case, after it is detected that the user taps a non-associated area, a correspondingly opened second interface is determined according to the rule.

It can be learned from the foregoing description that, based on different actual application settings, there are two possible cases of the second interface: Case 1: Only old functions are included. In this case, the second interface includes one or more old functions. Case 2: Both old and new functions are included. In this case, the second interface includes at least one new function and one old function. (Correspondingly, if the to-be-prompted function is an old function, at least two old functions are included in this case.)

Based on S2052, if it is detected that the user taps the fourth control, an operation interface of an old function corresponding to the fourth control is started.

The user may perform, in the second interface, an operation on a control required by the user, to use a function required by the user. If the second interface includes a control of a new function, in this case, if it is detected that the user taps the control with the new function, a corresponding new function is enabled. An operation interface of each old function is an operation interface set for the old function in an actual application program.

In an optional embodiment of this application, in an actual situation, starting some application programs may be to enter an operation interface of a function. For example, for a telephony application program, generally, after a user taps a startup icon, a terminal device opens an operation interface of a dialing function in the telephony application program. In this case, a control for starting an old function may not exist in the interface. To cope with this case, in this embodiment of this application, S2051 may alternatively be replaced with S2053: Display an operation interface of a fourth function.

In this embodiment of this application, if a user taps a non-associated area, an operation interface of an old function is displayed in this embodiment of this application. In this case, the second interface is the operation interface of the old function. Selection of the old function actually corresponding to the non-associated area is not limited herein, may be selected or set by a person skilled in the art based on to an actual situation, or may be set based on an operation interface corresponding to an original startup icon in the application program when the startup icon is tapped.

In an optional embodiment of this application, during actual application, a user is more familiar with a new function after using the new function for a specific number of times, and after the user is familiar with the new function, the terminal device actually does not need to perform function demonstration on the new function again. Therefore, after the user taps an associated area, if an interface including a plurality of controls is still displayed in a manner in S2021, in this case, the user needs to tap a control of the new function again to use the new function. A user operation on the new function is not simple, and may even cause dissatisfaction of the user and poor user experience.

To facilitate use of the new function when the user is familiar with the operation of the new function, so that the man-machine interaction operation of the user is more efficient and friendly, in this embodiment of this application, S2021 may be replaced with:

S2024: Obtain a first total number of times the to-be-prompted function is used; determine whether the first total number of times is greater than a first number-of-times threshold; and perform S2025 if the first total number of times is greater than the first number-of-times threshold; or perform S2026 if the first total number of times is less than or equal to the first number-of-times threshold.

S2025: Display an operation interface of the to-be-prompted function.

S2026: Display the first interface, where the first interface includes a first control used to enable the to-be-prompted function and a second control used to perform function demonstration on the to-be-prompted function; and perform step S203 if the user taps the first control; or perform step S204 if the user taps the second control.

In this embodiment of this application, after it is detected that the user taps the associated area, a total number of times that the user has used the new function (that is, a total number of times that the new function is enabled) is further determined. A manner of obtaining the total number of times the function is used (including a first total number of times and a second total number of times) is not limited herein, and may be set by a person skilled in the art based on an actual requirement. For example, in some optional embodiments, counting may be performed each time a user taps a first control used to start a new function, and a counting result is used as a total number of times that the new function is used.

In some other optional embodiments, sometimes a function may correspond to different controls in different display interfaces, and may even be redirected and invoked by another function. Therefore, statistics collection performed only based on a counting result of the first control is inaccurate sometimes. Therefore, in this embodiment of this application, a number of times that an operation interface of a new function is opened is counted, and the number of times is used as a total number of times that the new function is used. (The foregoing embodiment may also be applicable to obtaining a total quantity of use times of another function other than the new function, and details are not described herein again.)

The first number-of-times threshold is used to measure whether the user is familiar with the new function. When the total quantity of times that the new function is used is less than or equal to the first number-of-times threshold, it is determined that the user is not familiar with the new function in this embodiment of this application. Otherwise, if the total number of times is greater than the first number-of-times threshold, it is determined that the user is relatively familiar with the new function. When the user is relatively familiar with the new function, in this embodiment of this application, the interface in S2021 is not displayed, but an operation interface of the new function is displayed, so that the user can start to operate the new function after tapping the associated area. When the user is not familiar with the new function, the interface in S2021 is displayed, so that the user can freely choose whether to watch function demonstration of the new function. For an operation of S2026, refer to related descriptions of S2021. Details are not described herein again. In addition, a specific value of the first number-of-times threshold is not limited in this embodiment of this application, and may be set by a person skilled in the art based on an actual requirement. For example, the value of the first number-of-times threshold can be set to any value from 3 to 5.

Corresponding to S2022, S2023, and S2024, the first interface in S2026 may alternatively be replaced with including only a first control or including only a second control. In addition, when only the second control is included, the first interface may be an operation interface of a new function. Details are not described herein.

In another optional embodiment of this application, during actual application, a new function also becomes an old function after being used by a user for a relatively large number of times. In this case, the user is familiar with the function. Theoretically, function prompt is not required. Therefore, if area division is still performed on the startup icon according to S200, and the foregoing response operation for tapping different areas is performed, the user can use only some areas of the startup icon to start the application program, and even a case of "falsely tapping" a non-associated area may occur. Therefore, normal use of the application program by the user is greatly affected, man-machine interaction efficiency between the user and the terminal device is reduced, and user experience is reduced.

To facilitate use of the application program by the user, improve the man-machine interaction efficiency between the user and the terminal device, and improve user experience, this embodiments of this application includes:

S206: Obtain a second total number of times the to-be-prompted function is used. If the second total number of times is greater than or equal to a second number-of-times threshold, an operation of dividing the startup icon of the application program into them areas is canceled, and all areas of the startup icon are used as a whole to respond to the operation. In this case, all areas of the startup icon are used to start the application program.

In this embodiment of this application, for a manner of obtaining the second total number of times, refer to related descriptions of S2026. Details are not described herein again.

In an optional alternative manner of S206, the area division operation may not be canceled, but all areas of the startup icon are used as a whole to respond to the operation. In this case, all areas of the startup icon are used to start the application program. (That is, associated areas and non-associated areas still exist, but have same functions.)

S207: Start the application program if a tap operation performed by the user on the startup icon is detected.

Before this embodiment of this application is described, operation execution occasions of S200 to S2051 (including each replacement operation of S2021 and each replacement operation of S20251) are first described.

After the application program is installed on the terminal device, the terminal device performs the operation in S200 to implement area division for the startup icon. Then, the startup icon obtained after the area division is displayed, so that the user can perform operations such as tapping and moving on the startup icon. Therefore, S200 belongs to a preprocessing operation of the terminal device, and needs to be performed only once for a single new function.

On the basis of completing the preprocessing operation in S200, the user may tap different areas of the startup icon based on an actual requirement. Then, the terminal device performs operations in S201 to S2051 (including each replacement operation of S2021 and each replacement operation of S20251) based on the tap of the user. In this way, the user is prompted with a new function, and usage of the new function by the user is improved. During actual application, the user may tap the startup icon for a plurality of times. Therefore, based on different actual application situations, the operations of S201 to S2051 may be performed for a plurality of times. For example, an interface corresponding to a new function may be opened for a plurality of times, or an interface corresponding to an old function may be opened for a plurality of times. It is also possible to perform function demonstration to users for a plurality of times.

In an optional embodiment of this application, when the operations S201 to S2051 (including each replacement operation of S2021 and each replacement operation of S20251) are performed, the operation of S206 may be synchronously performed. In this case, S206 may be an independent thread task, and an execution occasion of S206 and an execution occasion of S201 to S2051 may be independent of each other. For example, S206 may be performed when any operation in S201 to S2051 is performed.

In another optional embodiment of this application, S206 is alternatively performed after an operation interface of a new function is displayed in the operations S201 to S2051 (including each replacement operation of S2021 and each replacement operation of S20251).

In S206, the second number-of-times threshold is used to measure whether a new function can be classified into an old function. When a total number of times that a new function is used is greater than or equal to the second number-of-times threshold, in this embodiment of this application, it is determined that the new function has been used for an enough number of times, and the new function is considered as an old function for the user. On the contrary, if the total number of times is less than the second number-of-times threshold, it is determined that the number of times that the user uses the new function is not enough, and the new function is still considered as a new function for the user. When the new function can still be determined as a new function, operations of S201 to S2051 (including each replacement operation of S2021 and each replacement operation of S20251) may still continue to be performed in this embodiment of this application. When the new function becomes an old function, in this embodiment of this application, the area division operation performed on the application program startup icon in S200 is canceled, so that the startup icon becomes a complete area again. In this case, no matter which area of the startup icon is tapped by the user, the application program is started, and a case of "false tapping" does not occur. Therefore, in this embodiment of this application, a normal operation performed by the user on the application program can be ensured, man-machine interaction efficiency between the user and the terminal device can be improved, and user experience can be improved. In addition, a specific value of the second number-of-times threshold is not limited in this embodiment of this application, and may be set by a person skilled in the art based on an actual requirement. However, considering that the operations in S2024 to S2026 cannot be performed after the operation in S206 is performed, the second number-of-times threshold should be greater than or equal to the first quantity threshold. For example, if the first number-of-times threshold is set to 5, the second number-of-times threshold is a value greater than or equal to 5, for example, may be set to any value in 5 to 10. In addition, for a manner of obtaining the total number of times, refer to related descriptions of obtaining the total number of times in S2024. Details are not described herein again.

In addition, it should be noted that S206 and S207 are also applicable to a case in which the to-be-prompted function is an old function. However, the difference lies in that, in this case, the second number-of-times threshold is not used to measure whether a new function can be classified into an old function, but is used to measure whether the number of times that the old function to be prompted is used is enough, so as to determine whether the user is familiar enough with the old function. Therefore, when a second total number of times that the to-be-prompted function is used is greater than the second number-of-times threshold, the area division operation on the startup icon is still canceled in this embodiment of this application.

An application program to which a first-type new function belongs has a startup icon, and an interface of the application program also has a displayable control. In this embodiment of this application, the startup icon of the application program to which the first-type new function belongs is divided into an associated area and a non-associated area in advance. When the user taps the non-associated area of the startup icon, the application program may be normally started, or an operation interface of an old function may be normally started. However, when the user taps the associated area of the startup icon, in this embodiment of this application, an interface including both a control including a new function and a demonstration control is displayed. In this case, the user can fully pay attention to the new function. In addition, the demonstration control is used to display demonstration resources related to function demonstration, helping users learn and use the new function. When the user taps the control of the new function, the user enters an operation interface of the new function, so that the user can start to use the new function. Presenting the new function and an old function separately on the startup icon can make the user fully notice the new function, and increases a probability that the user uses the new function. After the associated area is tapped, the new function and function demonstration are presented independently so that the user can learn or use the new function according to an actual requirement. In this way, the user can gradually get familiar with the new function. This improves subsequent usage of the new function by the user.

In addition, in this embodiment of this application, a total number of times that the user uses the new function is further counted, and whether the user is familiar with the new function and whether the new function becomes an old function for the user are determined based on the total number of times. When the user is familiar with the new function, function demonstration of the new function is canceled. Instead, the user taps the associated area to open the operation interface of the new function. In this embodiment of this application, when the user is familiar with the operation of the new function, use of the new function by the user is facilitated, so that a man-machine interaction operation of the user is more efficient and friendly. When the new function becomes an old function for the user, area division of the startup icon is canceled. In this way, when the user taps any area location of the startup icon, the application program can be started. Therefore, in this embodiment of this application, use of the new function by the user can be facilitated, man-machine interaction efficiency between the user and the terminal device can be improved, and user experience can be improved.

Figure 3A:
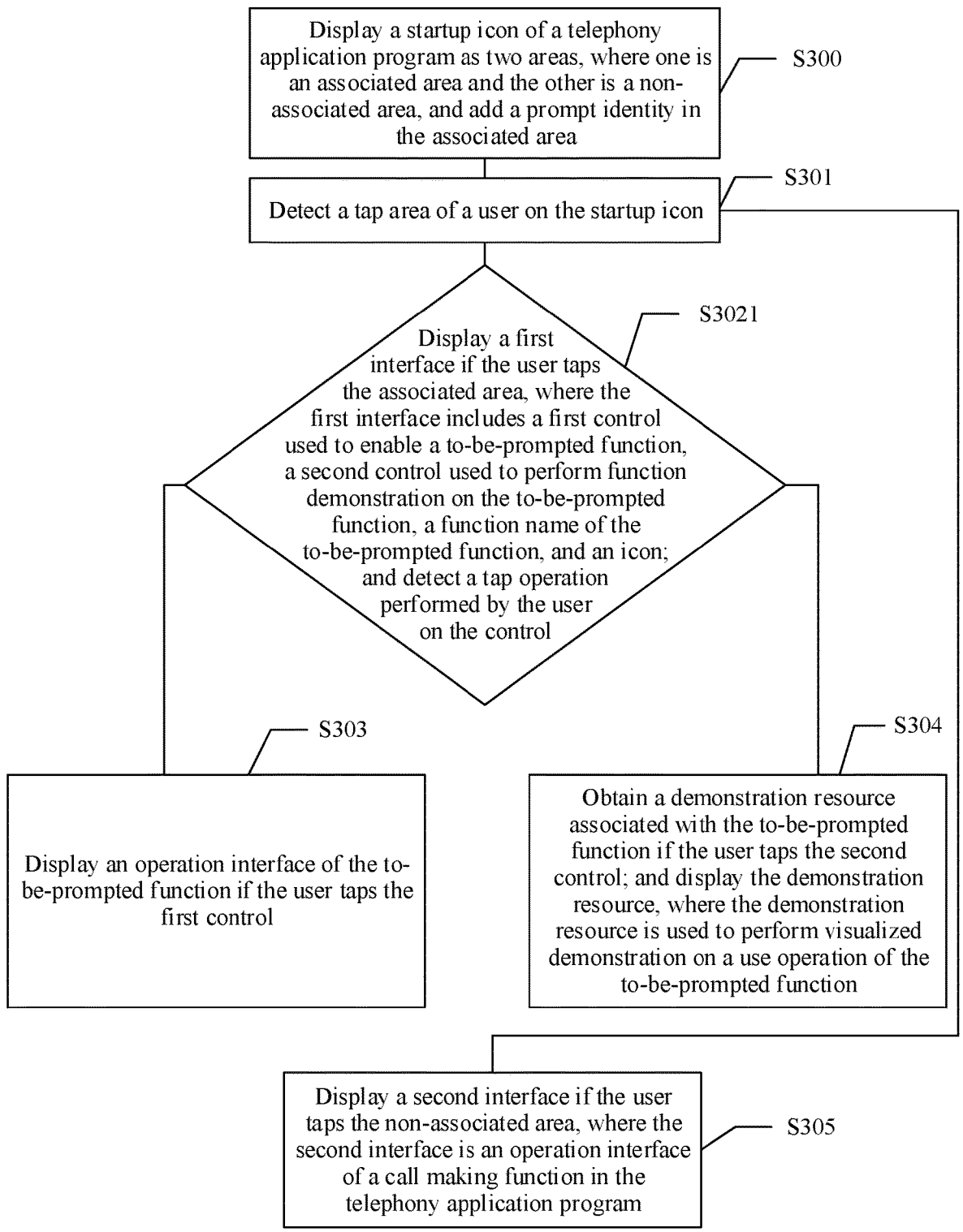
FIG. 3A is a schematic flowchart of a prompt method according to an embodiment of this application.

An example is used to describe the embodiment shown in FIG. 2A. In this embodiment of this application, it is assumed that a name of a new function that needs to be prompted is "MeeTime", which is a newly added function in a telephony application program. Refer to FIG. 3A. In this embodiment of this application, prompt operations S300 to S305 of the function are described as follows:

S300: Display a startup icon of a telephony application as two areas, where one is an associated area and the other is a non-associated area, and add a prompt identity in the associated area.

Figure 3B:
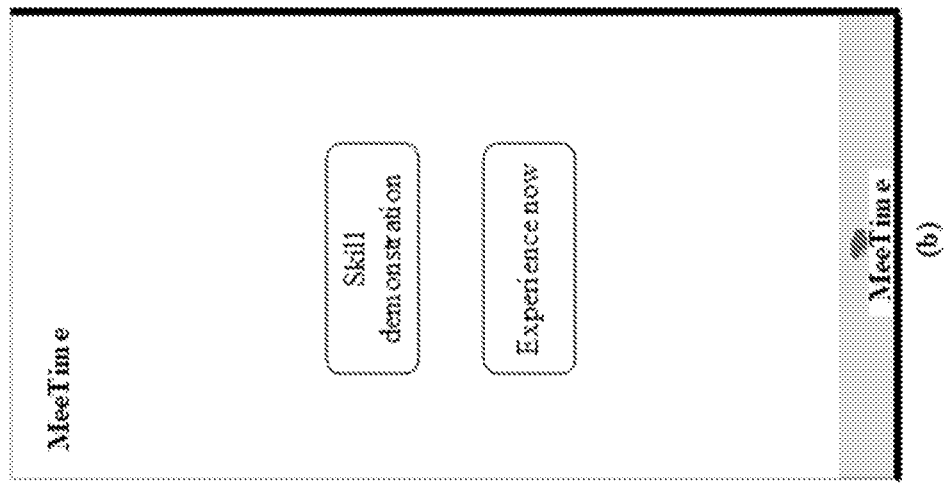
FIG. 3B is a schematic diagram of an application scenario according to an embodiment of this application.
Figure 3B:
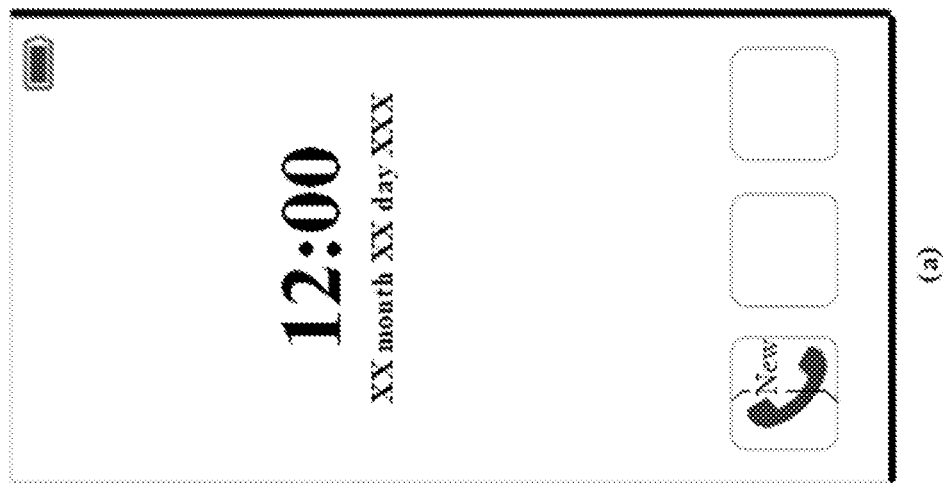

For details, refer to (a) of FIG. 3B. The startup icon is divided into two areas by using a black line segment inside the startup icon as a dividing line. A left area is the non-associated area, and a right area is the associated area. The prompt identity is marked as "New".

On a basis of completing the pre-operation S300, detection of an operation performed by the user on the startup icon starts. The details are as follows:

S301: Detect a tap area of the user on the startup icon.

S3021: Display a first interface if the user taps the associated area, where the first interface includes a first control used to enable a to-be-prompted function, a second control used to perform function demonstration on the to-be-prompted function, a function name of the to-be-prompted function, and an icon; and detect a tap operation performed by the user on the control.

Refer to (b) of FIG. 3B, in this embodiment of this application, the first control contains prompt content of "Experience now". The second control contains prompt content of "Skill demonstration", and the second control is a function triggering control. A function icon and a function name of a new function are used in content information. The function icon of the new function is a camera pattern that is displayed in a lower part of an interface. The function name is displayed in an upper left corner and lower part of the interface. This facilitates the user to easily obtain basic information about the new function.

S303: Display an operation interface of the to-be-prompted function if the user taps the first control.

Figure 3C:
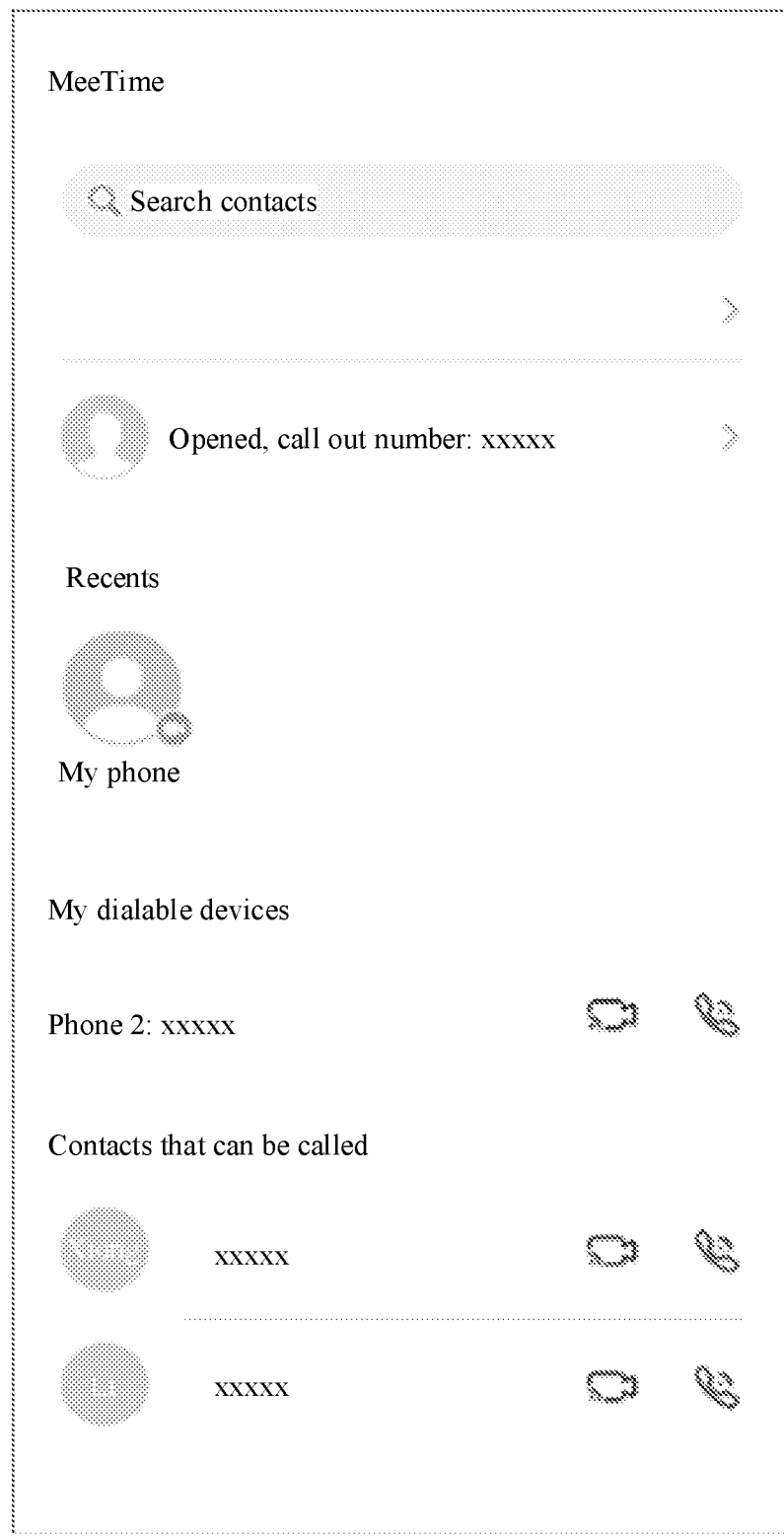
FIG. 3C is a schematic diagram of an application scenario according to an embodiment of this application.

FIG. 3C is an operation interface of "MeeTime" according to an embodiment of this application.

S304: Obtain a demonstration resource associated with the to-be-prompted function if the user taps the second control, and display the demonstration resource. The demonstration resource is used to perform visualized demonstration on a use operation of the to-be-prompted function.

Figure 3D:
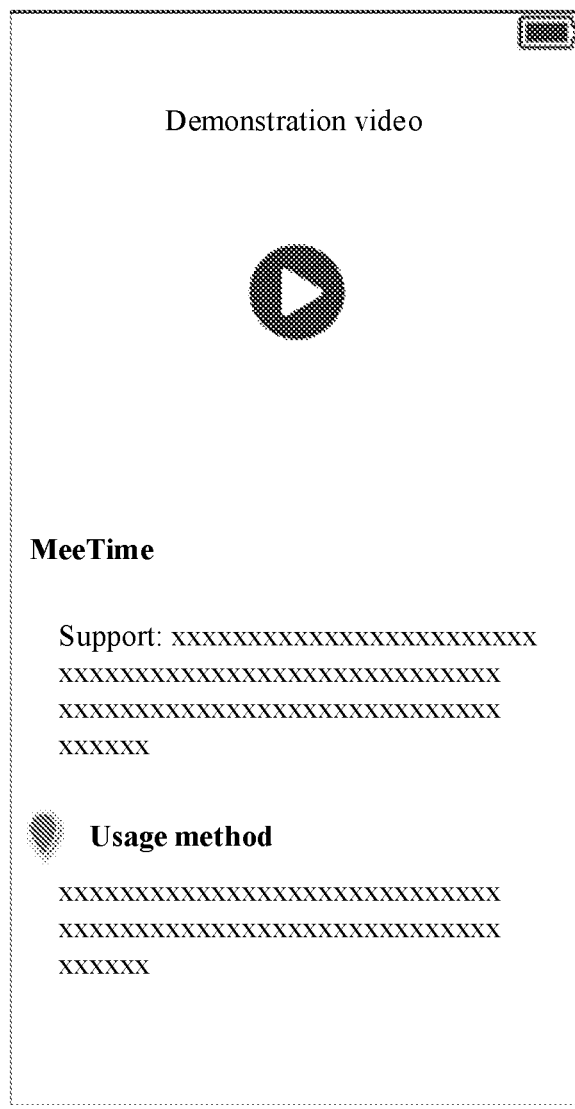
FIG. 3D is a schematic diagram of an application scenario according to an embodiment of this application.

Refer to FIG. 3D. In this embodiment of this application, a demonstration video, a text description of a function, and a text description of a usage method of "MeeTime" are locally stored in a terminal device in advance. Therefore, in S304, only the corresponding demonstration resource needs to be read locally.

S305: Display a second interface if the user taps the non-associated area, where the second interface is an operation interface of a call making function in the telephony application program.

Figure 3E:
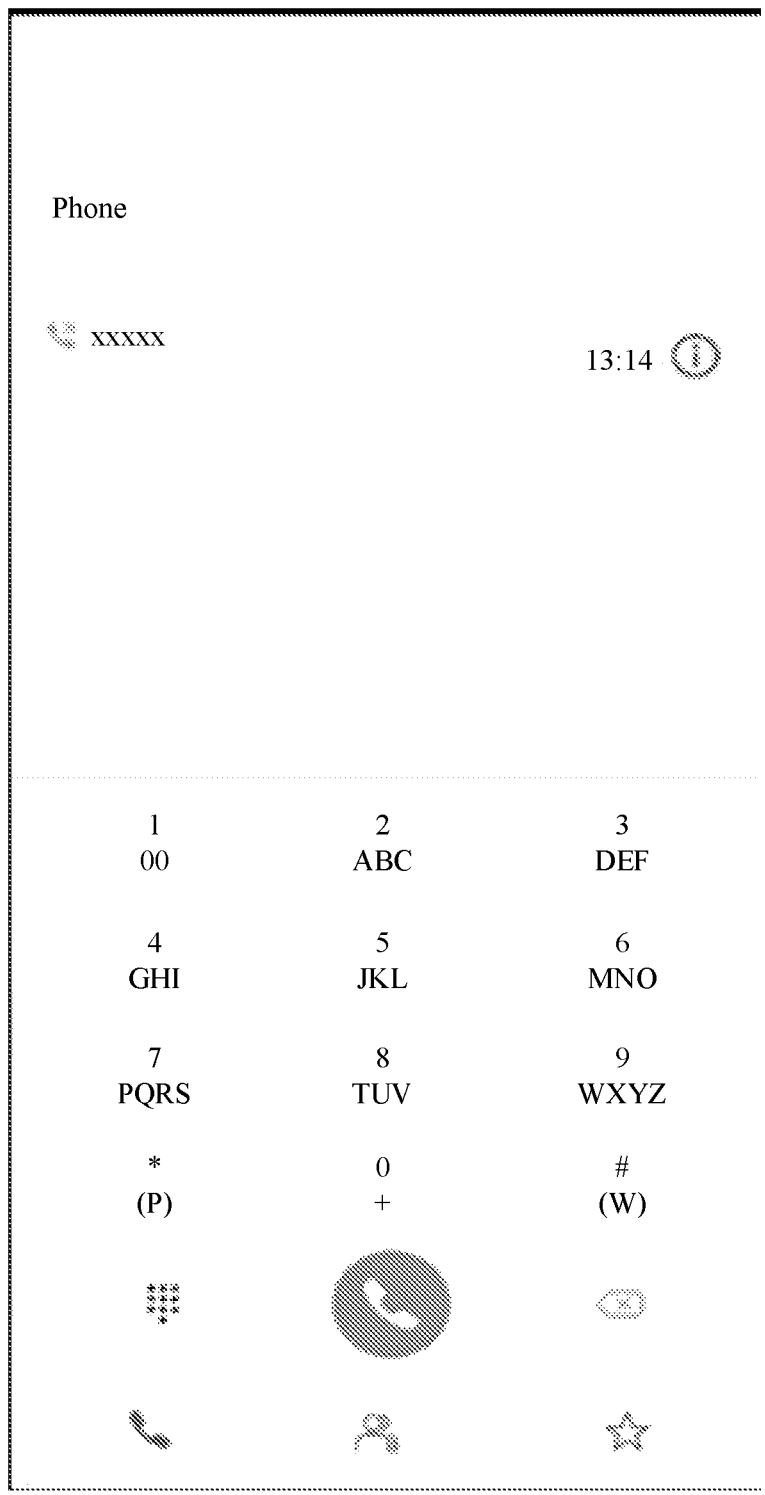
FIG. 3E is a schematic diagram of an application scenario according to an embodiment of this application.

FIG. 3E shows a second interface according to an embodiment of this application. After tapping the non-associated area, the user can directly enter the interface to perform an operation. In this case, the user can use a function of the telephone application program normally.

Corresponding to S2024, S2025, and S2026, in this embodiment of this application, S3021 may be replaced with: S3024 to S3026.

S3024: Obtain a first total number of times the to-be-prompted function is used.

S3025: Display an operation interface of the to-be-prompted function if the first total number of times is greater than a first number-of-times threshold.

S3026: Display a first interface if the first total number of times is less than or equal to the first number-of-times threshold, where the first interface includes a first control used to enable the to-be-prompted function, a second control used to perform function demonstration on the to-be-prompted function, a function name of the to-be-prompted function, and an icon; and detect a tap operation performed by the user on the control.

In this embodiment of this application, the first number-of-times threshold is set to 3. A manner of detecting a number of times that "MeeTime" is used is: detecting the number of times that an operation interface shown in FIG. 3C is opened, and using the number of times as the number of times that the "MeeTime" is used.

When a total number of times is greater than the first number-of-times threshold, the operation interface shown in FIG. 3C is displayed in this embodiment of this application. When the total number of times is less than or equal to the first number-of-times threshold, an interface shown in (b) of FIG. 3B is displayed.

In an optional embodiment of this application, after S305, prompt operations may further include S306 and S307.

S306: Obtain a second total number of times the to-be-prompted function is used; cancel an operation of dividing the startup icon of the application program into a plurality of areas in S300 if a second total number of times is greater than or equal to a second number-of-times threshold, and use all areas of the startup icon as a whole.

S307: Start the telephony application program if a tap operation performed by the user on the telephony startup icon is detected.

Figure 3F:
FIG. 3F is a schematic diagram of an application scenario according to an embodiment of this application.

FIG. 3F is a schematic diagram obtained after area division is canceled for a startup icon of a telephony application program. Compared with (a) in FIG. 3B, in this case, there is no dividing line or prompt identity "New" in the startup icon. When the user taps any area location of the startup icon, the telephony application program can be started.

In this embodiment of this application, area division is performed on the startup icon, and the prompt identity is added to the associated area. The user may be prompted that a new function is available in the telephony application program, so that the user fully notices the new function. After tapping the associated area, the user can watch the function demonstration of "MeeTime" or experience "MeeTime" as required. Therefore, man-machine interaction of the user and this embodiment of this application are more intuitive and convenient. The user does not need to slowly search for "MeeTime" in the telephony application program, and does not even need to search for a corresponding function description such as a user manual. Therefore, this is conducive to improving user experience of using the new function, and further improves usage of the new function by the user.

Figure 4A:
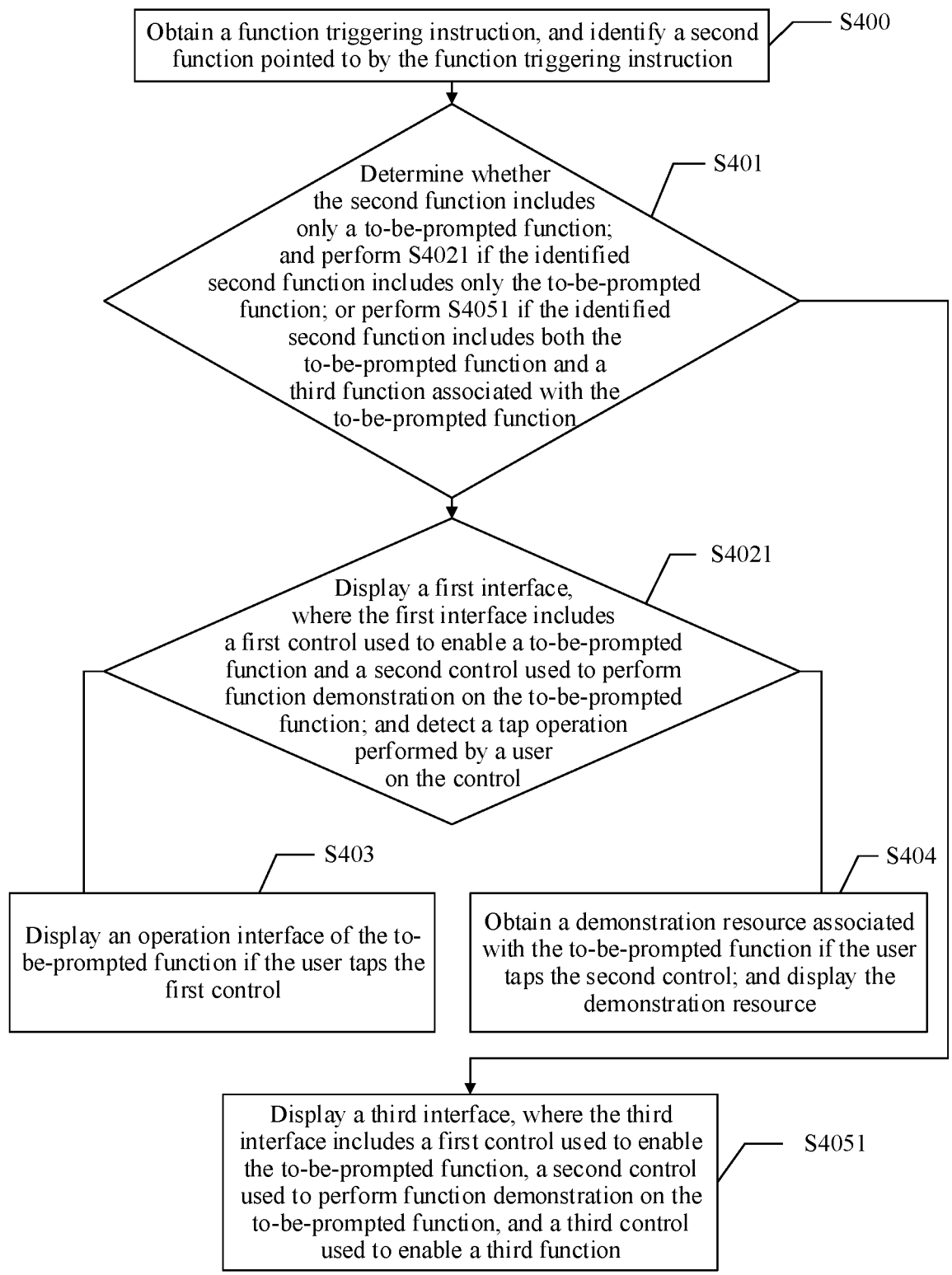
FIG. 4A is a schematic flowchart of a prompt method according to an embodiment of this application.
Figure 4B:
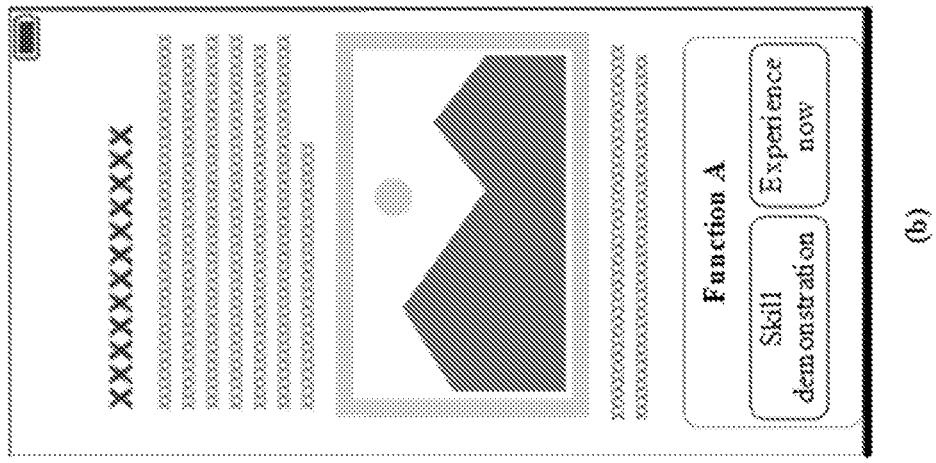
FIG. 4B is a schematic diagram of an application scenario according to an embodiment of this application.
Figure 4B:
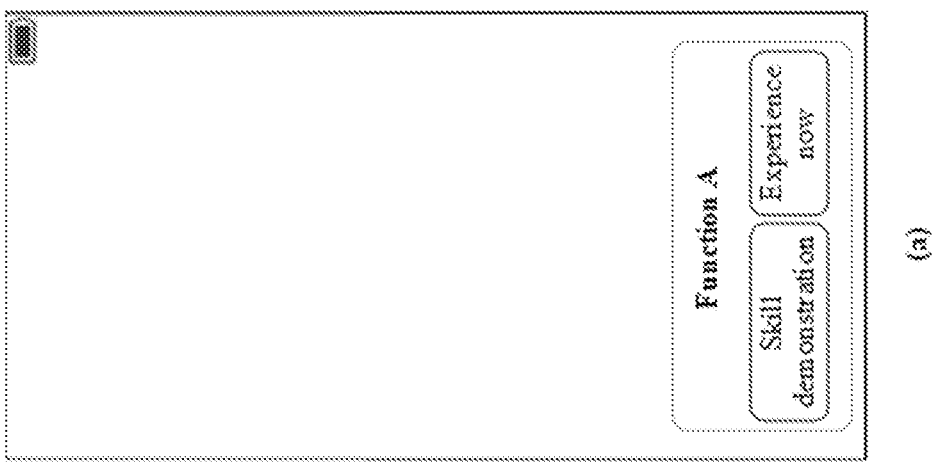
Figure 4C:
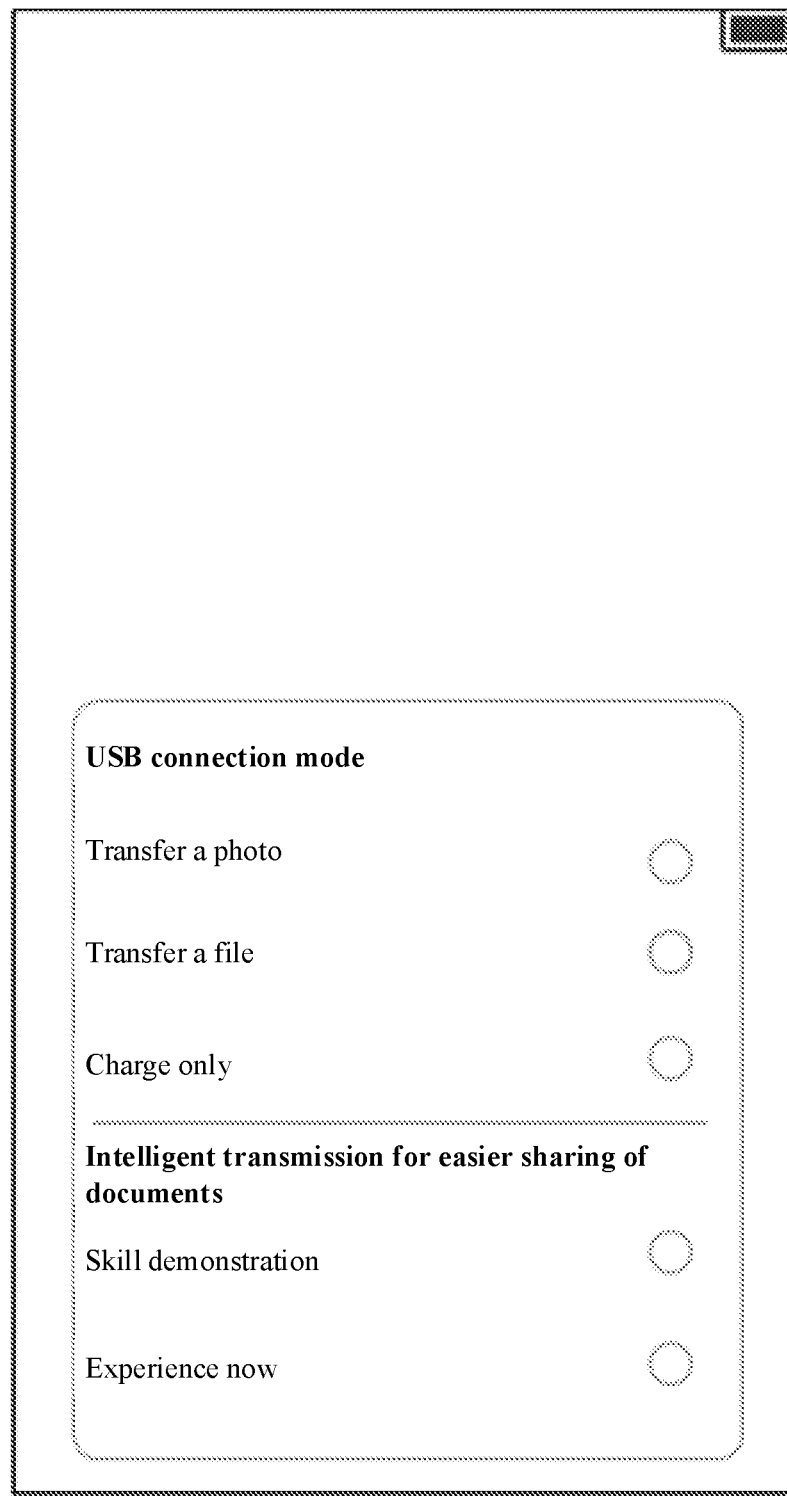
FIG. 4C is a schematic diagram of an application scenario according to an embodiment of this application.
Figure 4D:
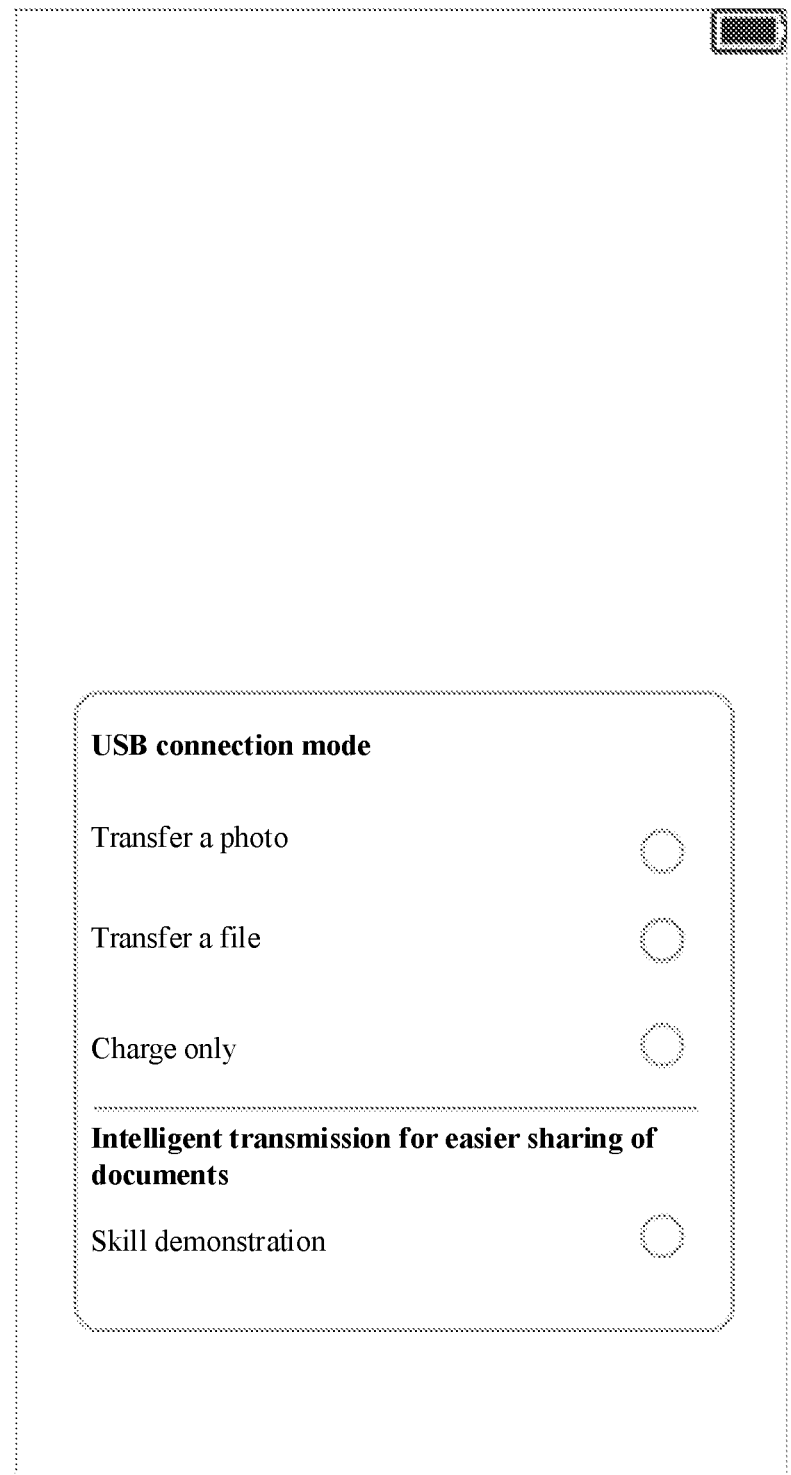
FIG. 4D is a schematic diagram of an application scenario according to an embodiment of this application.
Figure 4E:
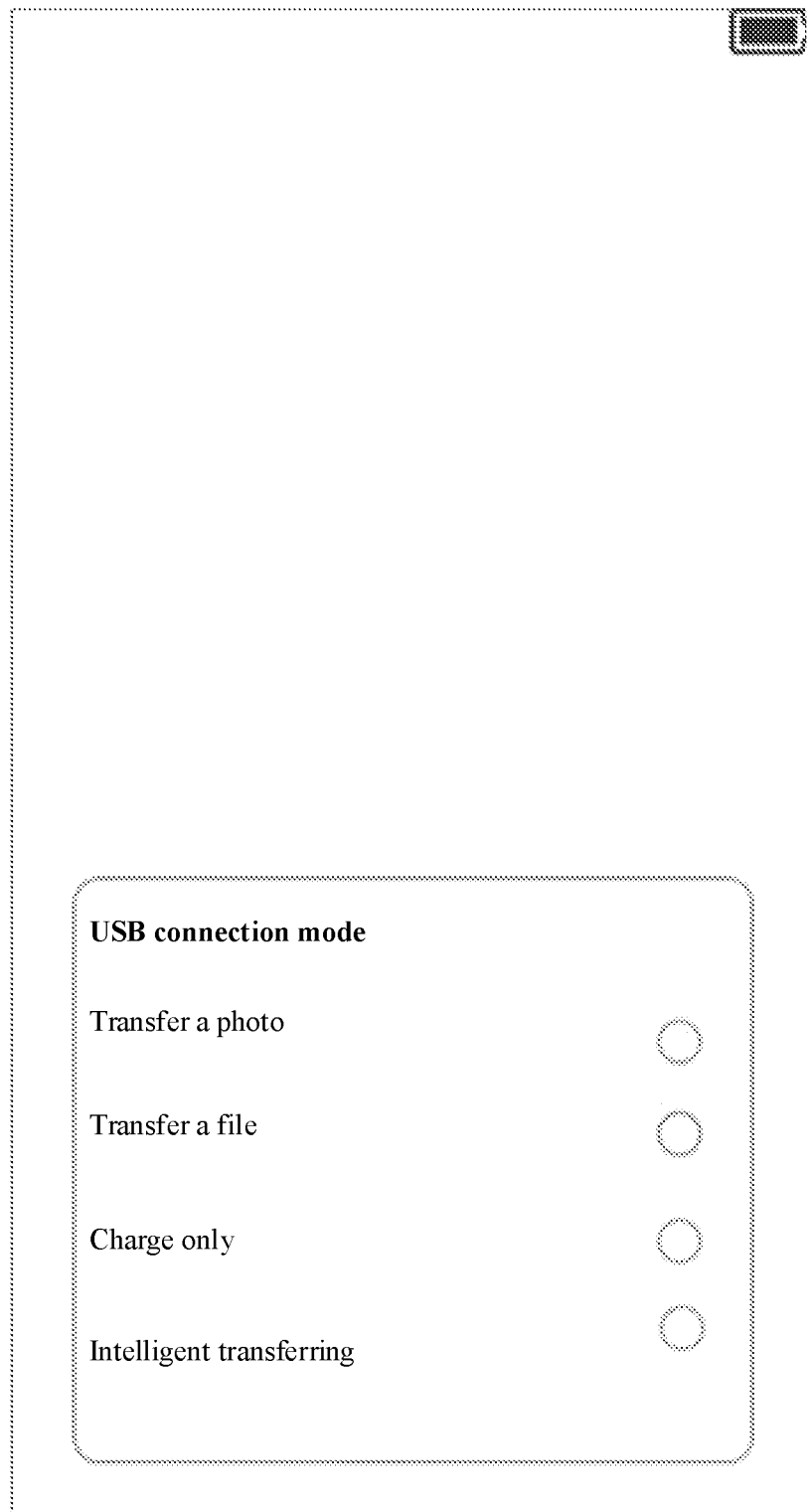
FIG. 4E is a schematic diagram of an application scenario according to an embodiment of this application.

For the second type of to-be-prompted function, FIG. 4A is an implementation flowchart of a prompt method according to an embodiment of this application. S400 to S4051 in FIG. 4A are described in detail as follows:

S400: Obtain a function triggering instruction, and identify a second function pointed to by the function triggering instruction.

S401: Determine whether the second function includes only a to-be-prompted function; and perform S4021 if the identified second function includes only the to-be-prompted function; or perform S4051 if the identified second function includes both the to-be-prompted function and a third function associated with the to-be-prompted function.

The second type of new function originally does not have a displayable control, but usually has a corresponding function triggering manner and a corresponding function triggering instruction. For example, a USB data transmission function can be triggered only when a terminal device is connected to another device through a data cable. In this case, the triggering manner is being connected to another device through a USB port. For another example, for a function of "Tap the screen for three consecutive times to take a full-screen screenshot of the screen", a triggering manner of the function is that a user taps a screen for three consecutive times. In these trigger manners, a terminal device generates a corresponding function triggering instruction, to perform a corresponding function. In addition, the function triggering instruction may alternatively be sent by another device to the terminal device. For example, when accessing some public wireless networks, a terminal device usually needs to perform identity authentication and login. In this case, a router that provides the wireless network sends a function triggering instruction for an identity information input function to the terminal device. After receiving the function triggering instruction, the terminal device pops up a corresponding identity information input box, and after a user inputs identity information, sends the identity information to the router for identity authentication and login.

In this embodiment of this application, when a function triggering instruction for a second-type new function is detected, all functions corresponding to the function triggering instruction are searched for. According to different actual situations, there are two possible results of function search: 1. Only a new function to be prompted is included. 2. In addition to the new function, another old function associated with the new function is also included. Result 1 indicates that only the new function is enabled in the function triggering manner corresponding to the new function. Result 2 indicates that the function triggering manner of the new function is the same as that of some old functions in the terminal device. In this case, both the new function and the associated old function are triggered.

An example is used for description. It is assumed that for the terminal device, "Tap the screen for three consecutive times to take a full-screen screenshot of the screen" is a new function. Previously, "Tap the screen for three consecutive times" does not correspond to any function. In this case, if the terminal device detects that a user taps a screen for three consecutive times, the terminal device generates a corresponding function triggering instruction. The function triggering instruction corresponds to only one function of "Tap the screen for three consecutive times to take a full-screen screenshot of the screen". In this case, the terminal device performs the operation of S402.

Another example is used for description. It is assumed that original USB data transmission includes three functions in total: transferring only a photo, transferring only a file, and charging only. In addition, a new function of "Intelligent transferring" is added. When this function is enabled, files updated after the last data transmission are automatically selected based on a last data transmission record, and are transferred to a USB-connected device. In this case, if the terminal device detects that another device is connected through a USB port, and generates a function triggering instruction corresponding to the USB data transmission, the terminal device finds four corresponding functions in total: transferring only a photo, transferring only a file, charging only, and intelligent transferring, and performs a corresponding operation S4051.

S4021: Display a first interface, where the first interface includes a first control used to enable a to-be-prompted function and a second control used to perform function demonstration on the to-be-prompted function; and detect a tap operation performed by a user on the control.

If the user taps the first control, step S403 is performed. Alternatively, if the user taps the second control, step S404 is performed.

When the new function does not have an associated old function, an interface corresponding to the new function is displayed in this embodiment of this application. Related principles and operation descriptions of interface display of the new function and the control are basically the same as those in S2021. For details, refer to related descriptions in S2021. Details are not described herein again. Only a difference between S4021 and S2021 is described herein as follows:

In this embodiment of this application, the interface of the new function may be an interface of a pop-up box. That is, the interface is a pop-up interface, and may not occupy an entire display (if projection display is used, an entire projection screen may not be occupied). For example, refer to FIG. 4B, two optional interface pop-up manners are included. In (a), when an interface of a function A is displayed, content on an original interface is masked, so that a user can better notice a new function. In (a), when an interface of a function A is displayed, content on an original interface is retained so that a user can continue to view content on the original interface.

In addition, S4021 may be replaced with: Display an operation interface of the to-be-prompted function, where the operation interface includes a second control that is used to perform function demonstration on the to-be-prompted function; obtain a demonstration resource associated with the to-be-prompted function if the user taps the second control; and display the demonstration resource.

In this embodiment of this application, the first interface is an operation interface of a new function, and further includes a demonstration control. A user can directly try a new function through the operation interface, and view the function demonstration when necessary. This greatly improves convenience of understanding and using the new function by the user. This is conducive to improve usage of the new function.

S403: Display an operation interface of the to-be-prompted function if the user taps the first control.

Related principles and operation descriptions of the operation interface of the new function are the same as those in S203. For details, refer to related descriptions in S203. Details are not described herein again.

S404: Obtain a demonstration resource associated with the to-be-prompted function if the user taps the second control, and display the demonstration resource.

Principles and operation descriptions of obtaining the demonstration resource of the new function are the same as those in S204. For details, refer to related descriptions in S204. Details are not described herein again.

S4051: Display a third interface, where the third interface includes a first control used to enable the to-be-prompted function, a second control used to perform function demonstration on the to-be-prompted function, and a third control used to enable a third function;

detect a tap operation performed by the user on the control; and perform step S403 if the user taps the first control; perform step S404 if the user taps the second control; or display an operation interface of the third function if the user taps the third control.

When there are old functions associated with the new function, an interface including both the old functions and the new function is displayed in this embodiment of this application. For a display principle, a display method, and the like of the third interface, refer to related descriptions of the first interface. Details are not described herein again. A difference from the first interface lies in that the third interface further includes controls of these old functions. A control layout and the like between controls are not excessively limited in this embodiment of this application, and may be set by a person skilled in the art based on an actual requirement.

An example is used for description. It is assumed that there are four functions in total: transferring only a photo, transferring only a file, charging only, and intelligent transferring. Intelligent transferring is a new function, and the other functions are old functions. In this case, a third interface may be displayed with reference to FIG. 4C.

An operation interface of the old function is an operation interface set for the old function in an actual application program or an operating system.

In an optional embodiment of this application, this embodiment corresponds to S2024, S2025, and S2026. To facilitate use of the new function when the user is familiar with the operation of the new function, so that the man-machine interaction operation of the user is more efficient and friendly, in this embodiment of this application, S4021 may be replaced with:

S4022: Obtain a total number of times the to-be-prompted function is used; determine whether the total number of times is greater than a first number-of-times threshold; and perform S4023 if the total number of times is less than or equal to the first number-of-times threshold; or perform S4024 if the total number of times is greater than the first number-of-times threshold.

S4023: Display the first interface, where the first interface includes a first control used to enable the to-be-prompted function and a second control used to perform function demonstration on the to-be-prompted function; and perform step S403 if the user taps the first control; or perform S404 if the user taps the second control.

S4024: Display an operation interface of the to-be-prompted function.

In this embodiment of this application, after only the new function is found, a total number of times (that is, a third total number of times) that the user has used the new function is further determined. Whether the user is familiar with the function is determined. If the user is unfamiliar with the function, an interface including function demonstration is displayed. If the user is familiar with the new function, the corresponding interface is not displayed. Instead, an operation interface of the new function is displayed. In this way, the user can quickly use new function. For operation principles and detailed descriptions of S4022, S4023, and S4024, refer to related descriptions of S2024, S2025, and S2026. Details are not described herein again.

In an optional embodiment of this application, this embodiment corresponds to S2024, S2025, and S2026. To facilitate use of the new function when the user is familiar with the operation of the new function, so that man-machine interaction operation of the user is more efficient and friendly, in this embodiment of this application, S4051 may be replaced with:

S4052: Obtain a third total number of times the to-be-prompted function is used; determine whether the third total number of times is greater than the first number-of-times threshold; and perform S4053 if the third total number of times is less than or equal to the first number-of-times threshold; or perform S4054 if the third total number of times is greater than the first number-of-times threshold.

S4053: Display a third interface, where the third interface includes a first control used to enable the to-be-prompted function, a second control used to perform function demonstration on the to-be-prompted function, and a third control used to enable a third function; and perform step S403 if the user taps the first control; perform step S404 if the user taps the second control; or display an operation interface of the third function if the user taps the third control.

S4054: Display a fourth interface, where the fourth interface includes a first control used to enable the to-be-prompted function and a third control used to enable the third function; and perform step S403 if the user taps the first control; or display the operation interface of the third function if the user taps the third control.

In this embodiment of this application, after the new function and a corresponding old function are found, a total number of times that the user has used the new function is further determined, to determine whether the user is familiar with the function. If the user is unfamiliar with the function, an interface including function demonstration is displayed. If the user is familiar with the function, an interface not including function demonstration is displayed. For operation principles and detailed descriptions of S4052, S4053, and S4054, refer to related descriptions of S2024, S2025, and S2026. Details are not described herein again.

An example is used for description. It is assumed that there are four functions in total: transferring only a photo, transferring only a file, charging only, and intelligent transferring. Intelligent transferring is a new function, and the other functions are old functions. In this case, the fourth interface may be displayed with reference to FIG. 4D or FIG. 4E.

In embodiments of this application, when receiving a function triggering instruction for a new function without a displayable control, the terminal device searches for all functions pointed to by the function triggering instruction. If it is found that only the new function is pointed to, an interface including a control including the new function and a control used to perform function demonstration on the new function is displayed. In this way, after triggering the new function, the user can intuitively learn a feature of the new function and use the new function. Therefore, interest of the user in the new function is improved, and usage of the new function is improved. If it is found that both the new function and an original function are pointed to, an interface including a control of the original function, a control of the new function, and a control used to perform function demonstration on the new function is displayed. In this way, on a basis that the user can normally use the original function, the user can also intuitively learn of a feature of the new function and use the new function. In this way, interest of the user in the new function is improved. In addition, the control of each function is provided for the user to perform an operation, and the user needs to make a selection. Therefore, a number of times of man-machine interaction between the user and the terminal device is increased. In this way, the user can better understand and get used to the new function and improves usage of the new function.

In addition, in this embodiment of this application, a total number of times that the user uses the new function is further counted, and whether the user is familiar with the new function is determined based on the total number of times. When the user is familiar with the new function, function demonstration of the new function is canceled. Instead, the operation interface of the new function is open. In this embodiment of this application, when the user is familiar with the operation of the new function, use of the new function by the user is facilitated, so that a man-machine interaction operation of the user is more efficient and friendly. Efficiency of man-machine interaction between the user and the terminal device is improved, and user experience is improved.

FIG. 2A to FIG. 4E are all described by using an example in which the to-be-prompted content is a function. However, during actual application, the to-be-prompted content may alternatively be content other than a function. For ease of description, to-be-prompted content other than a function is collectively referred to as a to-be-prompted object in embodiments of this application.

To describe technical solutions in this application, the following uses an example in which the to-be-prompted content is a to-be-prompted object for description with reference to specific embodiments.

Figure 5A:
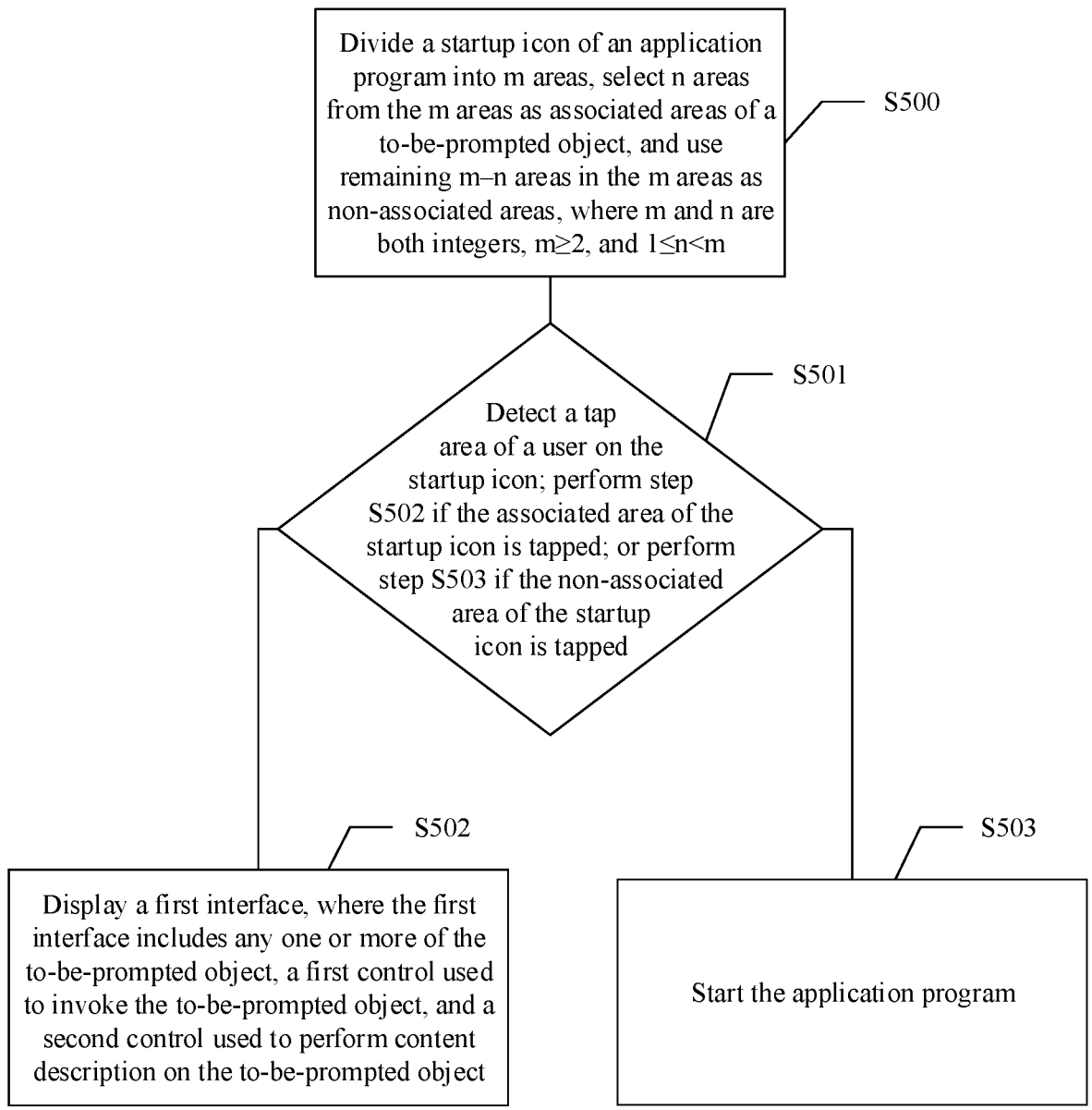
FIG. 5A is a schematic flowchart of a prompt method according to an embodiment of this application.

For a to-be-prompted object belonging to the first type of content, FIG. 5A is an implementation flowchart of a prompt method according to an embodiment of this application. S500 to S503 in FIG. 5A are described in detail as follows:

S500: Divide a startup icon of an application program into m areas; select n areas from the m areas as associated areas of a to-be-prompted object, and use remaining m-n areas in the m areas as non-associated areas, where m and n are both integers, m≥2, and 1≤n<m.

S501: Detect a tap area of a user on the startup icon; perform step S502 if the associated area of the startup icon is tapped; or perform step S503 if the non-associated area of the startup icon is tapped.

Principles and operation details of S500 and S501 are basically the same as those of S200 and S201. Therefore, refer to related description content of S200 and S201. Details are not described herein again.

S502: Display a first interface, where the first interface includes any one or more of the to-be-prompted object, a first control used to invoke the to-be-prompted object, and a second control used to perform content description on the to-be-prompted object.

In this embodiment of this application, to implement effective prompting for the to-be-prompted object, three corresponding display items are proposed, and are respectively: the to-be-prompted object, the first control that can be used to invoke the to-be-prompted object, and the second control that can be used to perform description on the to-be-prompted object. Description of each item is as follows:

1. A to-be-prompted object. Because the to-be-prompted object is content that needs to be presented to the user for viewing or using, after the user taps the associated area, an interface including the to-be-prompted object is displayed. In this way, the user can quickly view the to-be-prompted object, and the user may select whether to use the to-be-prompted object based on to an actual requirement, so that the user is effectively prompted.
2. A control that can be used to invoke the to-be-prompted object, and a control that can be used to can perform content description on the to-be-prompted object. In an actual situation, the to-be-prompted object may include a relatively large amount of content or relatively complex content. In this case, if only the to-be-prompted object is displayed, it may be difficult for the user to obtain a general understanding of the to-be-prompted object, and it is more difficult for the user to effectively view or use the to-be-prompted object. Therefore, it is more difficult for the user to use the to-be-prompted object, and further, it is not conducive to improving subsequent usage of the to-be-prompted object by the user. For example, it is assumed that an application program is a novel reader, and a to-be-prompted object is a recently updated novel. In this case, because there is a relatively large amount of novel content, if only text content of the novel is displayed on a first interface, it is difficult for a user to obtain an understanding the entire novel. Therefore, it is not conducive to improving interest of the user in the novel and a subsequent probability of viewing the novel.

To cope with this case, in this embodiment of this application, it is proposed that a first control that can be used to invoke the to-be-prompted object and a second control that can be used to perform content description on the to-be-prompted object may be displayed in an interface. The first control may enable the user to determine, based on an actual requirement of the user, whether a terminal device needs to display the to-be-prompted object. The second control may be used to assist the user in understanding some details of the to-be-prompted object. To describe content of the to-be-prompted object, a corresponding description resource is set in this embodiment of this application. When necessary, the content description of the to-be-prompted object is implemented by displaying the description resource.

Based on permutation and combination of the preceding three items, the following seven item combination manners are available for a person skilled in the art to select. (That is, there are seven possible cases of prompt elements on the interface.)

Combination 1: Only the to-be-prompted object is included.

Combination 2: Only the first control is included.

Combination 3: Only the second control is included.

Combination 4: The to-be-prompted object and the first control are included.

Combination 5: The to-be-prompted object and the second control are included.

Combination 6: The first control and the second control are included.

Combination 7: The to-be-prompted object, the first control, and the second control are included.

During actual application, a person skilled in the art may select any one of the seven item combination manners for display based on a requirement. This is not limited herein. For example, only any one of the items may be selected to be displayed in the first interface, or two or three items may be selected to be displayed in the first interface. In addition, based on the foregoing seven manners, in an optional embodiment of this application, some content information of the to-be-prompted object such as a content name of the to-be-prompted object may also be displayed in the interface. For specific description of the content information, refer to related descriptions in the embodiment shown in FIG. 2A. Details are not described herein again.

A function of the first control in this embodiment of this application is to invoke the to-be-prompted object, and a function of the first control in the embodiment shown in FIG. 2A is to enable the to-be-prompted function. Both are essentially to trigger code running in the terminal device and complete a corresponding function, so as to display the to-be-prompted content. A function of the second control in this embodiment of this application is to perform content description on the to-be-prompted object, and a function of the second control in the embodiment shown in FIG. 2A is to perform function demonstration on the to-be-prompted function. Both are essentially to describe the to-be-prompted content. (The demonstration is an optional method for describing the content.) Therefore, for descriptions of principles, operation details, and the like of the first control and the second control in this embodiment of this application, refer to related descriptions of the first control and the second control in the embodiment shown in FIG. 2A and other embodiments related to the embodiment shown in FIG. 2A (correspondingly, for the to-be-prompted content, the to-be-prompted function needs to be replaced with the to-be-prompted object). Details are not described herein again. Correspondingly, after S502, in this embodiment of this application, an operation performed by the user in the interface is detected. For a response manner after the user taps the first control and the second control, refer to related descriptions (for example, descriptions of S203 and S204) in the embodiment shown in FIG. 2A and other embodiments related to the embodiment shown in FIG. 2A. Details are not described herein again.

The following separately describes the foregoing seven item combination manners by using some examples: It is assumed that the to-be-prompted object is a GUI theme file A (referred to as a theme A).

Figure 5B:
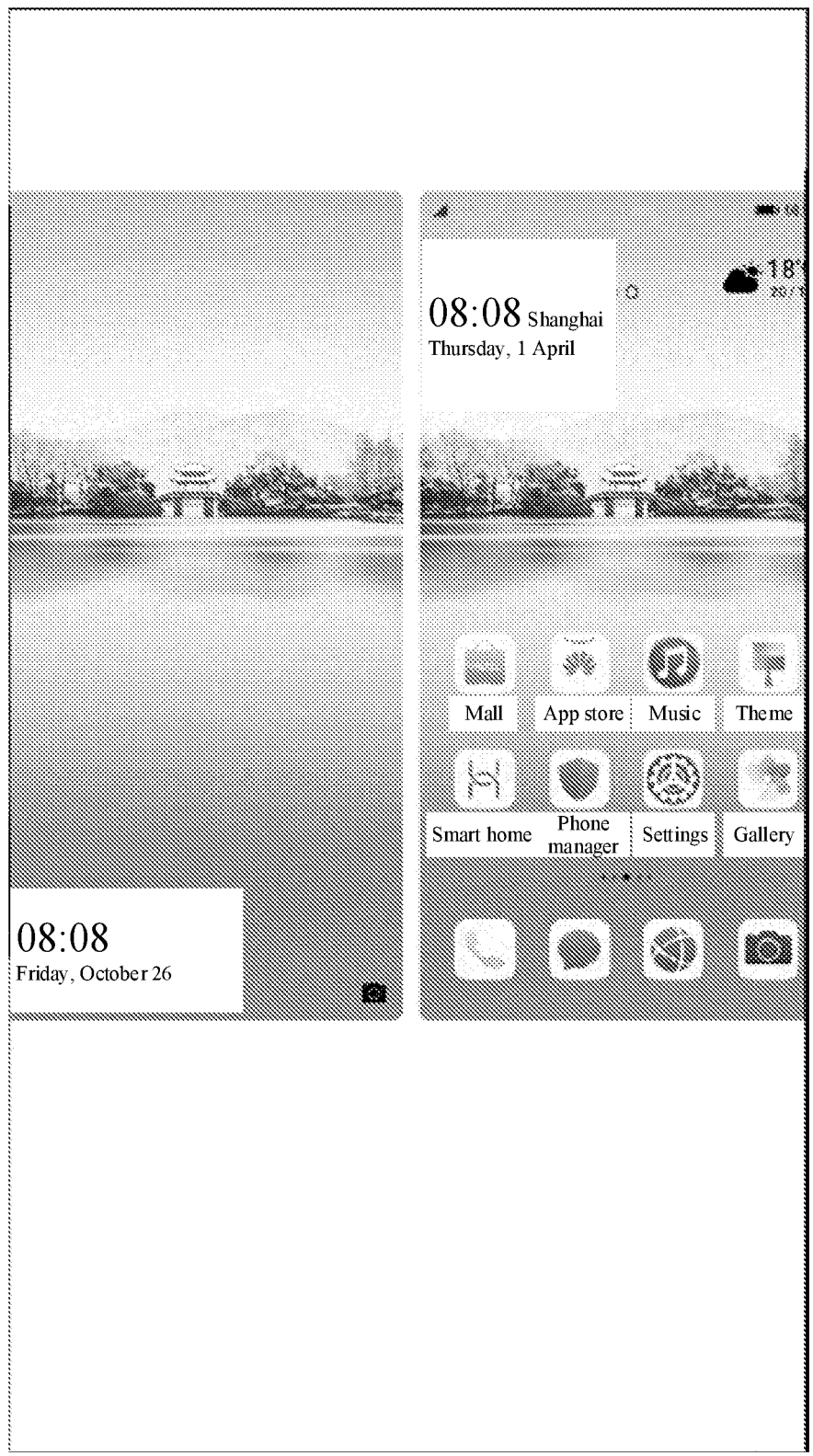
FIG. 5B is a schematic diagram of an application scenario according to an embodiment of this application.

Combination 1: Only the to-be-prompted object is included. Refer to FIG. 5B. In this case, only the theme A is displayed in the first interface. The user can view content of the theme A on the interface.

Figure 5C:
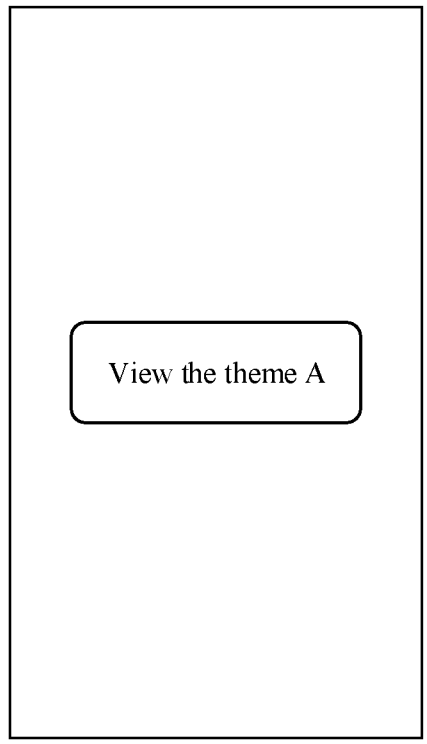
FIG. 5C is a schematic diagram of an application scenario according to an embodiment of this application.

Combination 2: Only the first control is included. Refer to FIG. 5C. In this case, the first interface displays only one control that can be used to invoke the theme A. To prompt the user to learn of a function of the control, prompt content of "View the theme A" is further displayed in the control in this embodiment of this application.

Figure 5D:
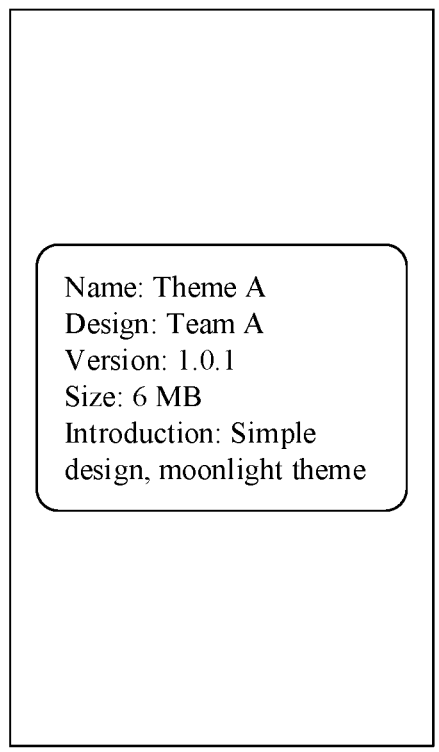
FIG. 5D is a schematic diagram of an application scenario according to an embodiment of this application.

Combination 3: Only the second control is included. Refer to FIG. 5D. In this case, a first interface displays only one second control that is used to describe the theme A.

Figure 5E:
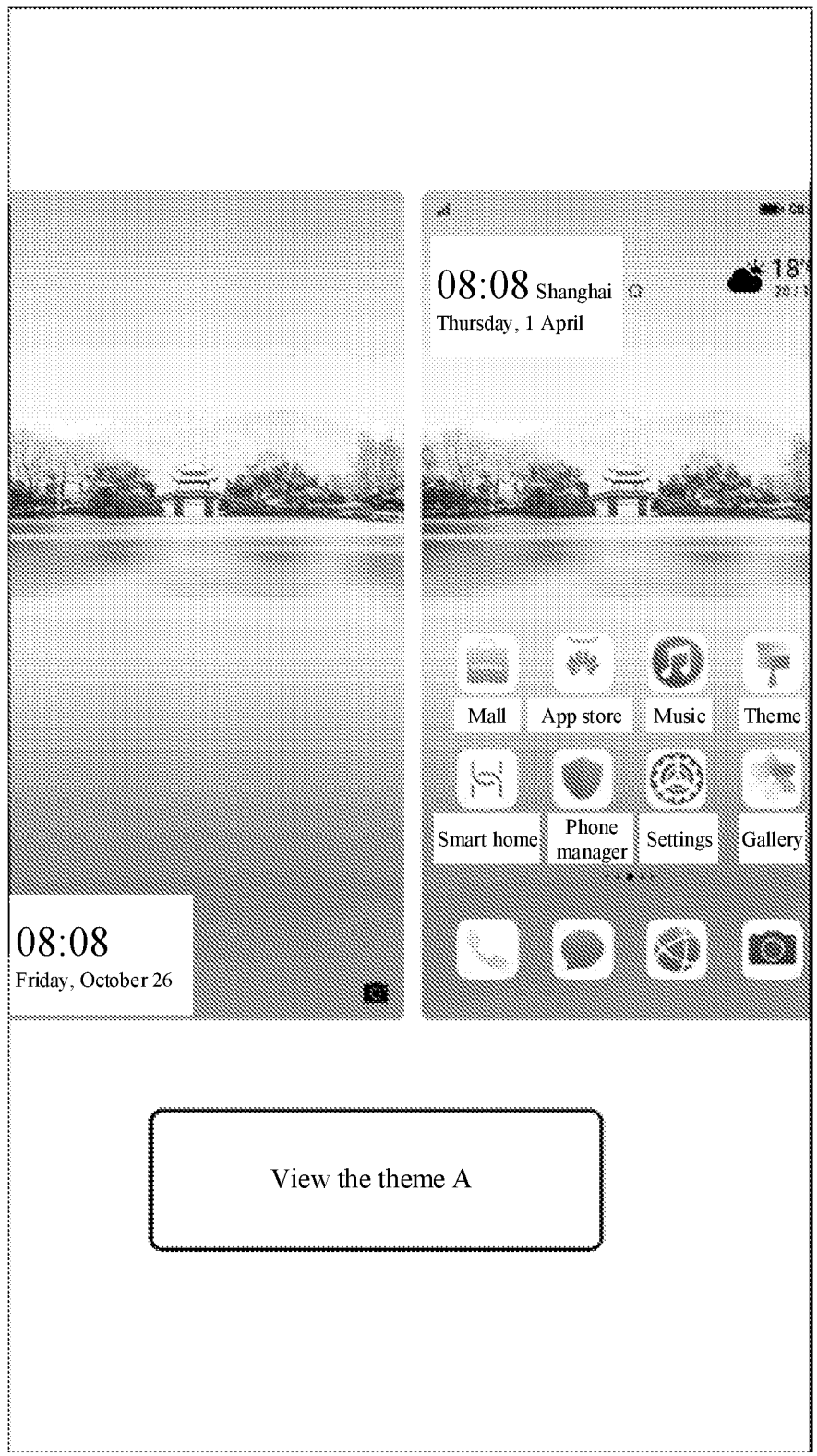
FIG. 5E is a schematic diagram of an application scenario according to an embodiment of this application.

Combination 4: The to-be-prompted object and the first control are included. Refer to FIG. 5E. Considering that the to-be-prompted object has been displayed in the first interface, to improve practicability of the first control, in this embodiment of this application, a response action corresponding to the first control may be set as: displaying a new interface, and displaying all content of the theme A in a thumbnail manner in the interface. In this case, if the user taps the first control, all content of the theme A may be viewed in the new interface, and any theme picture may be further selected for viewing based on a requirement.

Figure 5F:
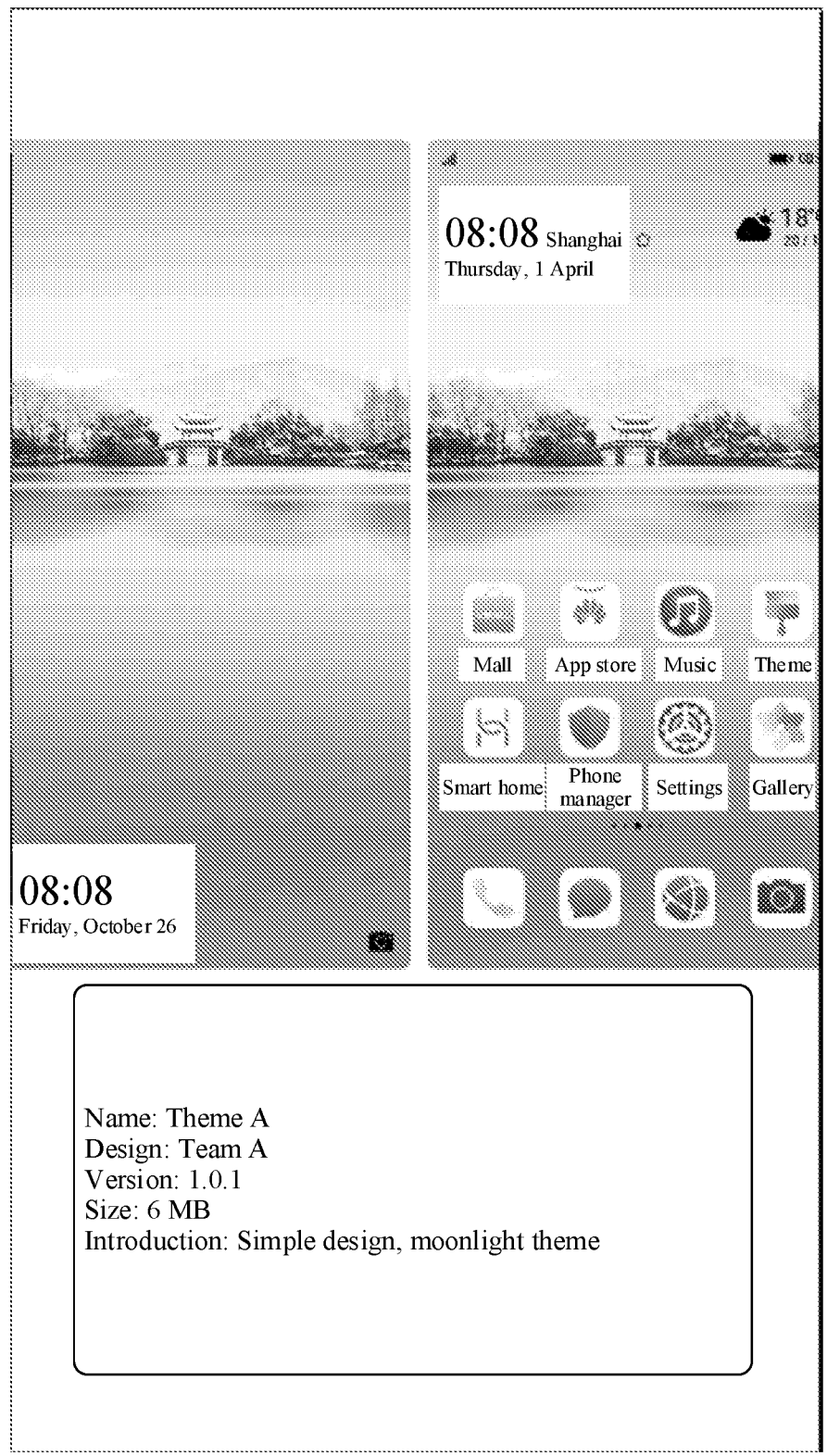
FIG. 5F is a schematic diagram of an application scenario according to an embodiment of this application.

Combination 5: The to-be-prompted object and the second control are included. Refer to FIG. 5F. In this case, in the first interface, the user may view both the theme A and content description of the theme A. In this way, the user can learn of some information about the theme A when viewing the theme A.

Figure 5G:
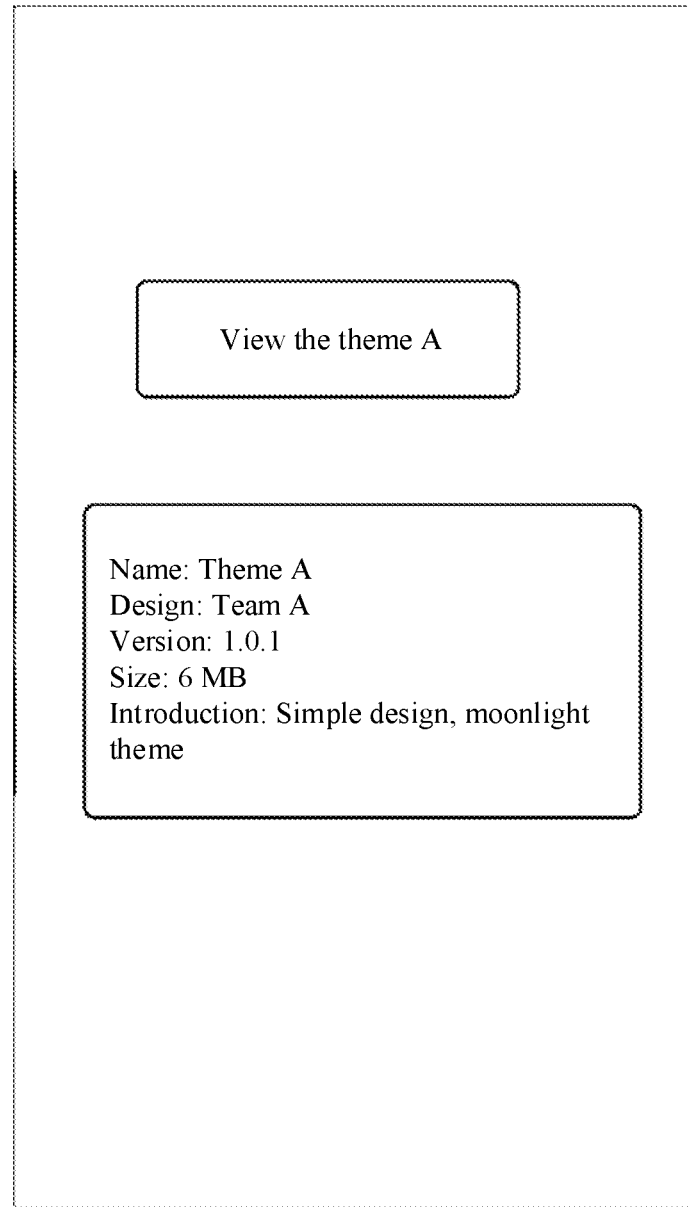
FIG. 5G is a schematic diagram of an application scenario according to an embodiment of this application.

Combination 6: The first control and the second control are included. Refer to FIG. 5G. In this case, the user may learn of some information about the theme A based on the second control. To view the theme A, the user can tap the first control. A window type control is selected as an actually used second control, so that the user can quickly learn of details of the theme A.

Figure 5H:
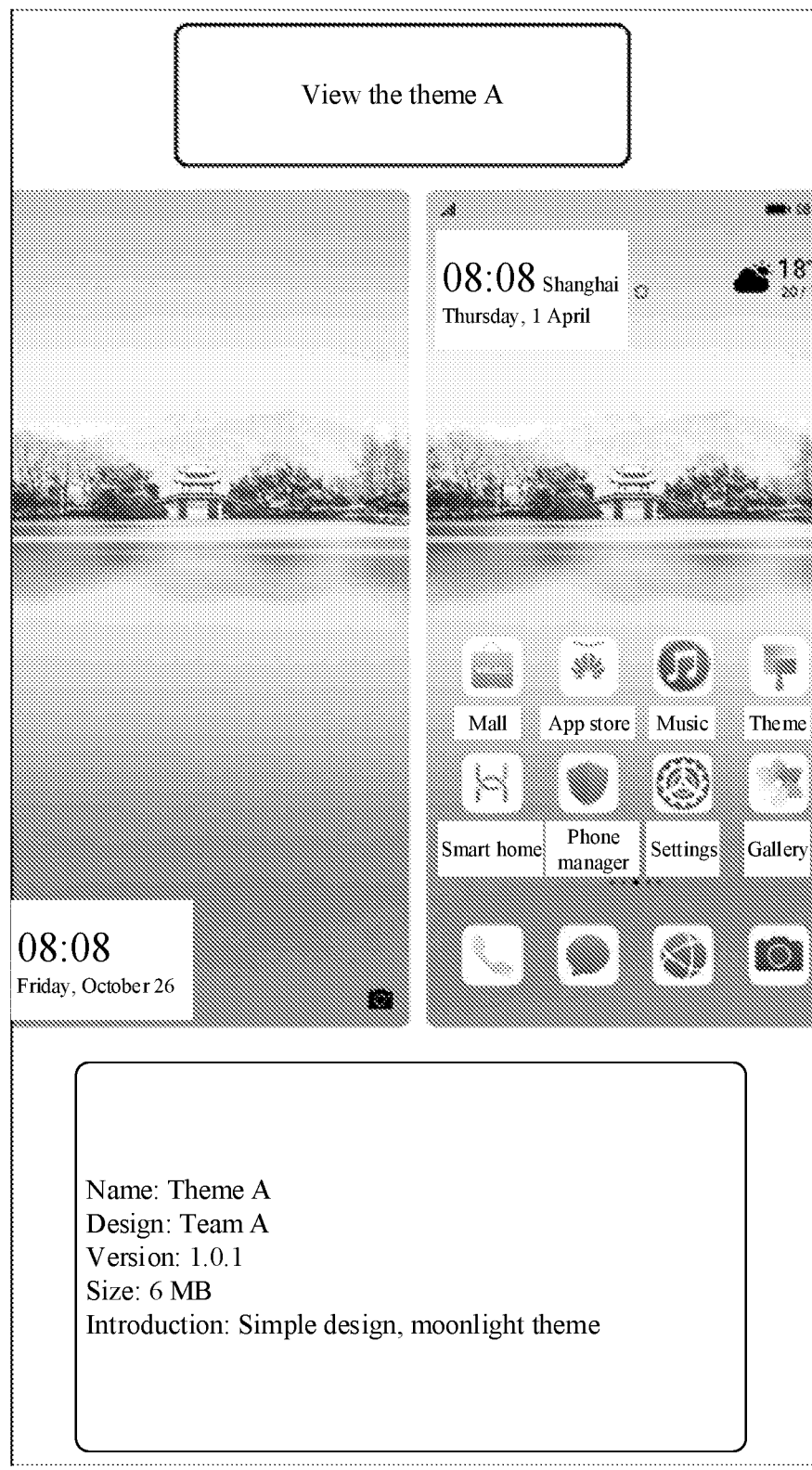
FIG. 5H is a schematic diagram of an application scenario according to an embodiment of this application.
Figure 5I:
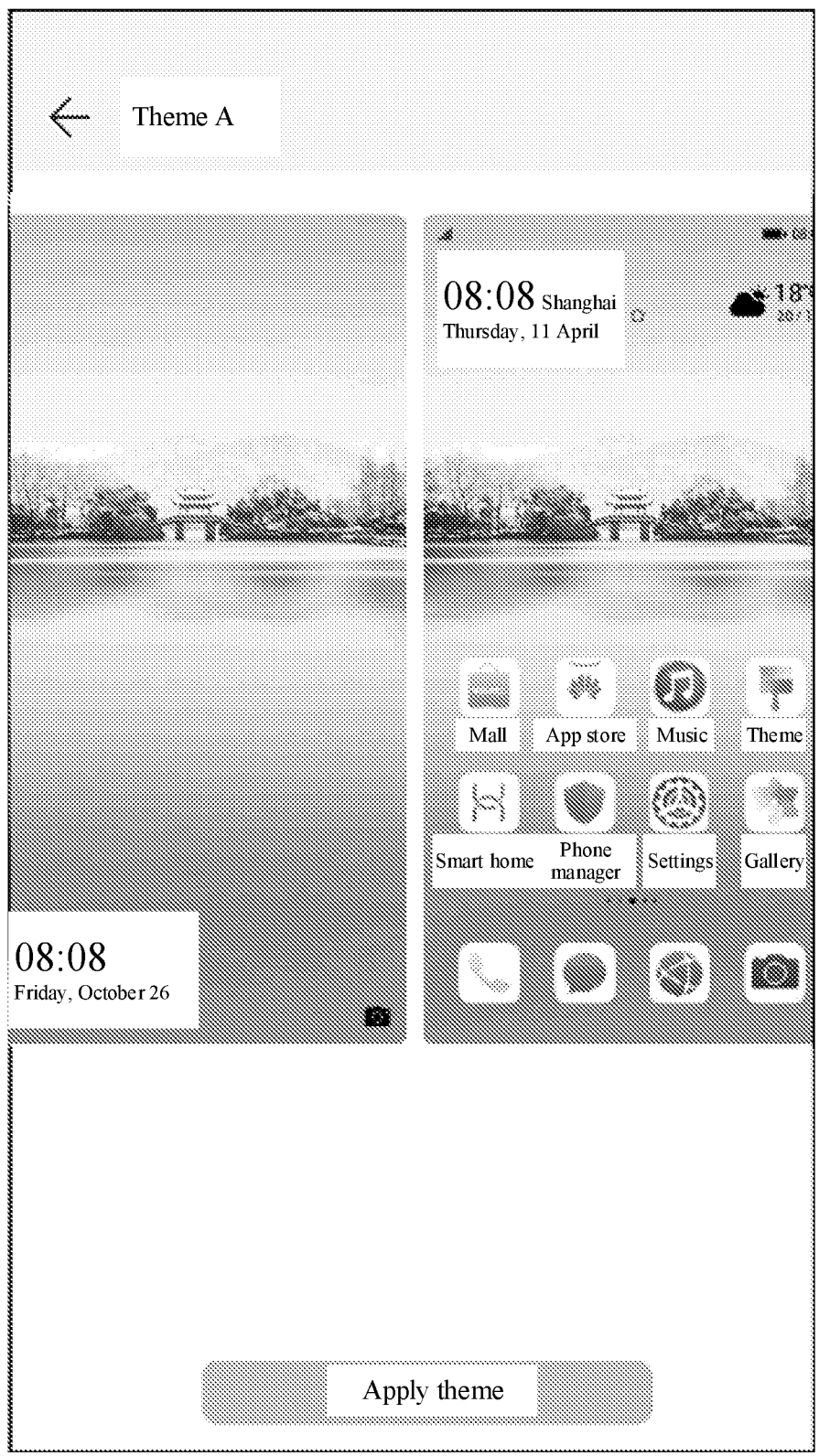
FIG. 5I is a schematic diagram of an application scenario according to an embodiment of this application.

Combination 7: The to-be-prompted object, the first control, and the second control are included. Refer to FIG. 5H. To improve practicability of the first control, a response action corresponding to the first control may be set with reference to Combination 4. In this case, the user may fully learn of actual content and information of the theme A, and may view all content of the theme A by tapping the first control based on a requirement of the user.

In the foregoing embodiments, a window type control is selected as an actually used second control, and is set to automatic play, so that the user can quickly learn of the details of the theme A. For specific descriptions of the window type control, refer to related descriptions in the embodiment shown in FIG. 2A. Details are not described herein again.

During actual application, a person skilled in the art may select any one of the seven combinations for application. In addition, it should be further noted that, based on the seven combination manners, a person skilled in the art may further select, based on an actual requirement, some content to be displayed in the first interface together. For example, refer to FIG. 5I. Based on FIG. 5B, a name of the theme A is added above the first interface, and a control for exiting the interface is added, so that the user can know the name of the theme and exit when the theme does not need to be viewed. A control for applying the theme is added below. In this way, when the user prefers the theme and wants to apply the theme, application of the theme A can be quickly implemented. This facilitates user operations.

S503: Start the application program.

After the user taps the non-associated area, the application program can be normally started in this embodiment of this application program. Because some application program interfaces are also displayed after the program is started, a specific interface may be determined based on an actual application program, and is not limited herein. For example, the interfaces may be some interfaces including a plurality of controls, or may be operation interfaces of some specific functions, or may be some promotion interfaces (such as advertisement interfaces).

In an optional embodiment of this application, embodiment content corresponding to S2052 in the embodiment shown in FIG. 2A may also be applied with reference to this embodiment of this application. Correspondingly, in this case, S503 may be replaced with: Display a second interface, where the second interface includes at least one third control used to start a second function of the application program. For specific descriptions of this embodiment, refer to related descriptions of S2052. Details are not described herein again.

In another optional embodiment of this application, embodiment content corresponding to S2024 to S2026 in the embodiment shown in FIG. 2A may also be applied with reference to this embodiment of this application. Correspondingly, S502 may be replaced with S5021 to S5023.

S5021: Obtain a first total number of times the to-be-prompted object is used; determine whether the first total number of times is greater than a first number-of-times threshold; and perform S5021 if the first total number of times is greater than the first number-of-times threshold; or perform S5022 if the first total number of times is less than or equal to the first number-of-times threshold.

S5022: Display a fifth interface including the to-be-prompted object.

S5023: Display the first interface, where the first interface includes any one or more of the to-be-prompted object, a first control used to invoke the to-be-prompted object, and a second control used to perform content description on the to-be-prompted object; and detect a tap operation performed by the user on the first interface.

For specific descriptions of this embodiment, refer to related descriptions of S2024 to S2026. Details are not described herein again. (Correspondingly, the fifth interface in this embodiment of this application is equivalent to the operation interface in S2025.)

In still another optional embodiment of this application, embodiment content corresponding to S206 and S207 in the embodiment shown in FIG. 2A may also be applied with reference to this embodiment of this application. In this case, in this embodiment of this application, the method further includes S504 and S505.

S504: Obtain a second total number of times the to-be-prompted object is used; cancel an operation of dividing the startup icon of the application program into the m areas if the second total number of times is greater than or equal to a second number-of-times threshold; and use all areas of the startup icon as a whole to respond to the operation.

S505: Start the application program if a tap operation performed by the user on the startup icon is detected.

A manner of obtaining the total number of times the to-be-prompted object is used is not limited herein, and may be set by a person skilled in the art based on an actual requirement. For example, in some optional embodiments, counting may be performed each time a user taps a first control used to invoke a to-be-prompted object, and a counting result is used as a total number of times that the to-be-prompted object is used. In some other optional embodiments, the user may also use the to-be-prompted object in another manner other than tapping the associated area. For example, the user may find the to-be-prompted object through an operation of normally using the application program. Therefore, statistics collection performed only based on a counting result of the first control is inaccurate sometimes. Therefore, in this embodiment of this application, a number of times that the to-be-prompted object is displayed on the terminal device is counted, and the number of times is used as a total number of times that the to-be-prompted object is used.

Some to-be-prompted objects are content of a resource type, for example, term information in user notice. Therefore, in some optional embodiments, the number of times that the to-be-prompted object is used may include the number of times that the to-be-prompted object is viewed. Principle, effects, and the like of S504 and S505 are basically the same as those of S206 and S207 (in this case, S500 to S503 are equivalent to S200 to S2051 in the embodiment shown in FIG. 2A). Therefore, refer to descriptions of related principles, effects, and the like in S206 and S207. Details are not described herein again.

For a to-be-prompted object that belongs to the first type of to-be-prompted content and is not a function, in this embodiment of this application, a startup icon of an application program is first divided into an associated area and a non-associated area in advance. When the user taps the non-associated area, the terminal device normally starts the application program. However, when the user taps the associated area, an interface including any one or more pieces of content of the to-be-prompted object, the first control used to invoke the to-be-prompted object, and the second control used to perform content description on the to-be-prompted object is displayed. Through this interface, the user can fully notice the to-be-prompted object. In addition, the user may further learn of, view, and use the to-be-prompted object based on different actual details included in the interface. Therefore, in this embodiment of this application, the user can gradually get familiar with the to-be-prompted object after noticing the to-be-prompted object, thereby improving subsequent usage of the to-be-prompted object by the user.

In addition, in this embodiment of this application, after the user views or uses the to-be-prompted object for a plurality of times, it may be automatically identified that the user is familiar with the to-be-prompted object, and content description of the to-be-prompted object is canceled. Therefore, in this embodiment of this application, when the user is familiar with the to-be-prompted object, it can be convenient for the user to view and use the to-be-prompted object, so that a man-machine interaction operation of the user is more efficient and friendly. However, in a case in which the user is very familiar with the to-be-prompted object, the to-be-prompted object does not need to be prompted anymore. In this case, the area division operation on the startup icon is canceled in this embodiment of this application. In this way, when the user taps any area location of the startup icon, the application program can be started. Therefore, in this embodiment of this application, use of the new function by the user can be facilitated, man-machine interaction efficiency between the user and the terminal device can be improved, and user experience can be improved.

Figure 6A:
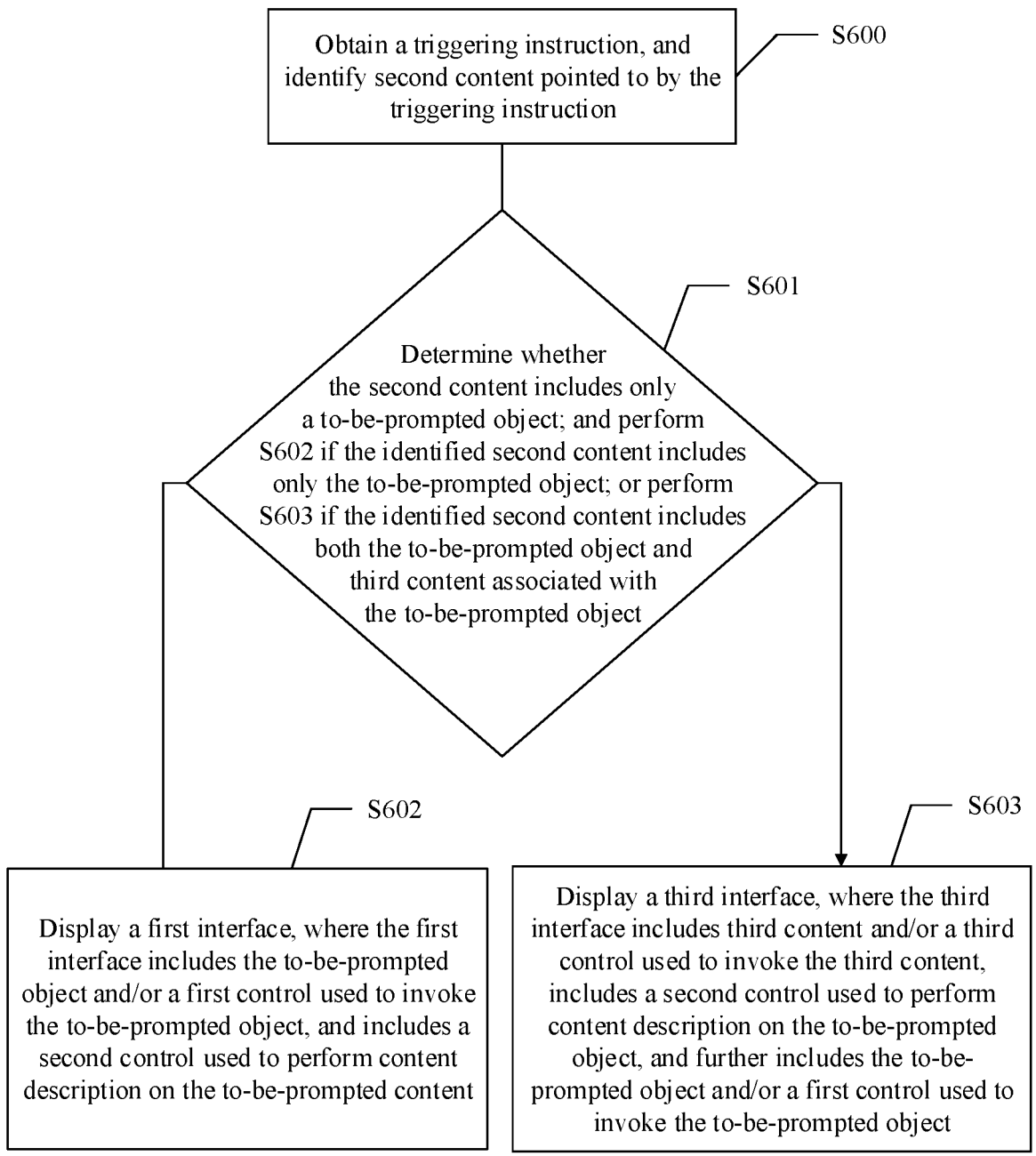
FIG. 6A is a schematic flowchart of a prompt method according to an embodiment of this application.

For a to-be-prompted object belonging to the second type of content, FIG. 6A shows an implementation flowchart of a prompt method according to an embodiment of this application. Details are as follows:

S600: Obtain a triggering instruction, and identify second content pointed to by the triggering instruction.

S601: Determine whether the second content includes only a to-be-prompted object; and perform S602 if the identified second content includes only the to-be-prompted object; or perform S603 if the identified second content includes both the to-be-prompted object and third content associated with the to-be-prompted object.

The to-be-prompted object of the second type needs to invoke content in some specific triggering manners. Correspondingly, the terminal device generates corresponding triggering instructions because of these triggering operations. Therefore, in this embodiment of this application, whether corresponding to-be-prompted content needs to be invoked is determined in a manner of detecting a triggering instruction. For example, it is assumed that if a power button is pressed for three consecutive times, hardware configuration information of a terminal device may be invoked. In this case, a corresponding triggering manner is that a user presses the power button for three consecutive times. In addition, the triggering instruction may alternatively be sent by another device to the terminal device. For example, when a terminal device accesses some specific service provider networks by using an application program, the service providers may display some advertisements by using the application program. In this case, a router providing a wireless network sends a triggering instruction to the terminal device. After receiving the triggering instruction, the terminal device reads and displays an advertisement resource corresponding to the application program. In this case, the advertisement resource is a corresponding to-be-prompted object.

In this embodiment of this application, when the triggering instruction for the to-be-prompted object is detected, all objects corresponding to the triggering instruction are searched for. Theoretically, there may be the following two search results: 1. Only the to-be-prompted object is included. 2. Other content is included in addition to the to-be-prompted object. For result 1, in this embodiment of this application, it is described that only the to-be-prompted object is enabled in the function triggering manner corresponding to the to-be-prompted object. For result 2, it indicates that a function triggering manner of the to-be-prompted object is the same as that of some other content in the terminal device. In this case, both the to-be-prompted object and the associated other content are triggered.

S602: Display a first interface, where the first interface includes the to-be-prompted object and/or a first control used to invoke the to-be-prompted object, and further includes a second control used to perform content description on the to-be-prompted content.

Related principles and operation descriptions of the control are basically the same as those in S502. For details, refer to related descriptions in S502. Details are not described herein again. Correspondingly, after S602, in this embodiment of this application, an operation performed by the user in the interface is detected. For a response manner after the user taps the first control and the second control, refer to related descriptions (for example, descriptions of S203 and S204) in the embodiment shown in FIG. 2A and other embodiments related to the embodiment shown in FIG. 2A. Details are not described herein again. Only a difference between S602 and S502 is described herein as follows:

In this embodiment of this application, the first interface may be an interface of a pop-up box, and may not occupy an entire display (if projection display is used, an entire projection screen may not be occupied).

Figure 6B:
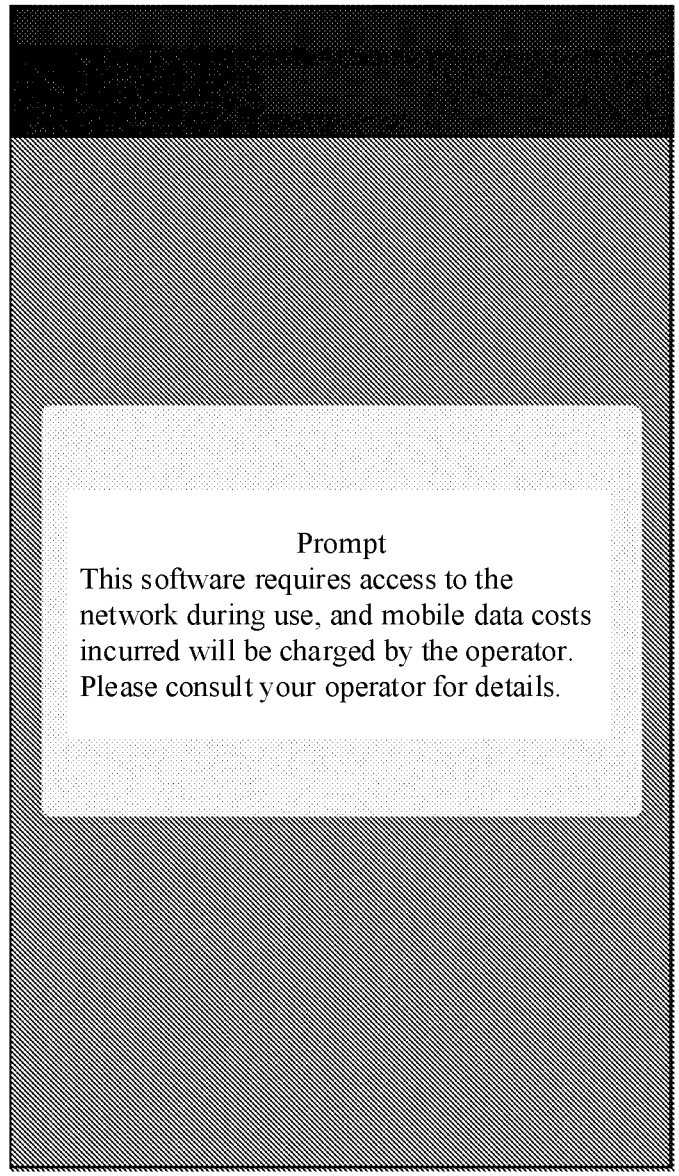
FIG. 6B is a schematic diagram of an application scenario according to an embodiment of this application.

An example is used for description. Refer to FIG. 6B. It is assumed that the to-be-prompted object is prompt content shown in FIG. 6B, and is triggered when the application program accesses an operator network, and the triggering manner corresponds only to the to-be-prompted object. In addition, it is assumed that the first interface includes only the to-be-prompted object, and the first interface is an interface of a pop-up box. In this case, if the application program detects that the application program accesses the operator network, a corresponding triggering instruction is generated. The prompt content is displayed in a pop-up window.

2. In this embodiment of this application, the first interface needs to include a second control used to perform content description on the to-be-prompted object, so as to describe the to-be-prompted object, improve familiarity of the user with the to-be-prompted object, and further improve subsequent usage of the to-be-prompted object by the user.

S603: Display a third interface, where the third interface includes third content and/or a third control used to invoke the third content, includes a second control used to perform content description on the to-be-prompted object, and further includes the to-be-prompted object and/or a first control used to invoke the to-be-prompted object.

When a triggering instruction points to a plurality of pieces of content including the to-be-prompted object, in this embodiment of this application, the third content and the to-be-prompted object are displayed in the third interface, so that the user can view or use the third content and the to-be-prompted object. In addition, a second control used to perform content description on the to-be-prompted object is further displayed in the third interface, so as to describe the to-be-prompted object, improve familiarity of the user with the to-be-prompted object, and further improve subsequent usage of the to-be-prompted object by the user.

In this embodiment of this application, content (including the third content and the to-be-prompted object) is displayed in two optional manners: 1. The content is displayed in an interface. 2. A control that can be used to invoke the content is displayed in the interface, so that the content can be invoked and displayed by using the control for the user. During actual application, a person skilled in the art may select, based on an actual requirement, a display manner specifically used for each type of content. The display manner may be the display manner 1 or 2, or may be both the display manners 1 and 2. This is not excessively limited herein.

An example is used for description. It is assumed that a triggering instruction A points to three pieces of content: a theme A, a theme B, and a theme C. The theme A is a to-be-prompted object.

Figure 6C:
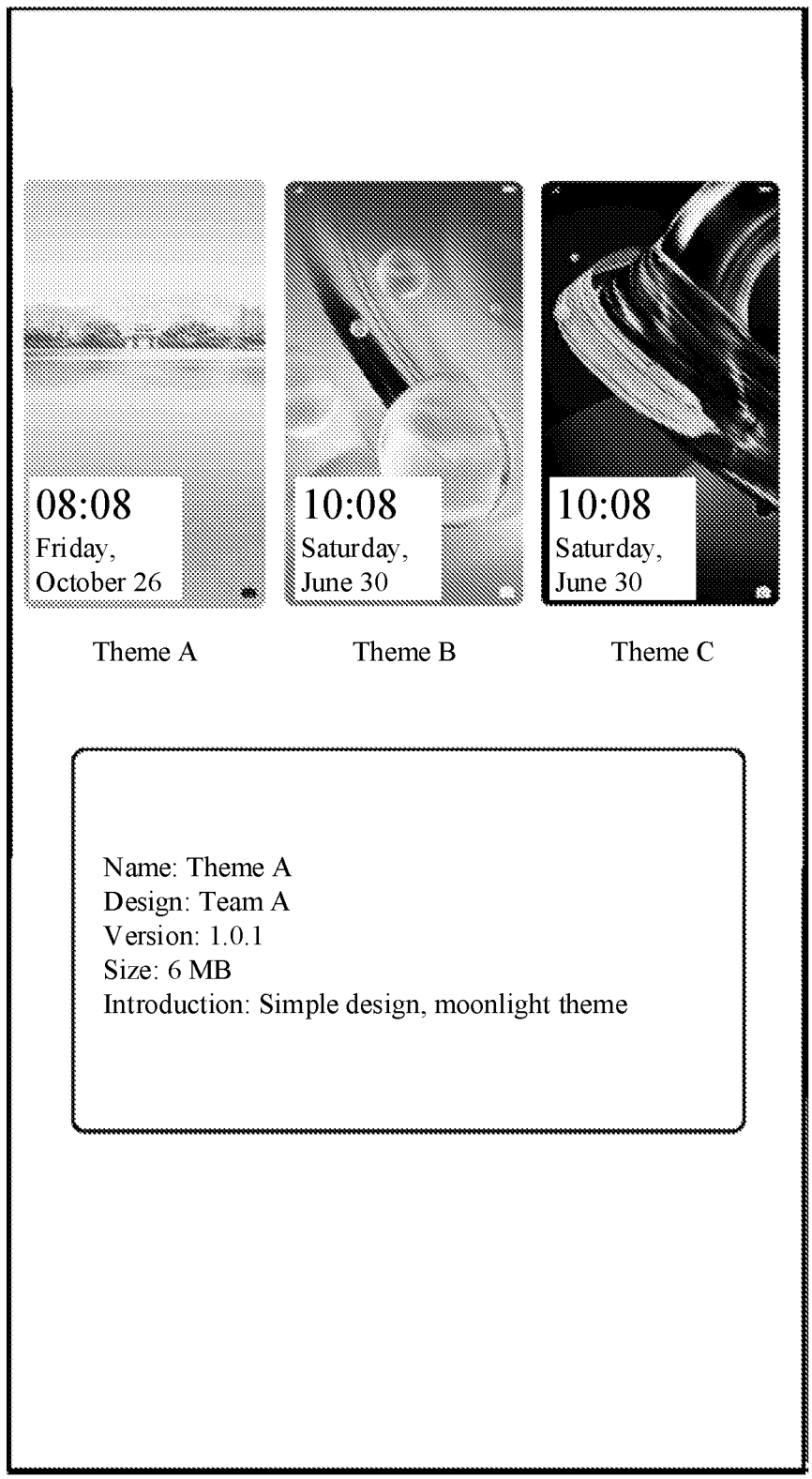
FIG. 6C is a schematic diagram of an application scenario according to an embodiment of this application.

In an optional implementation of the third interface, refer to FIG. 6C. In this case, in this embodiment of this application, the display manner 2 is selected to display each piece of content. To be specific, controls corresponding to the three themes are displayed. In addition, a preview image and a theme name of each theme are displayed in the control. A user can tap a control to view a GUI theme file corresponding to the control. In addition, related information of the theme A is further displayed by using a second control of a window type.

Figure 6D:
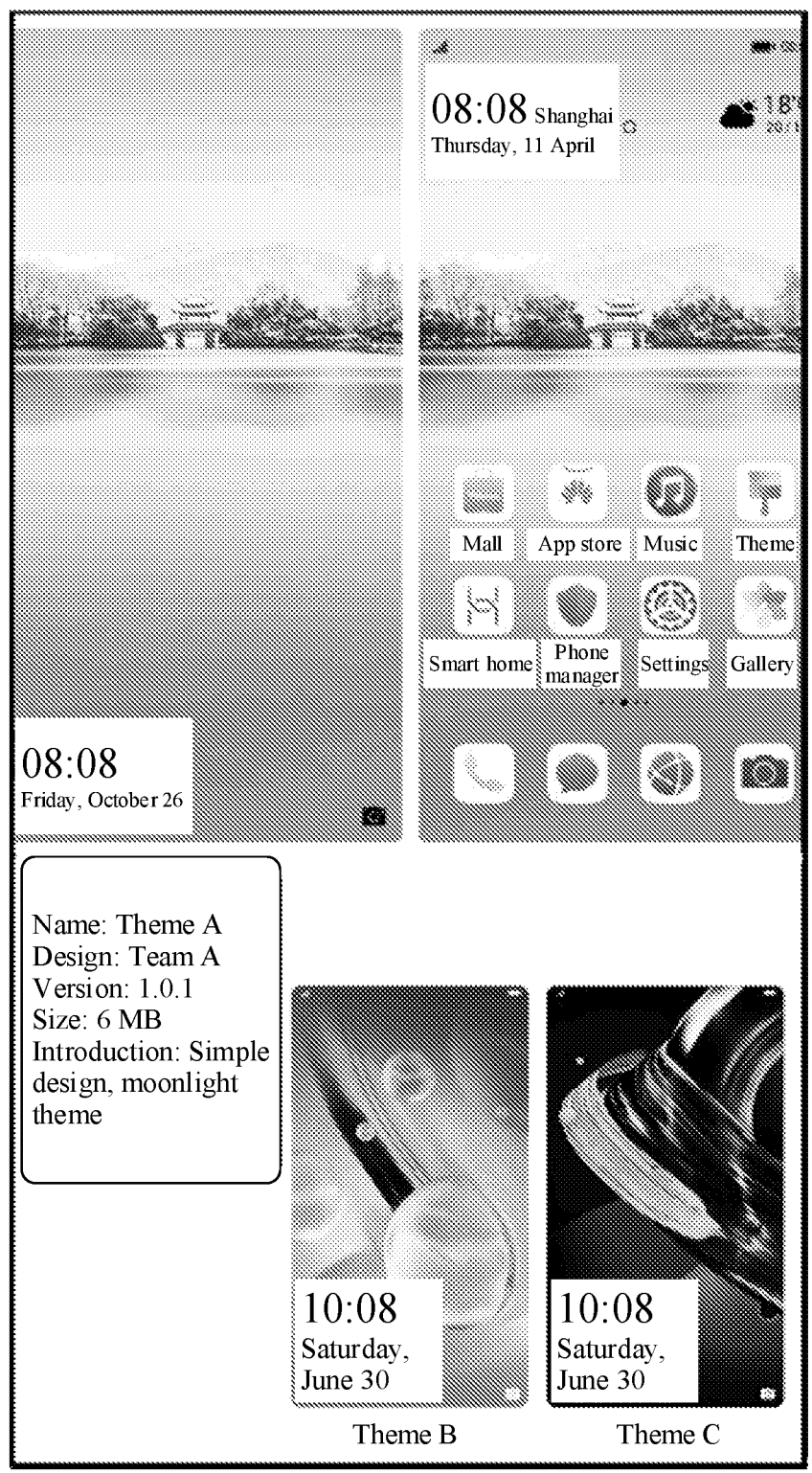
FIG. 6D is a schematic diagram of an application scenario according to an embodiment of this application.

In an optional implementation of the third interface, refer to FIG. 6D. In this case, the display manner 1 is also selected for the theme A. For the theme B and the theme C, the manner 2 is selected for display. Therefore, in FIG. 6D, controls corresponding to the theme B and the theme C are displayed at the same time, and content of the theme A is also displayed. In addition, related information of the theme A is further displayed by using a second control of a window type.

In addition, when the third content and the to-be-prompted object are displayed, a person skilled in the art may further select, based on an actual requirement, some other content to be displayed together in the third interface. For example, some other function controls, such as an exit control or an application control for a theme file, may be added to facilitate user operations.

After the first interface or the third interface is displayed, the user may view or use interface content. When the interface includes a control, and the user taps the control in the interface, in this embodiment of this application, a corresponding response is made based on the control tapped by the user. For example, for the first control, the to-be-prompted object is invoked for display. For the third control, the third content is invoked for display. For specific descriptions of principles, operation details, and the like, refer to related descriptions of the first control and the second control in the embodiment shown in FIG. 2A and other embodiments related to the embodiment shown in FIG. 2A. Details are not described herein again.

In an optional embodiment of this application, in order to facilitate using the to-be-prompted object by the user when the user is familiar with the to-be-prompted object, so that a man-machine interaction operation of the user is more efficient and friendly, in this embodiment of this application, S602 may be replaced with:

Obtain a total number of times a second control is displayed, and determine whether the total number of times is equal to a first number-of-times threshold; and display a first interface if the total number of times is less than or equal to the first number-of-times threshold, where the first interface includes the to-be-prompted object and/or a first control used to invoke the to-be-prompted object, and a second control used to perform content description on the to-be-prompted content; or display a first interface if the total number of times is greater than the first number-of-times threshold, where the first interface includes the to-be-prompted object and/or a first control used to invoke the to-be-prompted object.

S603 may be replaced with:

Obtain a total number of times a second control is displayed, and determine whether the total number of times is greater than a first number-of-times threshold; and display a third interface if the total number of times is less than or equal to the first number-of-times threshold, where the third interface includes the third content and/or a third control used to invoke the third content, includes a second control used to perform content description on the to-be-prompted object, and further includes the to-be-prompted object and/or a first control used to invoke the to-be-prompted object; or display a third interface if the total number of times is greater than the first number-of-times threshold, where the third interface includes the third content and/or a third control used to invoke the third content, and further includes the to-be-prompted object and/or a first control used to invoke the to-be-prompted object.

In this embodiment of this application, after the to-be-prompted object is found, a total number of times of describing the to-be-prompted object is further determined based on a number of times of displaying a control used to describe the to-be-prompted object, so as to determine whether the user is familiar with the to-be-prompted object. If the user is unfamiliar with the to-be-prompted object, an interface including a control used to describe the to-be-prompted object is displayed. If the user is familiar with the to-be-prompted object, an interface not including a control used to describe the to-be-prompted object is displayed.

For a to-be-prompted object that belongs to the second type of to-be-prompted content and is not a function, when detecting a triggering instruction, the terminal device searches for all content pointed to by the triggering instruction. If it is found that only the to-be-prompted object is pointed to, the to-be-prompted object is displayed, and space that can be used to describe the to-be-prompted object is also displayed. Therefore, when viewing the to-be-prompted object, the user can intuitively learn of information about the to-be-prompted object. Therefore, interest of the user in the to-be-prompted object is improved, and usage of the to-be-prompted object is improved. If the found content includes content other than the to-be-prompted object, all the found content is displayed. In this way, the user can view the to-be-prompted object in addition to normally viewing or using original content, and can intuitively learn of information about the to-be-prompted object. Therefore, interest of the user in the to-be-prompted object is improved, and usage of the to-be-prompted object is improved.

In addition, in this embodiment of this application, a total number of times that the to-be-prompted object is described is further counted, and whether the user is familiar with the to-be-prompted object is determined based on the total number of times. When the user is familiar with the to-be-prompted object, description of the to-be-prompted object is canceled. In this way, in this embodiment of this application, when the user is familiar with the to-be-prompted object, it can be convenient for the user to use the to-be-prompted object, so that a man-machine interaction operation of the user is more efficient and friendly, and user experience is improved.

Figure 7:
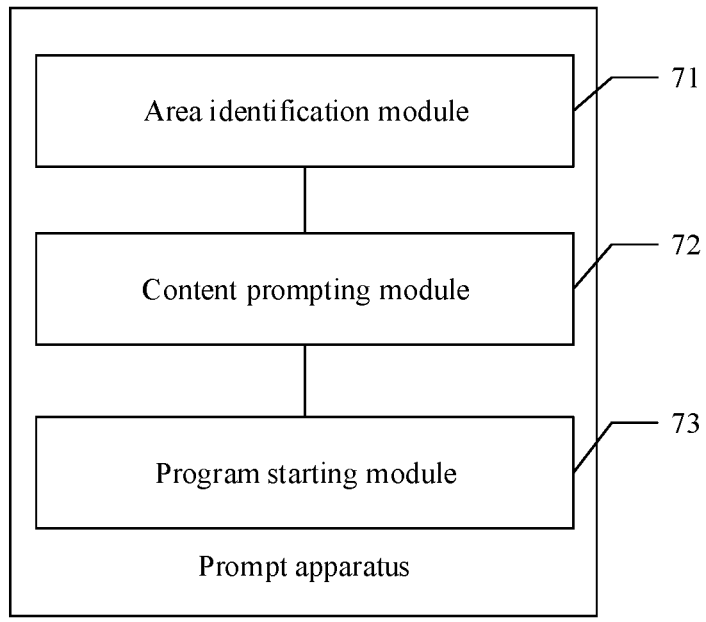
FIG. 7 is a block diagram of a structure of a prompt apparatus according to an embodiment of this application.

Corresponding to the methods in the embodiment shown in FIG. 2A and the embodiment shown in FIG. 5A, FIG. 7 is a block diagram of a structure of a prompt apparatus according to an embodiment of this application. For ease of description, only a part related to embodiments of this application is shown. The prompt apparatus shown in FIG. 7 may be an execution body of the prompt methods provided in the embodiment shown in FIG. 2A and the embodiment shown in FIG. 5A.

Refer to FIG. 7. The apparatus includes an area identification module 71, a content prompting module 72, and a program starting module 73.

The area identification module 71 is configured to: detect a first operation performed by a user on an application program startup icon, and identify an operated area that corresponds to a first operation and that is in the startup icon.

The content prompting module 72 is configured to display a first interface when the operated area is a first area of the startup icon, where the first interface includes a prompt element, and the prompt element is used to prompt to-be-prompted content of the application program.

The program starting module 73 is configured to start the application program when the operated area is a second area of the startup icon.

Further, the prompt element includes at least one of to-be-prompted content, a first control used to invoke the to-be-prompted content, and a second control used to perform content description on the to-be-prompted content.

Further, the prompt element further includes first information of to-be-prompted content.

Further, the to-be-prompted content may be a to-be-prompted function. When the to-be-prompted content is a to-be-prompted function, the first interface includes a first control and/or a second control. In this case, the first control is used to enable the to-be-prompted function, and the second control is used to perform function demonstration on the to-be-prompted function for the user.

Further, the first interface includes the second control, and the first interface is an operation interface of the to-be-prompted function.

Further, the first interface includes the second control, and the prompt apparatus further includes a resource displaying module.

The resource displaying module is configured to: when it is detected that the user operates the second control, obtain a description resource associated with to-be-prompted content, and display the description resource, where the description resource is a resource used to perform content description on the to-be-prompted content.

Further, the first interface includes the second control, and the content prompting module 72 includes a resource displaying submodule.

The resource displaying submodule is configured to: obtain the description resource associated with the to-be-prompted content, and display the description resource by using the second control.

Further, a manner in which the second control displays the description resource is automatic play or manual play; and if the manner in which the second control displays the description resource is manual play, an operation that the second control displays the description resource includes:

if it is detected that the user operates the second control, playing the description resource by using the second control.

Further, the to-be-prompted content is a to-be-prompted function, and the description resource is a demonstration resource used to perform function demonstration on the to-be-prompted function.

Correspondingly, the obtaining the description resource associated with the to-be-prompted content includes:

obtaining function description data associated with the to-be-prompted function, and extracting a demonstration resource from the function description data.

Further, if the to-be-prompted content is a to-be-prompted function, the content prompting module 72 includes a first number-of-times obtaining module, an operation interface displaying module, and a first content prompting submodule.

The first number-of-times obtaining module is configured to obtain a total number of times the to-be-prompted function is used when it is detected that the user performs an operation on the associated area.

The operation interface displaying module is configured to display the operation interface of the to-be-prompted function when the total number of times is greater than a first number-of-times threshold.

The first content prompting submodule is configured to display the first interface if the total number of times is less than or equal to the first number-of-times threshold.

Further, if the to-be-prompted content is a to-be-prompted object other than a function, the content prompting module 72 includes a second number-of-times obtaining module, an object displaying module, and a second content prompting submodule.

The second number-of-times obtaining module is configured to obtain a total number of times the to-be-prompted object is used when it is detected that the user performs an operation on an associated area.

The object displaying module is configured to display an interface including the to-be-prompted object when the total number of times is greater than the first number-of-times threshold.

The second content prompting submodule is configured to display the first interface if the total number of times is less than or equal to the first number-of-times threshold.

Further, the prompt apparatus further includes:

an icon dividing module, configured to: divide the startup icon into m areas, select n areas from the m areas as associated areas, and use remaining m-n areas in the m areas as non-associated areas, where both m and n are integers, m≥2, and 1≤n<m.

Further, the prompt apparatus further includes:

a marking module, configured to display a preset prompt identity in the first area.

Further, the prompt identity is a preset character, or related information of the to-be-prompted content.

Further, the prompt apparatus further includes:

an icon restoration module, configured to: obtain a total number of times the to-be-prompted content is used, and when the total number of times is greater than or equal to a second number-of-times threshold, use the first area and the second area of the startup icon as a whole to start the application program.

Further, the program starting module 73 may be replaced with:

an interface response module, configured to display a second interface when the operated area is the second area of the startup icon, where the second interface includes fourth content including at least one application program, and the fourth content includes content other than the to-be-prompted content.

Further, if the to-be-prompted content is a to-be-prompted function, in this case, the fourth content is a fourth function.

Correspondingly, in the interface response module, the second interface includes a fourth control used to enable the fourth function.

For details about a process in which the modules in the prompt apparatus provided in this embodiment of this application implement respective functions and beneficial effects, refer to descriptions of the embodiment shown in FIG. 2A and the embodiment shown in FIG. 5A. Details are not described herein again.

Figure 8:
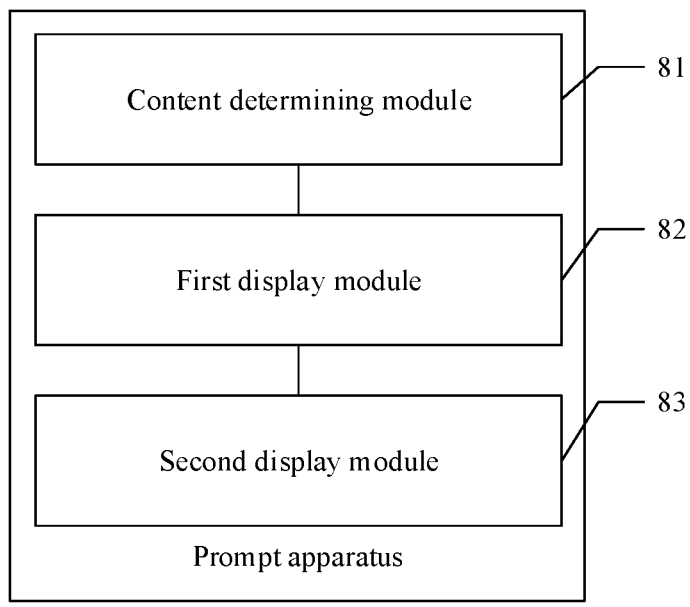
FIG. 8 is a block diagram of a structure of a prompt apparatus according to an embodiment of this application.

Corresponding to the methods in the embodiment shown in FIG. 4A and the embodiment shown in FIG. 6A, FIG. 8 is a block diagram of a structure of a prompt apparatus according to an embodiment of this application. For ease of description, only a part related to embodiments of this application is shown. The prompt apparatus shown in FIG. 8 may be an execution body of the prompt methods provided in the embodiment shown in FIG. 4A and the embodiment shown in FIG. 6A.

Refer to FIG. 8. The prompt apparatus includes a content determining module 81, a first display module 82, and a second display module 83.

The content determining module 81 is configured to obtain a triggering instruction, and identify second content pointed to by the triggering instruction.

The first display module 82 is configured to display a first interface when the second content includes only to-be-prompted content, where the first interface includes the to-be-prompted content and/or a first control used to invoke the to-be-prompted content, and further includes a second control used to describe the to-be-prompted content.

The second display module 83 is configured to display a third interface when the second content includes the to-be-prompted content and third content associated with the to-be-prompted content, where the third interface includes the to-be-prompted content and/or a first control used to invoke the to-be-prompted content, includes a second control, and further includes third content and/or a third control used to invoke the third content.

Further, the to-be-prompted content may be a to-be-prompted function. When the to-be-prompted content is the to-be-prompted function, the first interface includes the first control and/or the second control. Alternatively, the first interface includes the second control, and the first interface is an operation interface of the to-be-prompted function. In this case, the first control is used to enable the to-be-prompted function, and the second control is used to perform function demonstration on the to-be-prompted function for the user.

The third interface includes the first control, the second control, and the third control, and the third control is used to enable a third function.

Further, the prompt apparatus further includes
a resource displaying module, configured to: when it is detected that the user operates the second control, obtain a description resource associated with the to-be-prompted content, and display the description resource, where the description resource is a resource used to perform content description on the to-be-prompted content.

Further, the first display module 82 includes
a first resource displaying submodule, configured to: obtain the description resource associated with the to-be-prompted content, and display the description resource by using the second control.

Further, the second display module 83 includes
a second resource displaying submodule, configured to: obtain the description resource associated with the to-be-prompted content, and display the description resource by using the second control.

Further, a manner in which the second control displays the description resource is automatic play or manual play; and if the manner in which the second control displays the description resource is manual play, an operation that the second control displays the description resource includes:
if it is detected that the user operates the second control, playing the description resource by using the second control.

Further, the to-be-prompted content is a to-be-prompted function, and the description resource is a demonstration resource used to perform function demonstration on the to-be-prompted function.

Correspondingly, the obtaining the description resource associated with the to-be-prompted content includes:
obtaining function description data associated with the to-be-prompted function, and extracting a demonstration resource from the function description data.

Further, if the to-be-prompted content is a to-be-prompted function, the first display module 82 includes a first number-of-times obtaining module, an operation interface displaying module, and a second content prompting submodule.

The first number-of-times obtaining module is configured to: when it is detected that a second function includes only the to-be-prompted function, obtain a total number of times the to-be-prompted function is used.

The operation interface displaying module is configured to display the operation interface of the to-be-prompted function when the total number of times is greater than a first number-of-times threshold.

The second content prompting submodule is configured to display the first interface if the total number of times is less than or equal to the first number-of-times threshold.

Further, if the to-be-prompted content is a to-be-prompted object other than a function, the first display module 82 includes a second number-of-times obtaining module, an object displaying module, and a third content prompting submodule.

The second number-of-times obtaining module is configured to: when it is detected that a second function includes only a to-be-prompted function, obtain a total number of times the to-be-prompted object is used.

The object displaying module is configured to display an interface including the to-be-prompted object when the total number of times is greater than the first number-of-times threshold.

The third content prompting submodule is configured to display the first interface if the total number of times is less than or equal to the first number-of-times threshold.

For details about a process in which the modules in the prompt apparatus provided in this embodiment of this application implement respective functions, refer to descriptions of the embodiment shown in FIG. 4A and the embodiment shown in FIG. 6A. Details are not described herein again.

It should be understood that sequence numbers of the steps do not mean an execution sequence in the embodiments. The execution sequence of the processes should be determined based on functions and internal logic of the processes, and should not constitute any limitation on implementation processes of embodiments of this application.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the descriptions of the specification and appended claims of this application, the terms "first", "second", "third", and the like are merely intended for distinction and description, but shall not be understood as an indication or an implication of relative importance. It should be further understood that although the terms "first", "second", and the like are used to describe various elements in some embodiments of this application in the text, these elements should not be limited by these terms. The terms are merely used to distinguish one element from another element. For example, a first table may be named a second table, and similarly, a second table may be named a first table without departing from a scope of various described embodiments. Both the first table and the second table are tables, but they are not the same table.

Reference to "an embodiment", "some embodiments", or the like described in this specification means that one or more embodiments of this application include a specific feature, structure, or characteristic described with reference to the embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise specifically emphasized. The terms "include", "have", and their variants all mean "include but are not limited to", unless otherwise specifically emphasized in another manner.

A prompt method provided in embodiments of this application may be applied to a terminal device such as a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the terminal device is not limited in embodiments of this application.

For example, the terminal device may be a cellular phone, a PDA device, a handheld device with a wireless communication function, a computing device, or another processing device connected to a wireless modem, a vehicle-mounted device, an Internet of Vehicles terminal, a computer, a laptop computer, a handheld communications device, a handheld computing device, a satellite wireless device, another device configured to perform communication in a wireless system, or a next-generation communications system, for example, a terminal device in a 5G network or a terminal device in a future evolved public land mobile network (PLMN).

As an example rather than a limitation, when the terminal device is a wearable device with a display function, the wearable device may alternatively be a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is not only a hardware device, but also implements a powerful function through software support, data exchange, and cloud intermovement. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

Figure 9:
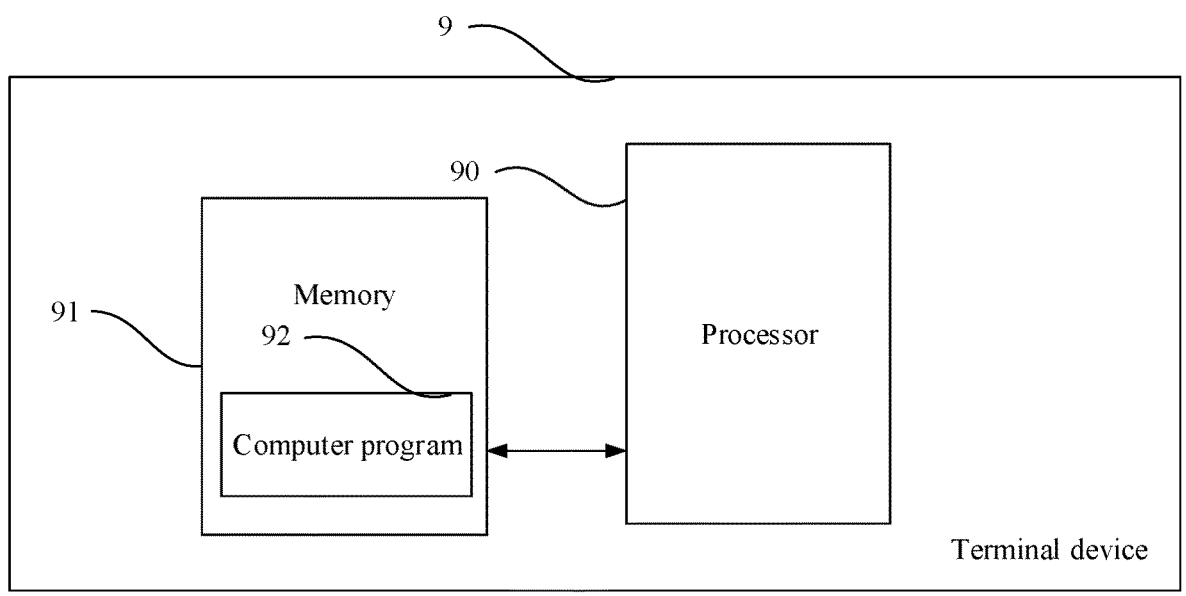
FIG. 9 is a schematic diagram of a structure of a terminal device according to an embodiment of this application.

FIG. 9 is a schematic diagram of a structure of a terminal device according to an embodiment of this application. As shown in FIG. 9, the terminal device 9 in this embodiment includes at least one processor 90 (only one processor is shown in FIG. 9) and a memory 91. The memory 91 stores a computer program 92 that can be run on the processor 90. When executing the computer program 92, the processor 90 implements the steps in the foregoing prompt method embodiments, for example, steps 200 to 2051 shown in FIG. 2A or steps S400 to S4051 shown in FIG. 4A.

The terminal device may include but is not limited to the processor 90 and the memory 91. A person skilled in the art may understand that FIG. 9 is only an example of the terminal device 9, and does not constitute a limitation on the terminal device 9. The terminal device may include more or fewer components than those shown in the figure, or some components may be combined, or different components may be used. For example, the terminal device may further include an input/output device, a network access device, a bus, or the like. For descriptions of the processor 90, refer to related descriptions of the processor 110 in the embodiment shown in FIG. 1A. Details are not described herein again.

In addition, for detailed descriptions of the memory 91, refer to related descriptions of the internal memory 121 in the embodiment shown in FIG. 1A. Details are not described herein again. However, different from the embodiment shown in FIG. 1A, the memory 91 in this embodiment of this application may be an internal storage unit of the terminal device 9, for example, a hard disk or a memory of the terminal device 9. The memory 91 may alternatively be an external storage device of the terminal device 9, for example, a removable hard disk, a smart media card (SMC), a secure digital (SD) card, a flash card or the like that is provided on the terminal device 9. Further, the memory 91 may include both the internal storage unit and the external storage device that are of the terminal device 9.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

An embodiment of this application further provides a computer-readable storage medium. The computer-readable storage medium stores a computer program. When the computer program is executed by a processor, the steps in the foregoing method embodiments can be implemented.

An embodiment of this application further provides a computer program product. When the computer program product runs on a terminal device, the terminal device implements the steps in the foregoing method embodiments when executing the computer program product.

An embodiment of this application further provides a chip. The chip includes a memory and a processor. The memory is coupled to the processor. The memory stores a computer program. When the processor executes the computer program, the chip performs the steps in the foregoing method embodiments.

When being implemented in a form of a software function module and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable storage medium may include any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunications signal, a software distribution medium, and the like.

In the foregoing embodiments, the descriptions of the embodiments have respective focuses. For a part that is not described in detail or recorded in an embodiment, refer to related descriptions in other embodiments.

A person of ordinary skill in the art may be aware that, in combination with examples described in embodiments disclosed in this specification, units and algorithm steps may be implemented by electronic hardware or a combination of computer software and electronic hardware. Whether the functions are implemented by hardware or software depends on a particular application and a design constraint condition of the technical solutions. A person skilled in the art may use different method to implement the described functions for each particular application, but it should not be considered that the implementation goes beyond the scope of this application.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in embodiments.

The foregoing embodiments are merely intended to describe the technical solutions of this application, but are not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application should be subject to the protection scope of the claims.

What is claimed is:

1. A prompt method, comprising:
   in response to a first operation on a startup icon of an application program, identifying, by a processor, an operated area of the first operation on the startup icon, wherein the startup icon is displayed in an area of a display, the area is divided into at least a first area and a second area, and the first area does not overlap the second area;
   displaying, on the display, a first interface in response to the operated area of the first operation being the first area, wherein the first interface comprises a prompt element, and wherein the prompt element is used to provide a prompt for first content of the application program;
   in response to a second operation on the startup icon of the application program, identifying, by the processor, an operated area of the second operation on the startup icon; and
   starting, by the processor, the application program in response to the operated area of the second operation being the second area.

2. The prompt method according to claim 1, wherein the prompt element comprises at least one of the first content, a first control, and a second control, wherein the first control is used to invoke the first content and the second control is used to describe the first content.

3. The prompt method according to claim 2, wherein the prompt element further comprises first information of the first content.

4. The prompt method according to claim 2, wherein in response to the first content being a first function, the first control is used to enable the first function and the second control is used to demonstrate the first function.

5. The prompt method according to claim 4, wherein the first interface is an operation interface of the first function and the first interface comprises the second control.

6. The prompt method according to claim 2, wherein the first interface comprises the second control and after the displaying, on the display, the first interface, the method further comprises:
   in response to a third operation on the second control, obtaining, by the processor, a description resource associated with the first content and displaying, on the display, the description resource.

7. The prompt method according to claim 2, wherein the first interface comprises the second control and the displaying, on the display, the first interface further comprises:
   obtaining, by the processor, a description resource associated with the first content and displaying, on the display, the description resource by using the second control.

8. The prompt method according to claim 6, wherein the first content is a first function, the description resource is a demonstration resource used to demonstrate the first function, and correspondingly the obtaining, by the processor, the description resource associated with the first content comprises:
   obtaining, by the processor, description data of the first function and extracting, by the processor, the demonstration resource from the description data.

9. The prompt method according to claim 2, wherein in response to the first content being a first function, the displaying, on the display, the first interface comprises:
   in response to the operated area of the first operation being the first area, obtaining, by the processor, a first total number of times the first function is used; and
   in response to the first total number of times is less than or equal to a first number-of-times threshold, displaying, on the display, the first interface.

10. The prompt method according to claim 1, wherein before identifying, by the processor, the operated area of the first operation on the startup icon, the method further comprises:
    dividing, by the processor, the startup icon into m areas;
    selecting, by the processor, n areas from the m areas as first areas; and
    using, by the processor, remaining m—n areas in the m areas as second areas, wherein both m and n are integers, and wherein m≥2 and 1≤n<m.

11. The prompt method according to claim 1, wherein after the displaying, on the display, the first interface or starting, by the processor, the application program, the method further comprises:
    obtaining, by the processor, a second total number of times the first content is used; and
    in response to the second total number of times is greater than or equal to a second number-of-times threshold, using, by the processor, the first area and the second area of the startup icon as a whole to start the application program.

12. The prompt method according to claim 1, further comprising:
    displaying, on the display, a preset prompt identity in the first area.

13. A prompt method, comprising:
    obtaining, by a processor, a triggering instruction and identifying second content pointed to by the triggering instruction; and displaying, on a display, a first interface in response to the second content comprising only to-be-prompted content, wherein the first interface comprises the to-be-prompted content or a first control, and further comprises a second control, wherein the first control is used to invoke the to-be-prompted content, and wherein the second control is used to describe the to-be-prompted content; and displaying, on the display, a third interface in response to the second content comprising the to-be-prompted content and third content correlated with the to-be-prompted content, wherein the third interface comprises the to-be-prompted content or the first control, comprises the second control, and further comprises the third content or a third control, and wherein the third control is used to invoke the third content.

14. The prompt method according to claim 13, wherein in response to the triggering instruction being a function triggering instruction, the second content being a second function, the third content being a third function, and the to-be-prompted content being a to-be-prompted function:
the first interface comprises the first control and the second control; or
the first interface is an operation interface of the to-be-prompted function and the first interface comprises the second control, wherein the first control is used to enable the to-be-prompted function, and wherein the second control is used to demonstrate the to-be-prompted function.

15. The prompt method according to claim 13, wherein the first interface comprises the second control and after the displaying, on the display, the first interface, the method further comprises:
in response to a second operation on the second control, obtaining, by the processor, a description resource associated with the to-be-prompted content and displaying, on the display, the description resource.

16. The prompt method according to claim 13, wherein the first interface comprises the second control, and the displaying, on the display, the first interface further comprises:
obtaining, by the processor, a description resource associated with the to-be-prompted content and displaying, on the display, the description resource by using the second control.

17. The prompt method according to claim 14, wherein the first interface comprises the first control and the second control and the displaying, on the display, the first interface comprises:
in response to the second function comprising only the to-be-prompted function, obtaining, by the processor, a third total number of times the to-be-prompted function is used; and
in response to the third total number of times being less than or equal to a first number-of-times threshold, displaying, on the display, the first interface.

18. A terminal device comprising a memory and a processor, wherein the memory stores a computer program that can be run on the processor, and in response to executing the computer program, the processor performs the following steps:
in response to a first operation on a startup icon of an application program, identifying an operated area of the first operation on the startup icon, wherein the startup icon is displayed in an area of a display, the area is divided into at least a first area and a second area, and the first area does not overlap the second area;
displaying a first interface in response to the operated area of the first operation being the first area, wherein the first interface comprises a prompt element, and the prompt element is used to provide a prompt for first content of the application program;
in response to a second operation on the startup icon of the application program, identifying an operated area of the second operation on the startup icon; and
starting the application program in response to the operated area of the second operation being the second area.

19. The terminal device according to claim 18, wherein the prompt element comprises at least one of the first content, a first control, and a second control, wherein the first control is used to invoke the first content and the second control is used to describe the first content.

20. The terminal device according to claim 18, wherein the prompt element further comprises first information of the first content.

* * * * *